(12) United States Patent
Ferraro et al.

(10) Patent No.: US 8,250,025 B2
(45) Date of Patent: Aug. 21, 2012

(54) ANONYMOUS REPORTING SYSTEM

(75) Inventors: Eugene F. Ferraro, Pine, CO (US);
Steven Foster, Littleton, CO (US);
Kimberly L. Pfaff, Littleton, CO (US);
Mary Eileen Persichetti, Louisville, CO (US); Briggin A. Palmer, Littleton, CO (US)

(73) Assignee: Business Controls, Inc., Greenwood Village, CO (US)

( * ) Notice: Subject to any disclaimer, the term of this patent is extended or adjusted under 35 U.S.C. 154(b) by 119 days.

(21) Appl. No.: 12/317,809

(22) Filed: Dec. 29, 2008

(65) Prior Publication Data
US 2009/0235084 A1    Sep. 17, 2009

Related U.S. Application Data

(63) Continuation of application No. 11/740,835, filed on Apr. 26, 2007, now abandoned.

(51) Int. Cl.
*G06F 7/00* (2006.01)
*G06F 17/00* (2006.01)

(52) U.S. Cl. .................................. 707/602; 707/603
(58) Field of Classification Search .......... 707/758, 707/999.003, 999.005, 999.01, 999.107, 707/999.104, 999.102, 803
See application file for complete search history.

(56) References Cited

U.S. PATENT DOCUMENTS

| | | | |
|---|---|---|---|
| 5,586,252 A | 12/1996 | Barnard et al. | |
| 5,754,938 A | 5/1998 | Herz et al. | |
| 5,768,385 A | 6/1998 | Simon | |
| 5,862,223 A | 1/1999 | Walker et al. | |
| 5,884,270 A | 3/1999 | Walker et al. | |
| 5,892,900 A | 4/1999 | Ginter et al. | |
| 5,895,450 A | 4/1999 | Sloo | |
| 6,018,716 A | 1/2000 | Denardo et al. | |
| 6,061,789 A | 5/2000 | Hauser et al. | |
| 6,631,384 B1 | 10/2003 | Richman et al. | |
| 6,839,707 B2 * | 1/2005 | Lee et al. | 1/1 |
| 6,952,679 B1 | 10/2005 | Pulford | |
| 7,213,032 B2 | 5/2007 | Mascarenhas | |
| 7,340,438 B2 | 3/2008 | Nordman et al. | |
| 7,379,913 B2 | 5/2008 | Steele et al. | |
| 8,015,117 B1 | 9/2011 | Lillibridge et al. | |
| 2001/0034708 A1 | 10/2001 | Walker et al. | |

(Continued)

FOREIGN PATENT DOCUMENTS
WO    0050983    8/2000

OTHER PUBLICATIONS

PCT Search Report and Written Opinion for PCT/US07/67566, Filed Apr. 26, 2007.

(Continued)

*Primary Examiner* — Christyann Pulliam
*Assistant Examiner* — Fariborz Khoshnoodi
(74) *Attorney, Agent, or Firm* — Brownstein Hyatt Farber Schreck, LLP

(57) ABSTRACT

An anonymous reporting system for use in reporting and following up on incidents, accidents, and the like. The system may be accessed via an Internet website. A reporting individual may select a type of incident to report. In one example, the reporting individual may select a level on anonymity and some, none or all of the individual's personal identification is displayed to the organization according to the selected level.

15 Claims, 80 Drawing Sheets

U.S. PATENT DOCUMENTS

| | | |
|---|---|---|
| 2001/0054155 A1 | 12/2001 | Hagan et al. |
| 2002/0077964 A1 | 6/2002 | Brody et al. |
| 2002/0116247 A1 | 8/2002 | Tucker et al. |
| 2002/0123899 A1 | 9/2002 | Hall et al. |
| 2002/0165818 A1 | 11/2002 | Meade |
| 2002/0188863 A1 | 12/2002 | Friedman |
| 2003/0088645 A1 | 5/2003 | Ferraro |
| 2006/0010047 A1 | 1/2006 | Minor |

OTHER PUBLICATIONS

File History of U.S. Appl. No. 10/288,835, filed Nov. 5, 2002.

File History of U.S. Appl. No. 11/358,728, filed Feb. 21, 2006.

J. Caplan, J. Torpey: "Some Conceptual Distinction and Issues for Research", 2001.

Report-it (www.reportit.net), 2001.

Anderson Software, "TipSoft, Crime Stopper Tip Management Software", Feb. 18, 2001, http://web.archive.org/web/20010218005333/www.crimestop.com/features.htm.

Micro Data Communications: Safer Schools. Copyright 1999-2000. (http://www.microdatacom.net).

P. Aavitsland et al. "Anonymous reporting of HIV infection: An evaluation of the HIV/AIDS surveillance system in Norway 1983-2000." European Journal of Epidemiology vol. 17, No. 5 (May 2001): 479-489.

* cited by examiner

Report Form A

Incident Type: Fraud

FIG. 4

Report Form B

Incident Type: Sexual Harassment

FIG. 5

Report Form C

Incident Type: Theft

FIG. 6

| | |
|---|---|
| Anonymity | |
| Do you wish to remain anonymous? * | Remain anonymous toward your organization ⌄ — 136 Anonymity Selection Field |
| | Remain completely anonymous |
| | Remain anonymous toward your organization |
| | Do not care about anonymity [Explain] |
| Your name: * | |
| Day phone number: * | |
| Evening phone number: | CAUTION: DO NOT provide your work email address. |
| Personal Email: | |
| How best may we contact you? * | ⌄ [Explain] |

FIG. 7

Anonymity

Do you wish to remain anonymous? *  [Remain anonymous toward your organization ▼]  (Explain)  — 140 Anonymity Selection Field Your name: *

Day phone number: *

Evening phone number: *

CAUTION: DO NOT provide your work email address.

Personal Email:

How best may we contact you? *  [▼]  (Explain)

Your Personal Follow-up Password

Please specify your own password which you will need to check on the incident status.

Your Password: *  [_____]  — 138 Follow-up Password Field

FIG. 8

YOUR INCIDENT HAS BEEN SUBMITTED

Thank you for filing an incident through MySafeWorkplace®.

Your incident has been assigned the following unique access number.

| Your Access Number | Your Personal Password |
|---|---|
| MSW453127765 | test |

142 — Unique Access Number / External Report Number

You should check the status of your incident report within 24-48 business hours after submission.

REMEMBER:
To follow up on your incident, you will need both your unique access number and your personal password. Please make sure you document both. You can print this page for your records.

You can check the status of your incident report in one of two ways:

1. Log on to www.mysafeworkplace.com and click "Report Status."
2. Call 800.461.9330 and a MySafeWorkplace® representative will gladly assist you.

Checking the status of your incident will allow you to receive messages and updates from your organization, submit additional comments, attach documents, and provide further information to your organization. Once in the report, the "Talk to Your Organization" button will allow you to post and review messages anonymously to your organization through a message board. You will need both your access number and personal password to check status.

FIG. 9

Anonymity

Do you wish to remain anonymous? *  [Remain anonymous toward your organization ▾]  [Explain]

Your name: *  [                    ]

Day phone number: *  [                    ]

Evening phone number: *  [                    ] ⎫
                                                 ⎬ 144 Personal Identification Fields
Personal Email:  [                    ] ⎭

CAUTION: DO NOT provide your work email address.  [Explain]

How best may we contact you? *  [          ▾]

FIG. 10

MySafeWorkplace

Creating a Better and Safer Workplace 1.800.461.9330
About Us

Home | What is MySafeWorkplace? | How to Report | What to Report | Anonymous & Confidential | FAQs | Contact Us Report Status Welcome back to MySafeWorkplace®. We encourage all reporting parties to check the status of their incident reports and take advantage of the message board capabilities. Below, please enter your unique access number and password. If you are experiencing technical difficulties or you cannot remember either your password or your unique access number, please call 800.461.9330 anytime (24 hours a day, 7 days a week, 365 days a year) and a MySafeWorkplace® representative will gladly assist you.

Login

Access Number — 259 Access Number Field

Password — 258 Follow-up Password Field

Submit

Please remember that your access number and password are case sensitive.

FIG. 17

Messages

Reporter — 7/5/2017 9:34 AM
Location: Corporate    Department: Operations    [Reply]
Subject: RE: Question
Attachment: Mather's Expense June 2007.pdf (6.96 KB)
Message:
Yes. This attached report indicates he was entertaining a client. I know that he made this trip with two friends from the office and a client was not present.

Original Message:
Your Organization at 7/5/2017 9:44 AM Wrote:
Do you have any supporting documentation you can send? Perhaps a copy of an expense report you know is not accurate?

Your Organization — 7/5/2017 9:44 AM
Location: Corporate    Department: Operations    [Reply]
271 — CPU's name not displayed to reporter.
Subject: Question
Attachment:
Message:
Do you have any supporting documentation you can send? Perhaps a copy of an expense report you know is not accurate?

Talk To Your Organization — 270
Message Board

[Previous Dialogue] [Next Dialogue]

[Previous Dialogue] [Next Dialogue] [Printable View] [Back to Dialogues] [New Dialogue]
[Close Window]

FIG. 19

Enterprise Portal Users

370 — 372

| User | Groups | Level | Summary | Phone | Email | Active | Welcome Letter | Orgs |
|---|---|---|---|---|---|---|---|---|
| Brian Barrier | 0 | OSA | | 303.526.7600 | bbarrier@businesscontrols.com | No | | 1 |
| Raven Baxter | 0 | OA | | 303-526-7600 | rbaxter@businesscontrols.com | No | | 1 |
| Judy Riggs | 0 | DR | | (303) 295-8000 | msxtest@businesscontrols.com | Yes | | 1 |
| Traci Campbell | 0 | OSA | | 303-729-5755 | msxtest@businesscontrols.com | Yes | | 2 |
| Donna Cassidy | 0 | RO | | 303-729-5723 | dcassidy@businesscontrols.com | No | | 1 |
| Tom Cassidy | 0 | OSA | | 303-729-5723 | tcassidy@businesscontrols.com | No | | 2 |
| Joe Caston | 0 | OSA | | 303-729-6600 | jcaston@businesscontrols.com | No | | 2 |
| John Doe | 5 | DR | | NA | na@na.com | No | | |
| DR DR | 1 | DR | | n/a | bpalmerx@businesscontrols.com | No | | |
| Brownstein Hyatt Farber Schreck | 0 | OM | | 303.223.1100 | rourscher@bhfs.com | No | | 1 |

Show records of type: All

Records from 1 to 10 of 42   Show by [10]   Go to page # [1]

374 Active Display Field

FIG. 23

Enterprise Portal Users

*Indicates Required Field*

| First Name: * | Bill | Phone: * | 303.729.5714 |
| Last Name: * | Jones | Fax: | 303.729.5756 |
| User Name: * | bjones | Mobile: | |
| Password: | ******** | Pager: | |
| Confirm Password: | ******** | User Level: | Organizational Manager ▾ |
| Position: * | CFO | Active: | ☑ |
| Description: * | | | |
| Email Address: * | msxtest@businesscontrols.com | | |
| Alternate Email: | | | |
| Welcome Letter: | Sent on Thursday, January 18, 2007 at 9:38:37 AM | | |

Save    Close

376
Enable/Disable User Control

FIG. 24

Tiers

| Tier Number | Tier Name | |
|---|---|---|
| 5 | Organization | Delete |
| 4 | Region | Delete |
| 3 | Territory | Delete |
| 2 | District | Delete |
| 1 | Location | Delete |

[Add] [Save]

378
Fields for creating tiers for incident report distribution

FIG. 25

User Groups

| User Group Name | Incident Types / Notification | Locations | Users | Active |
|---|---|---|---|---|
| Administration | 4 | 🔲 | 2 | Yes |
| Finance | 43 | 🔲 | 1 | Yes |
| HR | 32 | 🔲 | 1 | Yes |
| Legal | 8 | 🔲 | 1 | Yes |
| Sales | 0 | 🔲 | 0 | Yes |

Show records of type: Active Only

Add    Records from 1 to 5 of 5    Show by 100    Go to page # 1

388
Distribution Control Button

Set Access Rights for Incident MSW230643379 – Accounting Misrepresentation

| Select | Name | Organization |
|--------|------|--------------|
| ☐ | Bill Jones (OM) | Testing Headquarters |
| ☐ | Briggin Palmerba (OM) | Testing Headquarters |
| ☑ | Carrie Scott (OSA) | Testing Headquarters |
| ☑ | Eileen Persichetti (OSA) | Testing Headquarters |
| ☐ | Sam Jones (OSA) | Testing Headquarters |
| ☐ | Sara McBride (OR) | Testing Headquarters |
| ☑ | Tom Cassidy (OSA) | Cassidy Incorporated |
| ☑ | Traci Campbell (OSA) | Testing Headquarters |

Reasons: *

[ Save ]  [ Close ]

418
Controls to add viewing rights
for company representatives

FIG. 29

Historical Reports (defaulted to last 12 months)

Click the link below for the specific report (or the Saved Filter link if you want to view that particular report using your saved filters) – and then click within the report to drill down to the actual Incident Report

*Note that you will only see those Incident Reports that you are entitled to view.*

| Report Name | Report Description | Use Saved Filters |
|---|---|---|
| All Incident Reports by Location | View all Incident Reports at any chosen tier or location in your organization structure (defaulted to those received in the last 12 months) with ability to modify Date Range, Incident Type, Status and Organization. | |
| Incident Report Volume/Reporting Frequency | Frequency of Incident Reports by time periods (defaulted to those received in the last 12 months) with ability to modify Date Range, Status and Organization. Note that date ranges less than a month will be displayed daily, less than 2 years, monthly, more than 2 years, annually. | |
| Key Word Search | Use up to 2 key words to search Incident Reports that you are entitled to view. The search will look through the Description, all Answers, Additional Comments, Suspected Individuals and Names of those Reporters who do not care about anonymity, to see if either key word is contained in them. There is also the ability to modify Date Range, Incident Type, Status and Organization. | |
| All Incident Reports by Incident Type | Incident Report Types (defaulted to those received in the last 12 months) with ability to modify Date Range, Incident Type, Status and Organization. | |
| All Incident Reports by Status | Incident Report Statuses (defaulted to those received in the last 12 months) with ability to modify Date Range, Incident Type, Status and Organization. | |
| All Active Non Re-Opened Incident Reports by Age | Age of Active Incident Reports (defaulted to those received in the last 12 months) that have NOT ever been re-opened, with ability to modify Date Range, Incident Type, Status and Organization. | |
| All Active Re-Opened Incident Reports by Age | Age of Active Incident Reports (defaulted to those received in the last 12 months) that HAVE been re-opened with ability to modify Date Range, Incident Type, Status and Organization. | |
| Closure Rate of Closed Incidents | Closure Rate of Closed Incident Reports (defaulted to those received in the last 12 months) that have NOT ever been reopened with ability to modify Date Range, Incident Type, Status and Organization. | |
| Closure Rate of Re-Opened Closed Incident Reports | Closure Rate of Closed Incident Reports (defaulted to those received in the last 12 months) that HAVE been re-opened with ability to modify Date Range, Incident Type, Status and Organization. | |
| Raw Data Extract | View the raw data for all Incident Reports (defaulted to those received in the last 12 months) with ability to modify Date Range, Incident Type, Status and Organization. This raw data can then be downloaded to Excel for further User Ad Hoc Reporting. | |
| Set Global Filters | Use this report to first modify the Date Range (defaulted to the last 12 months), Incident Type, Status and Organization Filters and then apply them as saved defaults for ALL the reports instead of applying saved defaults for each individual report. Note that this global Filter application will override all existing saved defaults. Also, each individual report contains the ability to override its own defaults. The individual settings will not overwrite the global settings, rather just those settings for that specific report. | 600 |

[Close Window]

CONFIDENTIAL INCIDENT FORM

This confidential incident has been received via www.MySafeWorkplace.com. A copy of this incident has been forwarded to all those designated as authorized recipients by the employer.

General Information

Incident Number: MSW14163875ACom
Information submitted at: 2/14/2006 2:50:51 AM MST
Intake Method: Call Center #6352

Approximate date and time of incident:
(location date/time) 2/13/2006 7:00:00 AM
(GMT-07:00) Mountain Time (US and Canada)
(organization date/time) 2/13/2006 7:00:00 AM
(GMT-07:00) Mountain Time (US and Canada)

Incident Type:
(Current) Compliance/Regulation Violations
(Original) Compliance and Regulation Violations (Non-Financial)
Organization: Testing Headquarters
Location:
(Current) Denver
(Original) Field Office
Department: Accounting
Location Address: 717 Seventeenth Street
Denver, Colorado 80203
United States

Reporter's Personal Information

Confidentiality: Remain completely anonymous
Reporter's Access Number: MSW28083977B2X

662
Read-only View of Incident Report

[Close Window]
Investigatory Notes

Warning: Submit your message within 20 minutes or you will be logged out and lose your work.

Incident Number: MSW8487739BZZ1    * Indicates Required Field

Subject: *

Attachments:
[Library]

☐ Attorney Work Product
Message Body: *

704
Subject Field

706
Attorney Work
Product Designator
Control

702
Body Portion

[Spellcheck]   [Save]   [Cancel]

[Close Window]

700
Investigatory Notes
Entry Screen

Submit a Report for Testing Headquarters

All contacts are confidential and users are assured anonymity unless otherwise requested by you. Your organization reserves the right to act or not to act on any information provided, unless required to do so by law. Furthermore, your organization is not required to disclose its response or actions pursuant to any information which may be provided or reported. The intentional misreporting of information may be actionable and subject to criminal investigation.

Select Incident Type     Company Name ← 744

○ Acceptable Use Violations – Violations of the Company's Information Security Policies, Code of Computer Conduct, Acceptable Use, etc. that govern conduct while using the Company network or confidential information resources.

○ Accounting / Audit Related Complaints or Concerns – The purposeful, unethical or questionable recording of accounting or auditing matters. Examples may include: fraud, deliberate errors related to financial statements; noncompliance with accounting controls; misinterpretations or false statements to or by senior officers regarding financial records; or deviation from full and fair reporting of the company's financial condition.

○ Accounting Error – An item recorded in the company's financial statements by accident that does not conform to Generally Accepted Accounting Practices (GAAP).

○ Accounting Matters or Controls – An item recorded in or omitted from the financial statements with knowledge that it does not conform to Generally Accepted Accounting Practices (GAAP).

○ Accounting Misrepresentation – An item recorded in the company's financial statements with full knowledge that it does not conform to Generally Accepted Accounting Practices (GAAP).

○ Accounting Omissions – An item recorded, or intentionally or unintentionally left out, in the company's financial statement that does not conform to Generally Accepted Accounting Practices (GAAP).

○ Auditing Matters – Purposeful and methodical documentation and examination of any business or financial transaction that is related to Generally Accepted Accounting Practices (GAAP).

742 ← Incident Types

FIG. 55

Incident Detail

What monetary loss is associated with this violation? *

Did the incident or violation occur more than once? *
[No ▾]

What brought this violation to your attention? *

Is anyone else aware of this violation? *
[No ▾]

Was anyone outside the organization involved in the violation? *

Has the incident been reported to anyone in supervision or management? *
[No ▾]

Has the incident been reported to anyone outside the organization? *
[No ▾]

Are you a current employee of the organization on which your report is based? *
[Yes ▾]

Incident Detail

Did the incident or violation occur more than once? *
No ▼

Were you the target of this behavior? *
No ▼

Was there anyone injured? *
No ▼

Did anyone else witness this incident? *
No ▼

Was anyone outside the organization involved in the violation? *
No ▼

Has the incident been reported to anyone in supervision or management? *
No ▼

Has the incident been reported to anyone outside the organization? *
No ▼

Are you a current employee of the organization on which your report is based? *
Yes ▼

Additional Thoughts or Comments

Please provide any additional thoughts or comments related to the incident.

Incident Detail

Did the incident or violation occur more than once? *
[No ▼]

Were you the target of this behavior? *
[No ▼]

Was there anyone injured? *
[No ▼]

Did anyone else witness this incident? *
[No ▼]

Was anyone outside the organization involved in the violation? *
[No ▼]

Has the incident been reported to anyone in supervision or management? *
[No ▼]

Has the incident been reported to anyone outside the organization? *
[No ▼]

Are you a current employee of the organization on which your report is based? *
[Yes ▼]

Additional Thoughts or Comments

Please provide any additional thoughts or comments related to the incident.

Incident Detail

Did the incident or violation occur more than once? *
[No ▾]

Were you the target of this behavior? *
[Yes ▾]
(Who targeted you? *
[          ]

Why do you think you were targeted? *
[          ]

Was there anyone injured? *
[No ▾]

Did anyone else witness this incident? *
[No ▾]

Was anyone outside the organization involved in the violation? *
[Yes ▾]
(Who was involved and what was their involvement? *
[          ]

Has the incident been reported to anyone in supervision or management? *
[No ▾]

Has the incident been reported to anyone outside the organization? *
[No ▾]

Are you a current employee of the organization on which your report is based? *
[Yes ▾]

User Groups

| User Group Name | Incident Types / Notification | Locations | Users | Active |
|---|---|---|---|---|
| Audit Committee | 4 | 🔲 | 2 | Yes |
| Finance | 43 | 🔲 | 1 | Yes |
| HR | 32 | 🔲 | 1 | Yes |
| Legal | 8 | 🔲 | 1 | Yes |
| Sales | 0 | 🔲 | 0 | Yes |

Records from 1 to 5 of 5    Show by [10 v]    Go to page # [1 v]

Show records of type: [Active Only v]

- 790 Defined User Groups
- 792 Associated Incident Types
- 794 Corporate Locations
- 796 Designated Contact Persons

FIG. 61

Incident Types for Audit Committee

| Selected | Incident Type | Access Only | Initial/Audit Emails Only | All Emails |
|---|---|---|---|---|
| ☐ | Substance Abuse | ◉ | ○ | ○ |
| ☐ | Sexual Harassment | ◉ | ○ | ○ |
| ☐ | Acceptable Use Violations | ◉ | ○ | ○ |
| ☑ | Accounting / Audit Related Complaints or Concerns | ○ | ○ | ◉ |
| ☐ | Accounting Error | ◉ | ○ | ○ |
| ☐ | Accounting Matters or Controls | ◉ | ○ | ○ |
| ☐ | Accounting Misrepresentation | ◉ | ○ | ○ |
| ☐ | Accounting Omissions | ◉ | ○ | ○ |
| ☐ | Auditing Matters | ◉ | ○ | ○ |
| ☐ | Billing Practices | ◉ | ○ | ○ |
| ☐ | Bribery and Kickbacks | ◉ | ○ | ○ |
| ☑ | Code of Ethics Violation | ○ | ○ | ◉ |
| ☐ | Compliance and Regulation Violations (Financial) | ◉ | ○ | ○ |
| ☐ | Compliance/Regulation Violations | ◉ | ○ | ○ |
| ☐ | Corporate Scandal | ◉ | ○ | ○ |
| ☐ | Customer Mistreatment | ◉ | ○ | ○ |
| ☑ | Discrimination | ○ | ◉ | ○ |
| ☐ | Domestic Violence | ◉ | ○ | ○ |
| ☑ | Employee Relations | ◉ | ○ | ○ |
| ☐ | Ethics Violation | | | |
| ☐ | Fraud | | | |

798 Selection Control
800 Incident Types
802 Access Control
804 Second Control
806 Third Control

FIG. 62

Enterprise Portal Users

*Indicates Required Field

| First Name: * | Sam | Phone: * | 303.729.5414 |
| --- | --- | --- | --- |
| Last Name: * | Jones | Fax: | |
| User Name: * | sjones | Mobile: | |
| Password: | ******** | Pager: | |
| Confirm Password: | ******** | | |
| Position: * | Manager | User Level: | Organizational Super Admin ▼ |
| Description: * | | | |
| Email Address: * | msxtest@businesscontrols.com | Active: | ☑ |
| Alternate Email: | | | |
| Notification Rights: | ⦿ Initial and Audit Emails only<br>○ All email messages | | |
| Welcome Letter: | Sent on Tuesday, January 31, 2006 at 8:49:16 AM | | |

[ Save ]  [ Close ]

808 Notification Controls

FIG. 63

Please List the Individuals That You Suspect May Be Involved

You must enter the first and last name of at least one individual. If there is no specific person OR you don't know the first or last name of an individual, please enter "unknown" in the field(s). You may list up to 8 individuals. *

| First Name | Last Name | First Name | Last Name |
|---|---|---|---|
| Bill | Jones | | |
| | | | |
| | | | |
| | | | |

832
Fields for Specifying Suspects

FIG. 65

Suspected Individuals

Of the names you provided in your incident, the individuals listed below may be a person designated to review this specific incident type. Please confirm if they were involved in the inappropriate activity by checking the "confirm" box. Please click "next" when you are finished. By confirming their participation in the alleged activity, the system will not send them a copy of this incident. Thank you for your assistance.

| Name | Position | Confirm | Organization Name |
|---|---|---|---|
| Sam Jones | Manager | ☐ | Testing Headquarters |
| Bill Jones | CFO | ☐ | Testing Headquarters |

<< Back to Incident Form     Next >>

834 Name Field
836 Title Field
838 Confirmation Control

FIG. 66

Your Personal Follow-up Password

Please specify your own password which you will need to check on the incident status.

Your Password: *

[Spellcheck]  [<< Back to Incident Types]  [Review incident before submitting >>]

896
Control for
Changing
Incident Type

FIG. 70

Incident Types

| Selected | Display Order | Incident Type |
|---|---|---|
| ☒ | 1 | Substance Abuse - The illegal or inappropriate use of drugs or alcohol, whether purchased legally (prescription) or illegally (street drugs). Substance abuse is also the misuse of any substance, whether controlled by Federal law or not, such that when put into one's body it is contrary to the substance's intended use. Examples may involve the use of alcohol; marijuana, narcotics, amphetamines, depressants, stimulants, aerosol sprays (inhalants), hallucinogens, or prescription drugs. |
| ☒ | 2 | Sexual Harassment - Unwanted and offensive sexual advances or sexually offensive remarks or acts, especially made by one in a superior or supervisory position or when acquiescence to such behavior is a condition of continued employment, promotion, or satisfactory evaluation. Examples may include unwanted conversation, obscene gestures, comments, jokes, touching of a sexual or lewd nature, staring/leering or whistling. |
| ☒ | ☐ | Acceptable Use Violations - Violations of the Company's Information Security Policies, Code of Computer Conduct, Acceptable Use, etc. that govern conduct while using the Company network or confidential information resources. |
| ☒ | ☐ | Accounting / Audit Related Complaints or Concerns - The purposeful, unethical or questionable recording of accounting or auditing matters. Examples may include: fraud; deliberate errors related to financial statements; noncompliance with accounting controls; misinterpretations or false statements to or by senior officers regarding financial records; or deviation from full and fair reporting of the company's financial condition. |
| ☒ | ☐ | Accounting Error - An item recorded in the company's financial statements by accident that does not conform to Generally Accepted Accounting Practices (GAAP). |
| ☒ | ☐ | Accounting Matters or Controls - An item recorded in or omitted from the financial statements with knowledge that it does not conform to Generally Accepted Accounting Practices (GAAP). |
| ☒ | ☐ | Accounting Misrepresentation - An item recorded in the company's financial statements with full knowledge that it does not conform to Generally Accepted Accounting Practices (GAAP). |
| ☒ | ☐ | Accounting Omissions - An item recorded, or intentionally or unintentionally left out, in the company's financial statement that does not conform to Generally Accepted Accounting Practices (GAAP). |
| ☒ | ☐ | Auditing Matters - Purposeful and methodical documentation and examination of any business or financial transaction that is related to Generally Accepted Accounting Practices (GAAP). |
| ☒ | ☐ | Billing Practices - The purposeful, systemic or unethical billing of vendors, government insurance plans, managed care organizations, private insurance plans and other third party payers. |

Records from 1 to 10 of 61   Show by [10 ▼]   Go to page # [1 ▼]   [Save]

898
Incident Type
Selection Control

900
Order Control

FIG. 71

Submit a Report for Testing Headquarters

All contacts are confidential and users are assured anonymity unless otherwise requested by you. Your organization reserves the right to act or not to act on any information provided, unless required to do so by law. Furthermore, your organization is not required to disclose its response or actions pursuant to any information which may be provided or reported. The intentional misreporting of information may be actionable and subject to criminal investigation.

Select Incident Type

○ Substance Abuse - The illegal or inappropriate use of drugs or alcohol, whether purchased legally (prescription) or illegally (street drugs). Substance abuse is also the misuse of any substance, whether controlled by Federal law or not, such that when put into one's body it is contrary to the substance's intended use. Examples may involve the use of alcohol, marijuana, narcotics, amphetamines, depressants, stimulants, aerosol sprays (inhalants), hallucinogens, or prescription drugs.

○ Sexual Harassment - Unwanted and offensive sexual advances or sexually offensive remarks or acts, especially made by one in a superior or supervisory position or when acquiescence to such behavior is a condition of continued employment, promotion, or satisfactory evaluation. Examples may include unwanted conversation, obscene gestures, comments, jokes, touching of a sexual or lewd nature, staring/leering or whistling.

○ Acceptable Use Violations - Violations of the Company's Information Security Policies, Code of Computer Conduct, Acceptable Use, etc. that govern conduct while using the Company network or confidential information resources.

○ Accounting / Audit Related Complaints or Concerns - The purposeful, unethical or questionable recording of accounting or auditing matters. Examples may include: fraud; deliberate errors related to financial statements; noncompliance with accounting controls; misinterpretations or false statements to or by senior officers regarding financial records; or deviation from full and fair reporting of the company's financial condition.

○ Accounting Error - An item recorded in the company's financial statements by accident that does not conform to Generally Accepted Accounting Practices (GAAP).

○ Accounting Matters or Controls - An item recorded in or omitted from the financial statements with

Incomplete Incidents

Filter Criteria: [Apply Filter]

Incident Type: [--All--▼]  Status: [--All--▼]  Classification [--All--▼]

| Incident No. | Organization | Incident Type | Location | Submitted | Status | Classification | Class | In | RE | Print |
|---|---|---|---|---|---|---|---|---|---|---|
| MSW034883455 | Jillian's Billiard Club | Sexual Harassment | Norfolk | 06/16/2006 10:44 PM | New | | Real | 00 | 00 | 🖨 |
| MSW982378267 | Microsurface Finishing Products Inc. | Mistreatment | Wilton, Iowa | 06/11/2006 09:04 PM | New | | Real | 00 | 00 | 🖨 |
| MSW561373620 | United Health Group | Other | n/a | 06/07/2006 09:59 PM | New | | Real | 00 | 00 | 🖨 |
| MSW451372768 | SLB of Minnesota LLC/dba Panera Bread | Other | Panera Bread | 06/02/2006 02:41 PM | New | | Real | 00 | 00 | 🖨 |
| MSW925189259 | Promontry - The Ranch Club | Other | ranch clubhouse | 05/25/2006 05:18 PM | Closed | Prospect | Prospect | 00 | 00 | 🖨 |
| MSW038756540 | Wilson Turf | Mistreatment | Landscape Dept. | 05/19/2006 09:45 AM | New | | Real | 00 | 00 | 🖨 |
| MSW142491935 | JILLIANS (Now owned by DAVE AND BUSTERS) | Mistreatment | BILLIARD CLUB | 05/11/2006 10:08 AM | New | | Real | 00 | 00 | 🖨 |
| MSW148978000 | Best Western | Safety Concerns | Best Western Rama Inn | 05/10/2006 09:01 PM | New | | Real | 00 | 10 | 🖨 |
| MSW498061490 | Creative Profitable Partnership (CPP) North America | Mistreatment | Unknown | 05/09/2006 10:04 AM | New | | Real | 00 | 00 | 🖨 |
| MSW529979083 | El Paso Service | Mistreatment | El Paso | 05/08/2006 09:00 PM | New | | Real | 00 | 00 | 🖨 |

Records from 1 to 10 of 354 Show by [10▼] Go to page # [1▼]

ANONYMOUS REPORTING SYSTEM

This application is a continuation-in-part of U.S. patent application Ser. No. 10/288,835 filed Nov. 5, 2002, which claims the benefit of U.S. Provisional Application No. 60/337,036 filed Nov. 6, 2001. This application also claims the benefit of U.S. Provisional Application No. 60/795,600 filed Apr. 26, 2006.

TECHNICAL FIELD

The present invention relates generally to systems for handling and arranging information, and more particularly to information handling for receiving and categorizing anonymous reports in relation to security issues, safety issues, and other corporate or institutional issues where anonymity may be desired.

BACKGROUND

The reporting of "incidents" is often of great value in recognizing potential problems before the persons involved go further along the same paths, too often with tragic or unfortunate results. Early recognition of problem personalities or trends can provide opportunities for intervention and prevention of more serious activities. Incidents of all sorts occur frequently in social circumstances, such as in schools or the workplace, where stress can lead to escalation, and escalation can lead to violence. The problems relate to groups which include three of the largest segments of the population; children attending school from age five through eighteen, students attending secondary school and those employed. The latest U.S. census estimates that 73 million Americans are in school and 134 million are in the workplace. Those in charge of security and the well being of the persons in these environments often have a "need to know" about incidents which might seem minor, but can be the harbinger of events of greater consequence.

Difficulties occur in the handling of reports and in encouraging observers to make the incidents known to those in authority, however. These difficulties arise in areas of collating and correlating the incidents and in maintaining secrecy and the privacy of the persons involved, whether they are the perpetrators or the witnesses. There is frequently a fear factor among witnesses, as well as a general reluctance to get involved or to be seen as a "snitch" or troublemaker. Overcoming obstacles to reporting incidents, and providing a structure for discreet and efficient handling of reports is accordingly an organizational goal.

A major concern in modern society deals with these incidents, especially in light of trends of violence in the workplace and educational institutions. Today, violence, including sexual assault and harassment, is so prevalent in the workplace that, in many organizations it has become an accepted fact of life.

The National Center for Victims of Crime reported 709 homicides in the workplace during 1998 and 13 million workers say they are concerned about the behavior of a coworker who they think could become violent. Twenty-five percent of workers said their company offered training on workplace violence, sixty-five percent said theirs did not, and nine percent said they did not know if work had offered any training or help. Nine percent of workers reported an assault or other violent act in their workplace in the past year, and eighteen percent reported a threat or verbal intimidation, three out of every four say they are getting no guidance on how to prevent violence or how to recognize the dangers of violence [National Center for Victims of Crime, 1999].

These astounding figures suggest that more than 12 million acts of violence and 24 million threats or verbal intimidations occur each year [U.S. Department of Education and Justice, 1998]. Only 25 percent of the companies surveyed have begun, in some way, to address violence at work [Business Controls, Inc., *What Every Employer Should Know About Workplace Violence*, 2000]. While many companies have begun to recognize the need to address the potential for violence, it is evident that they are looking for a starting point. Anonymous employee "hotlines" have been established to meet this need. Many of the hotlines were established without thought as to who might use them and how they would be used.

In addition, most telephone hotlines and other incident reporting systems utilize a standard incident report form. As can be appreciated, the standard form may have a variety of fields that ask for information relevant to each of the different types of reports that might be made. It can also be appreciated that certain portions of this requested information are completely irrelevant or inapplicable to certain types of incident reports. Asking a reporting individual to supply some of this irrelevant and inapplicable information can, at worst, frustrate the individual enough to not complete and submit the form or, at best, annoy the individual.

In 2002, the U.S. Congress enacted the Sarbanes-Oxley Act which closely regulates corporate governance and financial practice. In particular, increased requirements were placed on corporations to collect and report information that may be relevant to shareholders.

The present inventors have recognized the need for finding ways to obtain and correlate information on preliminary incidents as a tool for preventing violence and harassment. In particular, the present inventors have recognized the need for methods for encouraging greater participation in reporting, creating a greater degree of witness confidence and safety, and collecting appropriate information relevant to the incident to be reported.

SUMMARY

In light of the above and according to one broad aspect of one embodiment of the present invention, disclosed herein is an anonymous incident reporting system that collects data that is relevant to the type of incident being reported. In one example, the system may be implemented as an Internet-based system for use by a reporting individual. The system may include a web server that provides a reporting individual the opportunity to make a report relative to one of a plurality of entities, the reporting individual having the option to remain anonymous in the report. The server can further allow the reporting individual to select a type of report that the individual wishes to make and, based on that selection, a corresponding report form is generated for that type of report to be made. The corresponding form is different for different types of reports to be made.

The system may be separately configurable for each of a plurality of entities, wherein every reporting individual is associated with an entity, wherein the corresponding form for a given type of report for one entity is different from the corresponding form for the same given type of report for at least one other entity. The reporting individual can enter data in defined fields on the corresponding report form that is generated.

The individual may have the choice of different levels of anonymity. One of the choices the individual may have is complete anonymity. One of the choices the individual may have is anonymity toward the entity but not toward administrators of the system. One of the choices the individual may have is no anonymity.

The reporting individual may make the selection of the type of report that the individual wishes to make by selecting one of a plurality of types of reports listed in a selection list. The corresponding report form for a given type of report may differ from a corresponding report form for another type of report by the defined fields in the report forms. The differences between the defined fields on different report forms may relate to different requested information.

According to another broad aspect of another embodiment of the present invention, disclosed herein is a method for collecting incident reports from reporting individuals about a group of entities via the internet. In one example, the method may include providing a website for reporting individuals to visit; allowing the reporting individual to identify the entity; allowing the reporting individual to select a type of report to be submitted; providing a report form that corresponds to that type of report, based on the selection of report type; allowing the reporting individual to enter data into the report form; allowing the reporting individual to remain anonymous in the report; and allowing the reporting individual to submit the form.

Each entity may specify the report form corresponding to each report type that will be provided to reporting individuals who identify that entity. Each entity specifying the report form may include allowing each entity to provide a customized report form.

The features, utilities and advantages of the various embodiments of the invention will be apparent from the following more particular description of embodiments of the invention as illustrated in the accompanying drawings.

BRIEF DESCRIPTION OF THE DRAWINGS

FIG. 4 is an example of a report form that is tailored for a particular type of incident to be reported, namely Fraud, in accordance with one embodiment of the present invention.

FIG. 5 is an example of a report form that is tailored for a particular type of incident to be reported, namely Sexual Harassment, in accordance with one embodiment of the present invention.

FIG. 6 is an example of a report form that is tailored for a particular type of incident to be reported, namely Theft, in accordance with one embodiment of the present invention.

FIG. 7 is an example of a computer display screen or graphical user interface (GUI) for providing a drop-down menu for the reporting person to select the desired level of anonymity, in accordance with one embodiment.

FIG. 8 is an example of a computer display screen with one or more fields requesting that the reporting person provide a password that the anonymous reporting system will associate with an incident report.

FIG. 9 is an example of a computer display screen wherein an anonymous reporting system communicates a unique access number to a reporting person after the reporting person has submitted an incident report.

FIG. 10 illustrates an example computer display screen where a reporting person has selected to remain "anonymous toward your organization" and where a set of personal information fields are provided in order to obtain identifying information from the reporting person.

FIG. 17 illustrates an example of a computer display screen asking a reporting party to enter an access number and password in response to selecting the status button in FIG. 16.

FIG. 19 is an example of a message board message as displayed to the reporting party.

FIG. 23 illustrates an example of a computer display screen listing each authorized company representative that may receive and handle incident reports.

FIG. 24 illustrates an example of a computer display screen for enabling/disabling user control.

FIG. 25 illustrates an example of a computer display screen for establishing tiers for distribution of incident reports within an organization.

FIG. 26 illustrates an example of a computer display screen with a distribution control button for displaying the distribution tiers structure for reports that will be sent to certain user groups.

FIG. 28 is an example of an incident summary report.

FIG. 29 illustrates an example of a computer display screen for adding viewing rights for company representatives.

FIG. 37 is an example of a computer display screen for listing the types of reports that may be generated within a display tool.

FIG. 38 is an example of a display of historical data with associated filters.

FIG. 39 is an example of a keyword filter to allow a company to look for incident reports with certain terms.

FIG. 41 illustrates an example of an incident type filter for particular incident types for historical display purposes.

FIG. 44 is an example of a computer display screen shown in response to clicking the active link of FIG. 43.

FIG. 46 illustrates an example of a computer display screen showing a number of locations from the graphical display from FIG. 45.

FIG. 47 is an example of an expanded view of a particular location using the control of FIG. 46.

FIG. 48 is an example of a read-only view of an incident report.

FIG. 49 illustrates an example of a computer display screen for entering an investigatory note, with an attorney work product designator control.

FIG. 50 illustrates an example of a computer display screen for entering an investigatory note with an attorney work product designator control set to true.

FIG. 51 illustrates an example of a computer display screen for the reporting party to enter an organization search.

FIG. 52 is illustrates an example of a computer display screen having an incident view log associated with a particular incident report

FIG. 55 is an example of a plurality of incident types that may be presented to a reporting person for selection when making an incident report.

FIG. 56 is one example of a display of questions relating to a particular incident type.

FIG. 57 is another example of a display of questions relating to a particular incident type.

FIGS. 58 and 59 are examples of automated follow-up questions in response to a reporting party's answers to initial questions.

FIGS. 61, 62 and 63 illustrate examples of an institution's portal and user groups with notification attributes.

FIG. 65 illustrates an example of a computer display screen having fields for specifying suspects within the report.

FIG. 66 illustrates an example of a computer display screen of the names returned by the system after searching a database using the name provided by the reporting party with an associated confirmation control for selection by the reporting party.

FIG. 70 illustrates an example of a computer display screen having a control for changing the incident type.

FIG. 71 illustrates an example of a computer display screen that allows a company/institutional participant to select or deselect a particular incident for display to a reporting party.

FIG. 72 illustrates an example of a computer display screen showing the reporter portal showing the listing of the incident types in the order selected by the company/institutional participant in FIG. 71.

FIG. 73 illustrates an example of a computer display screen showing a list of stale reports viewable by an administrator.

FIG. 75 illustrates an example of a computer display screen showing a list of incomplete incident reports viewable by an administrator.

DETAILED DESCRIPTION

Figure 1:
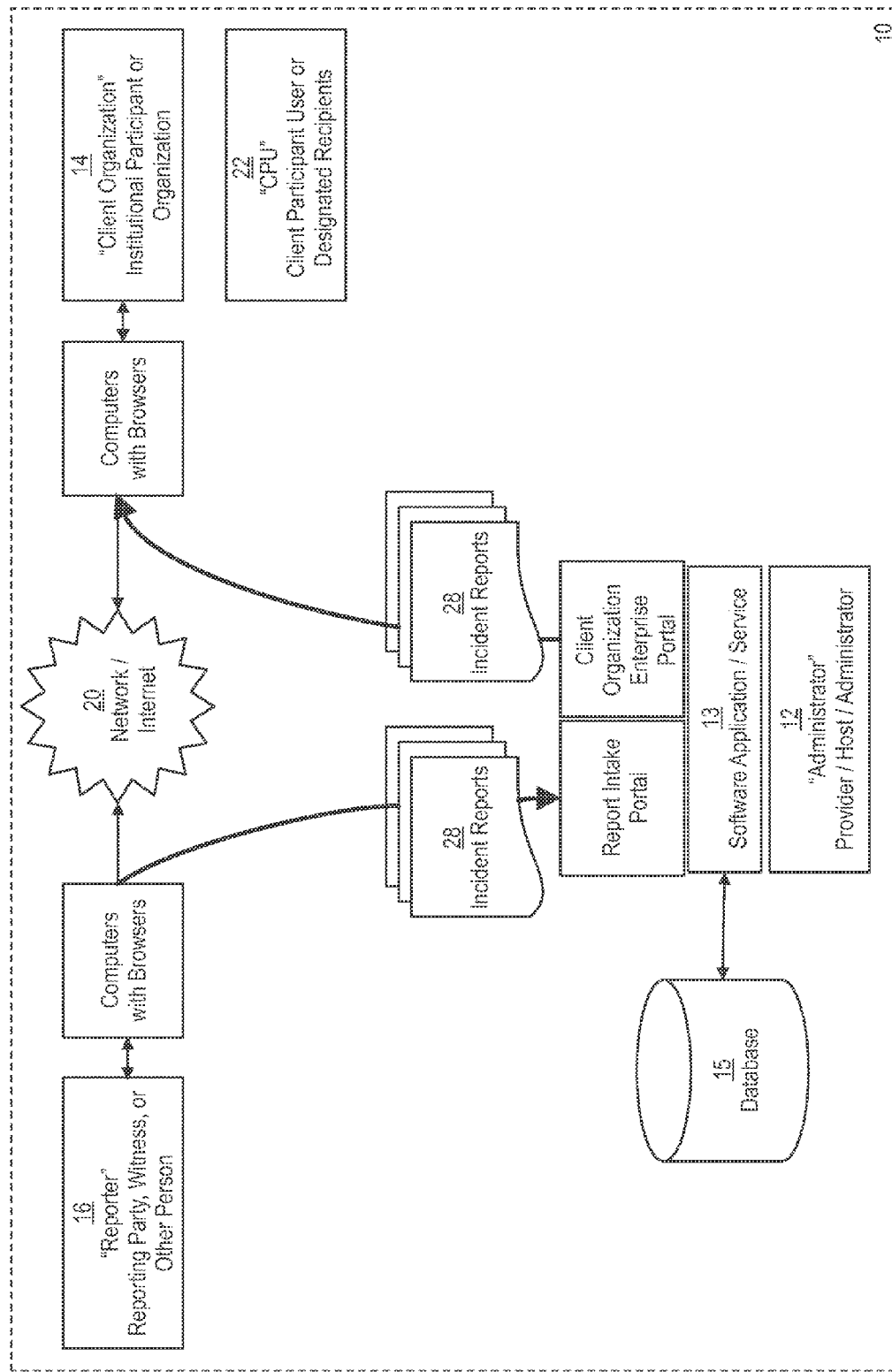
FIG. 1 is a block diagram of an example of an anonymous incident reporting system, in accordance with one embodiment of the present invention.

FIG. 1 illustrates a block diagram of an example of an anonymous incident reporting and communications system 10 for schools, businesses/companies, public institutions, hospitals and governmental agencies, in accordance with one embodiment of the present invention.

The system 10 involves services coordinated by a system provider 12 and utilized by a variety of client organizations 14 (also referred to herein as institutional participants, client participants, companies, governmental agencies, universities and the like) and individual constituent users or reporting parties 16. If desired, the system 10 allows a reporter 16 to remain anonymous, and therefore anonymously and easily report threats of violence, harassment, misconduct including sexual misconduct, discrimination, dishonesty or other concerns in a timely and safe manner over the Internet 20. In addition to incident reporting, reporters 16 can also report workplace accidents, pass along suggestions and obtain safety information. System 10 permits reporters 16 to generate incident reports 28 with a reporter-chosen level of anonymity and instantly transmit them to one or more pre-designated client participant user (CPU) 22 in the client organization 14.

In one example, the system 10 includes a system provider/administrator 12 that provides or hosts, either directly or indirectly, one or more software applications or services 13 which provide a variety of functions to permit and manage anonymous incident reporting. In one embodiment, the system 20 runs on a Microsoft® .Net ("dot net") platform and a SQL database with a 128-bit encryption provided through Secure Socket Layer (SSL) protocols and certificates. In one example, the administrator 12 provides a software program or programs 13 which are accessible by an client organization 14 (such as a corporation, hospital or university) and a reporter 16 (such as an employee, healthcare worker, or student) over a network 20 such as the Internet or an organization's Intranet. The software application 13 may be, in one example, divided into a first client organization interface or portal (shown as the client organization 14 enterprise portal) having an interface and which is configured to receive and transmit data between the client organization 14 and the administrator 12; and a second reporting party interface or portal (shown as the reporter's portal) which is configured to receive and transmit data between the reporter 16 and the administrator 12. In one example, one or more databases 15 are utilized by the administrator 12 and the software application 13 in order to store data relating to the anonymous reporting system 10. Preferably, the operations described herein with reference to administrator 12 are automatically performed by the software application 13 so that the system 10 can operate with little or no human delays introduced by the administrator 12. This is in contrast with existing non-automated systems, where the communication of information may be delayed by one or more persons at the administrator level.

In one example of the present invention, when a reporter 16 observes an incident for which he/she desires to file an incident report 28, the reporter 16 accesses a web site (preferably having software 13 thereon and controlled by the administrator 12) with a plurality of web pages or application services that are made available to the reporter 16 for preparing and filing an incident report. In one example, the reporter 16 selects or provides the following information, which is in no way exhaustive or limiting: the organization name, in response to series of computer display screens and queries generated by the software an appropriate incident type relating to the incident (i.e., Harassment, Discrimination, Workplace Violence, Accounting, Bribery, Misconduct, etc.), a desired anonymity level, the location/date/time of the incident, a description of the incident, the individuals involved in the incident, the incident details and a follow-up password for future communications with a Client Participant User (CPU) 22 over a message board. In another example, if desired by the reporter 16, an incident report 28 may also be made by phone and the live person cycles through the same information. Some screens and queries are standard and provided in all situations, whereas other screens and queries are specialized and are provided in response to the particular information selected or provided by the reporter 16.

Once the incident report 28 is submitted, the report 28 is stored in the databases 15. Preferably and in one example, the raw data content of databases 15 are not directly accessible or editable by either reporter 16 or client organization 14. The data stored in the databases 15 are accessible and viewable to the reporter 16 and the client organization 14 through the portals of software application 13 which limit access and privileges with respect to the incident report data. Typically, raw data content is neither directly accessible nor editable by the administrator 12.

Various features and functions that may be included in the anonymous reporting system 10 and the related software application 13 are disclosed. The anonymous reporting system 10 may be configured by the administrator 12 to provide anonymous reporting capabilities for a variety of client organizations 14, and their numerous individual constituents or potential reporters 16. For example, if a client organization 14 desires to provide anonymous reporting capabilities to its employees 16, then the client organization 14 may subscribe to an anonymous reporting service provided by administrator 12. The client organization 14 may then establish with the administrator 12 a plurality of various characteristics or attributes of the anonymous reporting system in order to customize the presentation to a reporter 16 through the reporter's portal.

For instance, as disclosed herein and in accordance with an embodiment of the present invention, the client organization 14 may customize the type of reports and the specific questions posed by each different type of report available for use by the reporter 16. As another example, the client organization 14 may set up and establish, through one or more computer display screens of the client organization's portal, how incident reports 28 are distributed within the client organization 14 to CPUs 22. The client organization 14 may also establish a variety of differing levels of privileges for managing incident reports 28 that are received by the client organization 14.

Generally, once the client organization 14 has configured its account with administrator 12 through the client organization's portal, administrator 12 then activates the service which permits employees 16 of the client organization 14 to submit incident reports anonymously over network 20 to administrator 12 through the reporter's portal. Upon receipt of incident reports 28, the administrator 12 electronically notifies the pre-designated CPUs 22 of client organization 14 of the receipt of an incident report 28. In one example, the administrator 12 automatically and substantially in real-time notifies the pre-designated CPUs 22 of client organization 14 that an incident report 28 has been received, preferably via electronic mail (email). The client organization 14, through one or more of its pre-designated CPUs 22, can then access the report, typically in a read-only manner, as it is stored by administrator 12 in database 15.

In one example, an anonymous reporting system 10 may generate, upon the submission of an incident report 28 by a reporter 16, at least two unique numbers associated with the incident report. First, internal report number may be generated which is adapted to be used by the client organization 14 in association with a particular incident report 28 for purposes of tracking and auditing. Preferably, the internal report number is not made available or seen by the reporter 16. Second, external report number, also described herein as an access number, may also be generated and associated with an incident report. The access number is provided only to the reporter 16, and is not accessible by the client organization 14. In one example, both the internal report number and the external report number are maintained in databases 15, which, as described above, are not accessible by either the reporter 16 or the client organization 14.

Figure 1A:
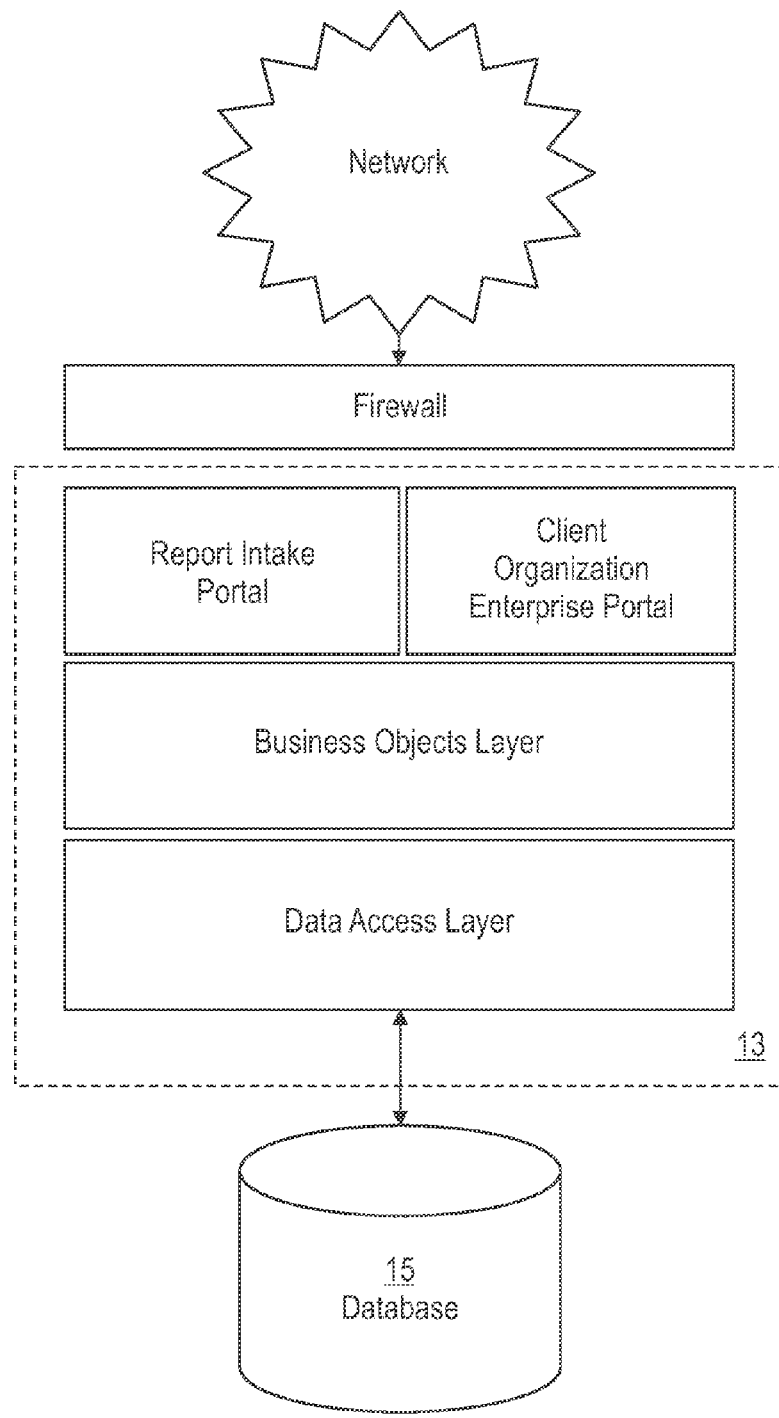

FIG. 1A illustrates an example of a block diagram of software 13 that is provided by or operated by administrator 12. In one example, a firewall may be provided between the software 13 and the network connections. The firewall may be configured so that direct access to the raw data within the database 15 is not permitted. In one example, the software 13 includes a reporter's portal, and client organization's enterprise portal. The reporter portal/interface and client organization enterprise portal/interface typically comprise a graphical user interface for use with a browser on a computer connected to a network. The reporter's portal may include code that generates the web pages which gather and intake information from a reporter 16 relating to an incident in order to form an incident report. The reporter's portal may also include code for reporting on the status of an incident report, as well as providing for message board functionality.

The enterprise portal may include code segments to provide data relating to incident reports to a particular client organization 14 for which the incident report corresponds. The enterprise portal may also include code segments for setup of the client organization 14 and its CPUs 22, along with hierarchical reporting structures. The enterprise portal may also include code segments for providing incident report 28 tracking and auditing, as well as statistical analysis, displays, and message board functionality as described above. The software 13 may include a business objects layer which specifies user interface pieces and application logic, and may also include a data access layer which handles access of data to and from the relational database, and provides data to the business objects layer as required by the portals under the data request of the reporters 16 or CPUs 22. It is understood that FIG. 1A is provided by way of example only, and that one or more features of an anonymous reporting system 10 or software 13 may be implemented through the use of software architectures other than those shown in FIG. 1A.

Figure 2A:
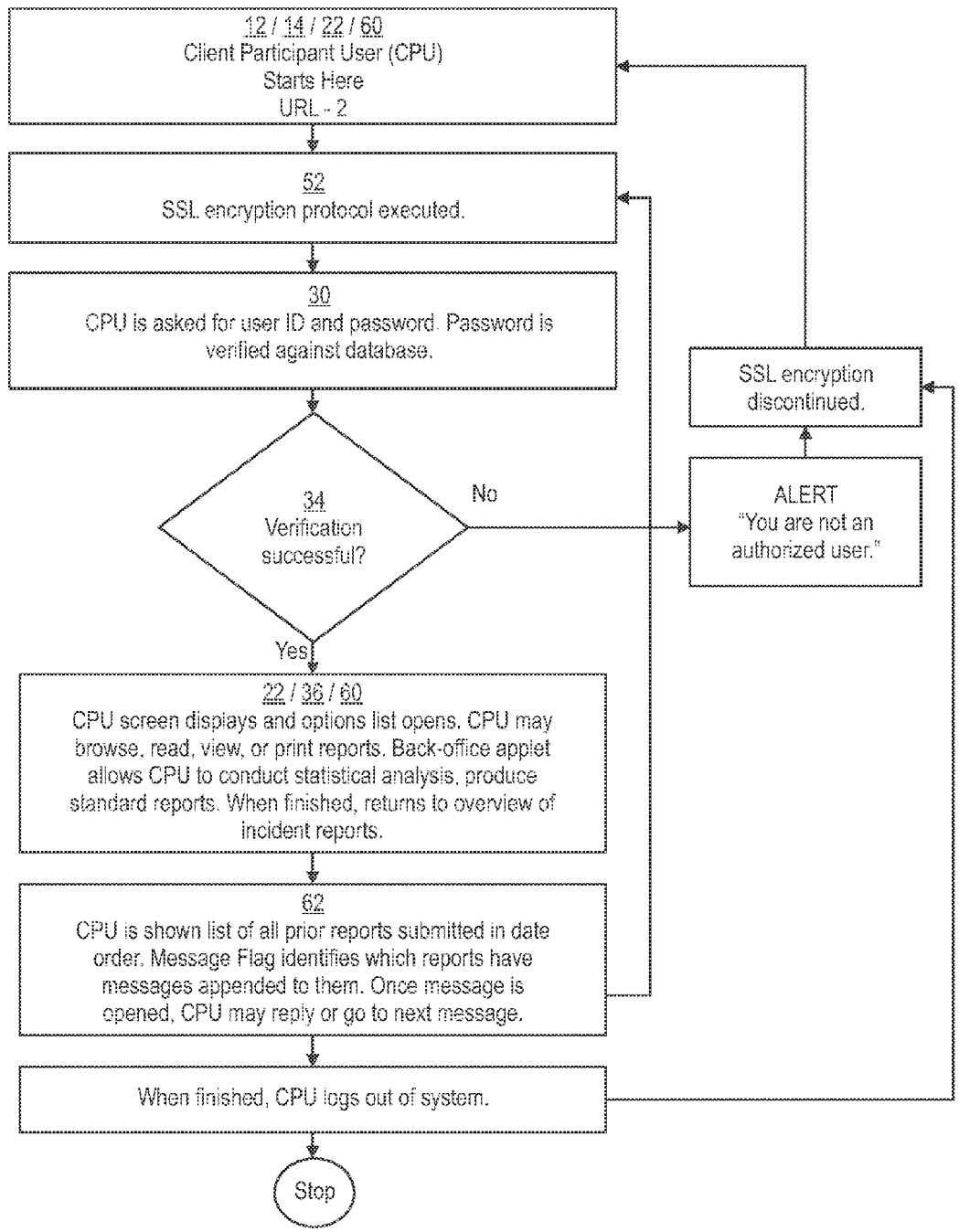
FIG. 2 (including FIGS. 2A and 2B) illustrates an example of a set of operations that may be performed in one example of an anonymous reporting system, in accordance with one embodiment of the present invention.
Figure 2B:
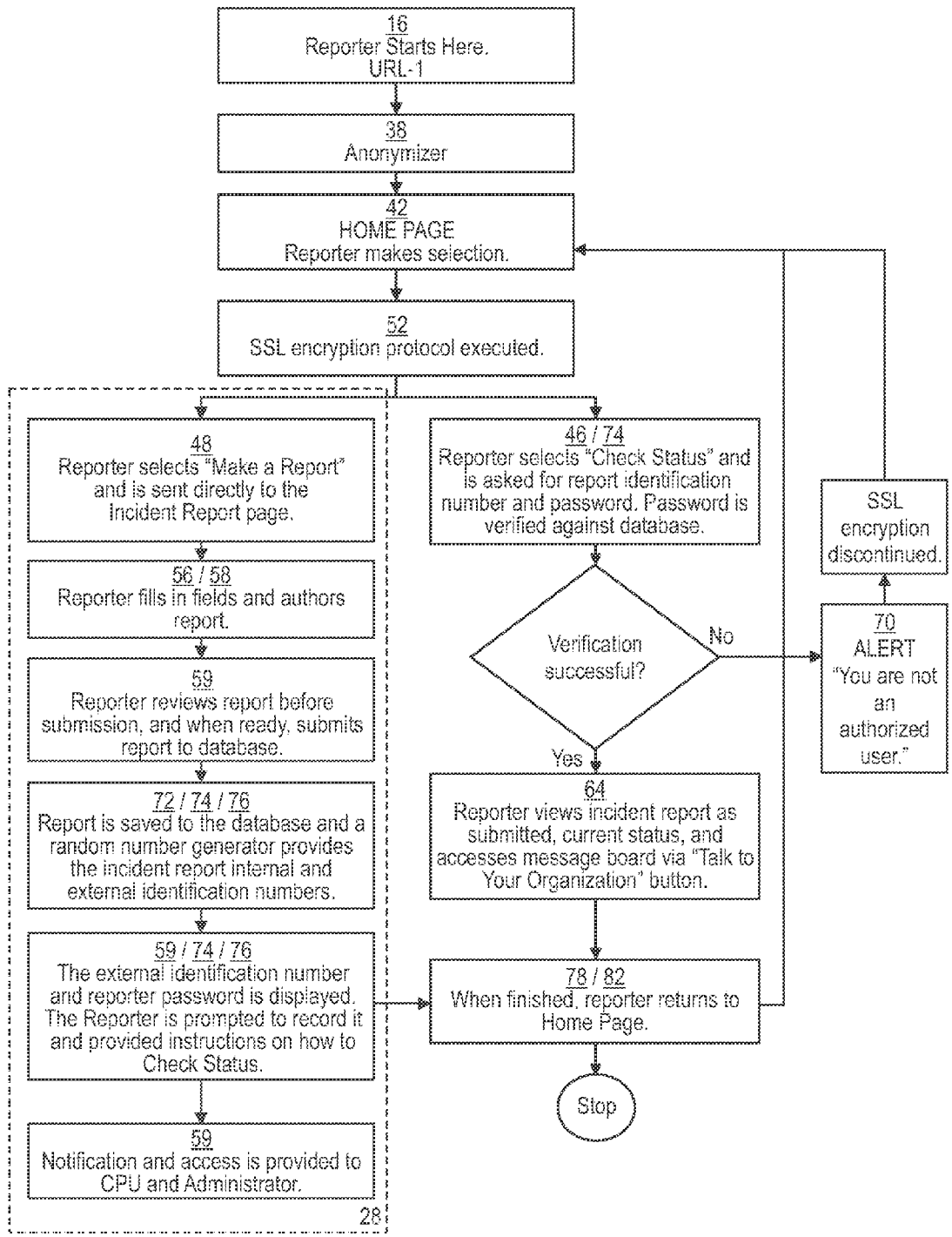

One embodiment of the invention is shown in a flowchart manner in the illustration of FIG. 2 (shown as divided into FIGS. 2A and 2B for presentation purposes). The illustrated embodiment shows one particular example of the operations of the system 10 in response to an access request 26 by any client organization 14. There are numerous combinations of functions and features that may be possible using the features and functions illustrated in FIGS. 2A and 2B, however, one particular example is shown to illustrate several features in a particular combination without limiting the combination to the one example. The access request may be direct, such as in a secure online electronic access over the Internet or through a client organization's 14 Intranet portal used to access the same, or indirect, where a telephone report is provided and concurrently entered into the system 10 by personnel of the administrator 12. The interface 24 with the system 10, whether directly or delayed (as in the case of telephone communication), is through the website 27 which is provided by the administrator 12. One or more websites 27 may be provided, with each being customized to the requirements of the particular client organization 14.

In one example, upon submission of a report 28 (regardless of type), reporters 16 are immediately issued a confidential access number 30. The access number 30 allows the reporter 16 to anonymously follow up on his or her report 28 at a later date, and provide additional information or assist further if necessary. Services, whether accessed via telephone 18 or the Internet 20, are available to reporters 16 at any time of day or night, seven days a week.

A website component 27 may be provided. FIGS. 2A and 2B illustrate an example of how the user interfaces 24 with the website 27 through the Internet 20 and how the information provided is managed and disseminated. The process allows anonymous and encrypted communications between the reporter 16 and a pre-assigned CPU 32. The CPU 32 will typically be associated with the system provider 12 and may administer the service for a variety of separately maintained services for CPU 22. The reporter 16 is permitted to create and print reports 28, as well as respond to inquiries 34 posted by the CPU 32. The CPU 32 may browse, read, view, and print those reports 28. A back-office application 36 allows the CPU 32 to use reports 28 to conduct statistical analysis, create charts, and print custom reports.

In one example, the system 10 may include an optional "anonymizer" 38 feature. The anonymizer 38, in one example, operates as follows: upon entering the site 27, the reporter 16 is immediately anonymized. All identifying information is rendered unintelligible and is immediately purged when the reporter 16 leaves the site. The reporter 16 will remain anonymous until he leaves the site.

In one example, from the HOME PAGE 42, the reporter 16 makes a choice by selecting "Check Status" 46, "Make a Report" 48. Typically, in each case, an SSL (Secure Socket Layer) encryption protocol 52 is executed. The reporter 16 will be alerted to such by a message window and the appearance of a small padlock icon 54 appearing in the tool tray of their browser. Double-clicking on this icon 54 will reveal the digital certificate assigned, confirming encryption. SSL encryption services will be provided for the site by a commerce vendor, such as Verisign.

Regardless of the nature of the report indicated, which will depend entirely on the situation, report data 56 of indefinite length may then be entered. The system 10 provides a word processor data entry screen 58 which allows the reporter 16 to enter and edit, in a report form 59, whatever sort of information is desired. The word processor screen 58 remains open until the reporter 16 has determined that the data entry is complete and has submitted it to the system 10. Any information or report provided by the reporter 16 while SSL is enabled will be encrypted until notified otherwise. When the reporter 16 leaves a secured portion of the site, encryption will conclude and the padlock icon 54 will disappear from the toolbar.

Administrative rights can be granted to designated CPUs 22 (usually security personnel associated with the subscriber participants 14). These participants will be a part of the group called administrators 32. In one example, administrators 32 will be provided an "Access Code" and access number 30. Upon verification against a database, administrators 32 may view reports created by their associated reporters 16 (e.g. their employees or students).

Reports 28 created by reporters 16 will be stored in a relational database (see below for how reports are created). Administrators 32 may browse, read, view, and print reports 28. The back-office application 36 allows them to conduct statistical analysis, create charts and print custom reports for their own purposes.

In one example, an administrator 60, who will typically be a person associated with and controlled by the system provider 12 will have rights to perform any administrator function, assign access numbers and access codes, as well as post messages in response to user reports. Only the administrator 60, a designated CPU 32, and the report's author (the specific reporter 16 who generated the particular report 28) will be permitted to view prior reports and administrator postings, in one example.

A "message flag" 62 will identify reports 28 within the database with messages 64 posted by the administrator 60, which allows the reporter 16 and the administrator 60 to have electronic dialogue (much like email) where both remain anonymous. When the reporter 16 next logs on they will be able to select the "Check Messages" 46 on the HOME PAGE 42 and will have an opportunity to review and reply to the messages 64 from the administrator 60.

The report 28 will be distributed to pre-determined CPUs identified by the client/subscriber 14.

In one example, the reporter 16 submits a report and obtains a user and report specific access number 74. The reporter 16 is prompted to submit the report 28 and in doing so, is shown a non-editable rendition of the report. The reporter 16 is then provided the option to "Submit Report" or "Redo" 78. Selection of "Redo" returns the reporter 16 to the incident report form. Once the report is submitted, a random number generating method 76 produces a unique nine-digit access number (or of other length) which becomes the User access number 74 associated with the report 28. The reporter 16 is instructed to manually record this. Simultaneously, the user access number 74 is coupled to the report 28 and saved in a database.

Submission of the report 28 immediately results in the system 10 emailing the report to the administrator 60 and any designated recipient 22 (selected system provider managers or report reviewers). In one example, the report 28 is also bounced against a "Fuzzy Database" 80 in an effort to identify the client administrator or client-designated recipient. Because the website 27 is open and entry is not password protected, anyone with Internet access can enter the site and create/submit a report 28. As such, the reporter 16 cannot be provided pull-down lists of all clients to identify and select his/her employer or school because of confidentiality concerns. Additionally, any typographical error or misspelling on the part of the reporter 16 may make the identity of the corresponding client organization 14 impossible to determine electronically. The "Fuzzy Database" 80, containing permutations of the names of subscriber clients 14, will be used to link the user's report 28 to the proper client organization 14. Once linkage is accomplished, the report 28 will be emailed to the pre-designated client recipient 22. If no match is found, the report 28 is forwarded to a default CPU 32 who determines future handling.

The user access number 74 created in the process will allow the administrator 60 to post messages 64 to a desired report 28. In turn, reporters 16 may later return to the site and retrieve those messages 64 by identifying him/herself only with the user access number 74. Upon re-entry to the site 27, a reporter 16 retrieving messages may append an existing report 28 or create a new one. A new report 28 will generate a new user access number 74.

As described above, the present invention is utilized in the context of safety, security and personnel management applications, particularly in schools and the workplace. The system 10 is adapted to be accessible to any interested party with access to websites 27. Potential client organizations 14 will typically be institutions, either academic or corporate, with concerns about controlling incidents which may presage more serious future conduct.

For the above and other reasons, it is expected that the anonymous reporting system 10 of the present invention will have widespread industrial applicability. Therefore, it is expected that the commercial utility of the present invention will be extensive and long lasting. Further, recent enhancements to the above-described anonymous reporting system may include the ability to include one or more various features as disclosed herein. For example, report forms may be provided that are tailored to the type of incident to be reported. Such a system is described in further detail below.

For example, an individual wishing to make a report may access a website such as www.mysafeworkplace.com (or www.mysafecampus.com, www.mysafehospital.com, or other such web addresses for system 10) where they can make a selection to indicate they wish to make a report. After making this selection, they may be redirected to a secure site where they are asked to enter the name of the organization or entity for which a report is to be made. For example, the individual may be asked to enter the first three letters of the organization's name. If the three entered letters are recognized, then a generic report form relative to that client organization 14 appears for the reporting individual to complete. The individual is asked to confirm the full name of their organization and any subsidiaries upon which they intend to make a report.

Figure 3:
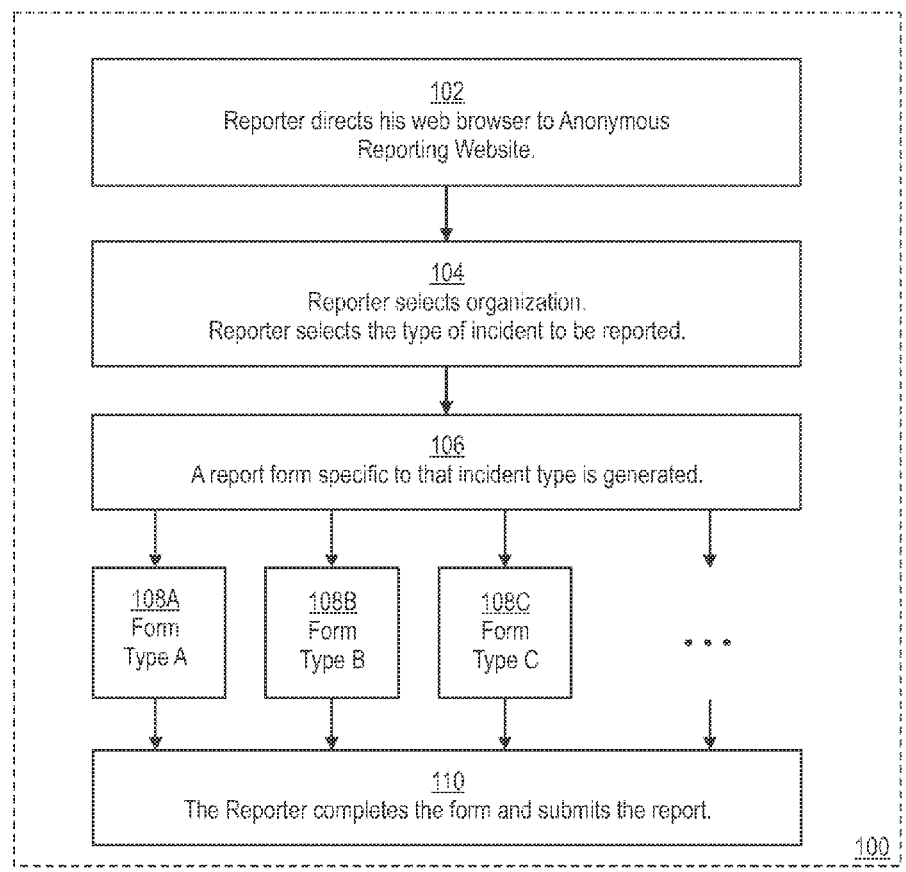
FIG. 3 is another example of a set of operations that may be performed in one example of an anonymous reporting system, in accordance with one embodiment of the present invention.

As shown in flowchart 100 in FIG. 3, after accessing the website (102) the individual is asked what type of report they wish to submit. After selecting a type of report (104), the screen automatically changes to provide a report form (106) that is tailored to the type of incident to be reported. For example, an incident entitled "Accounting Error" would result in a different report form to be generated than would selection of an incident such as "Fraud", "Harassment", "Theft", or "Workplace Violence." The reporting individual then completes and submits the form (108).

Figure 4:
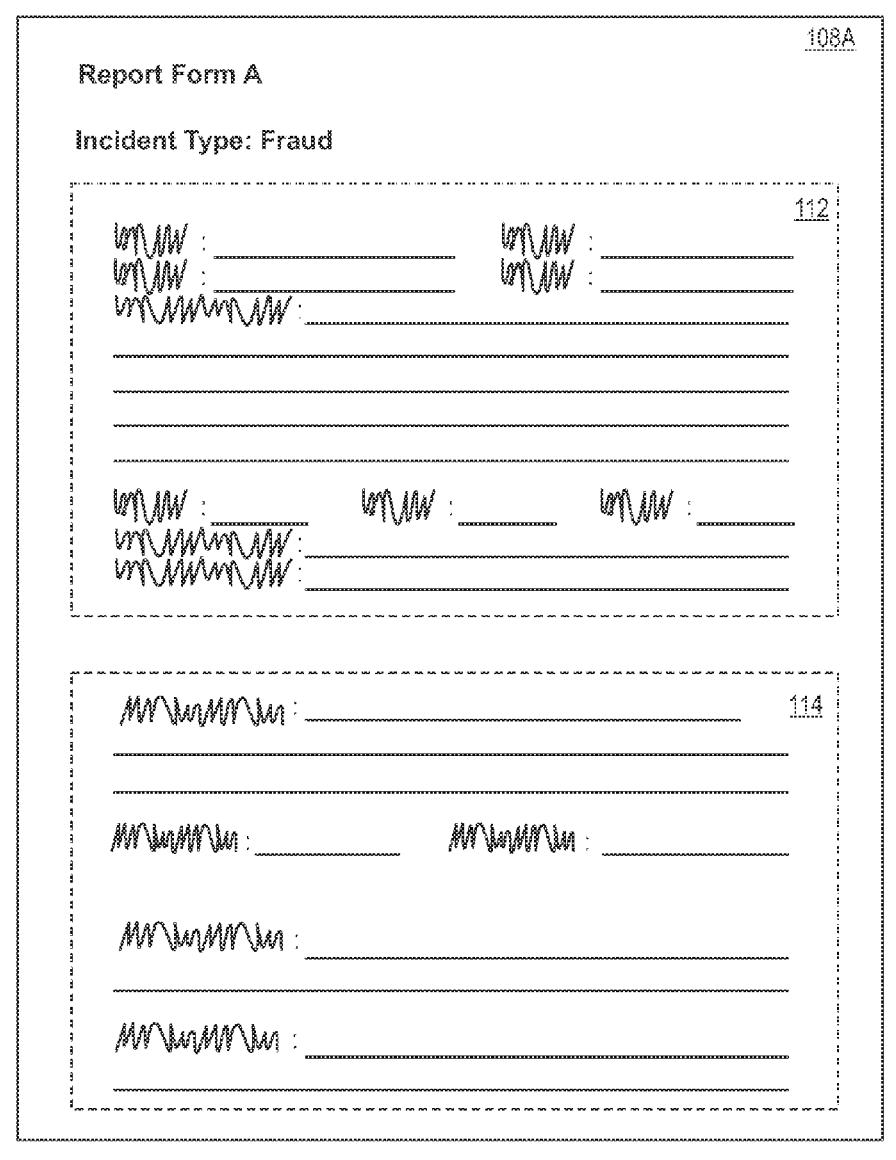
Figure 5:
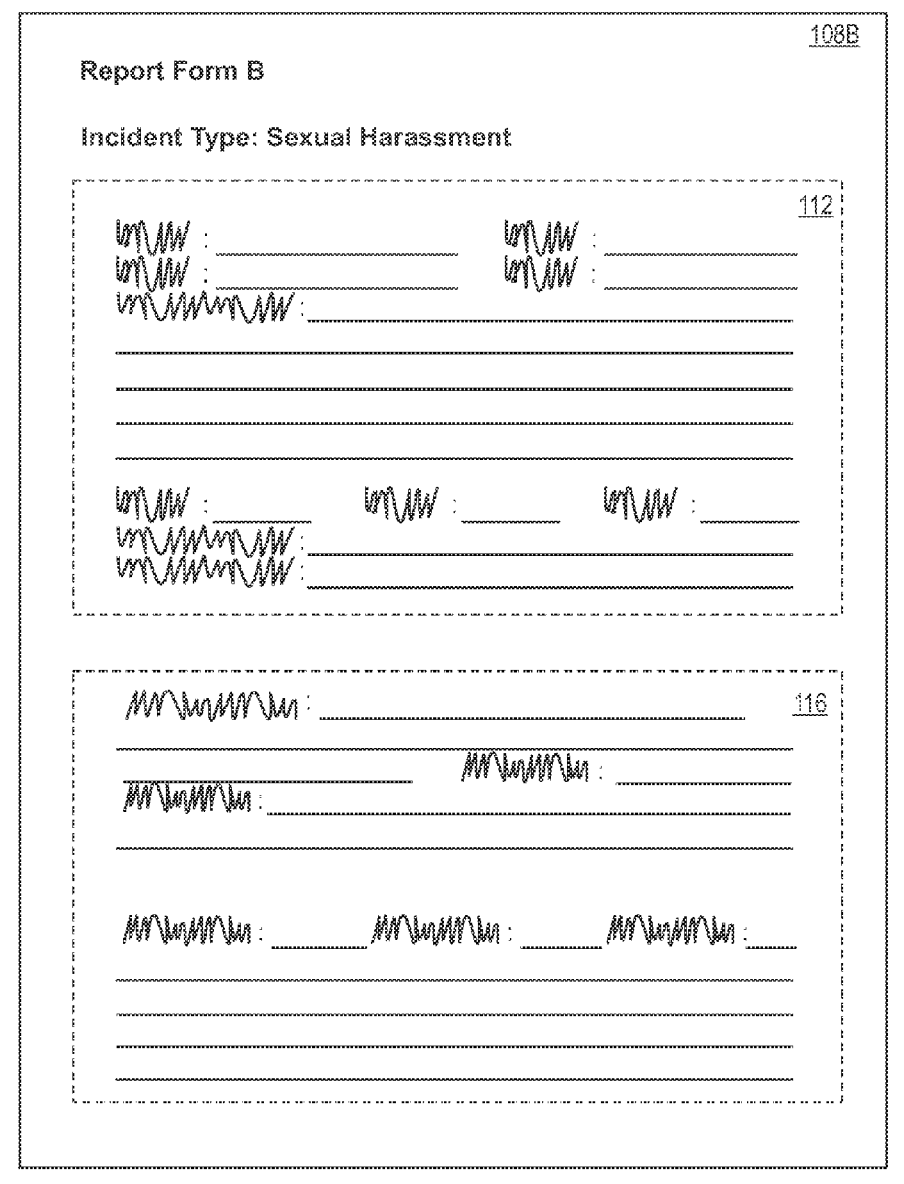
Figure 6:
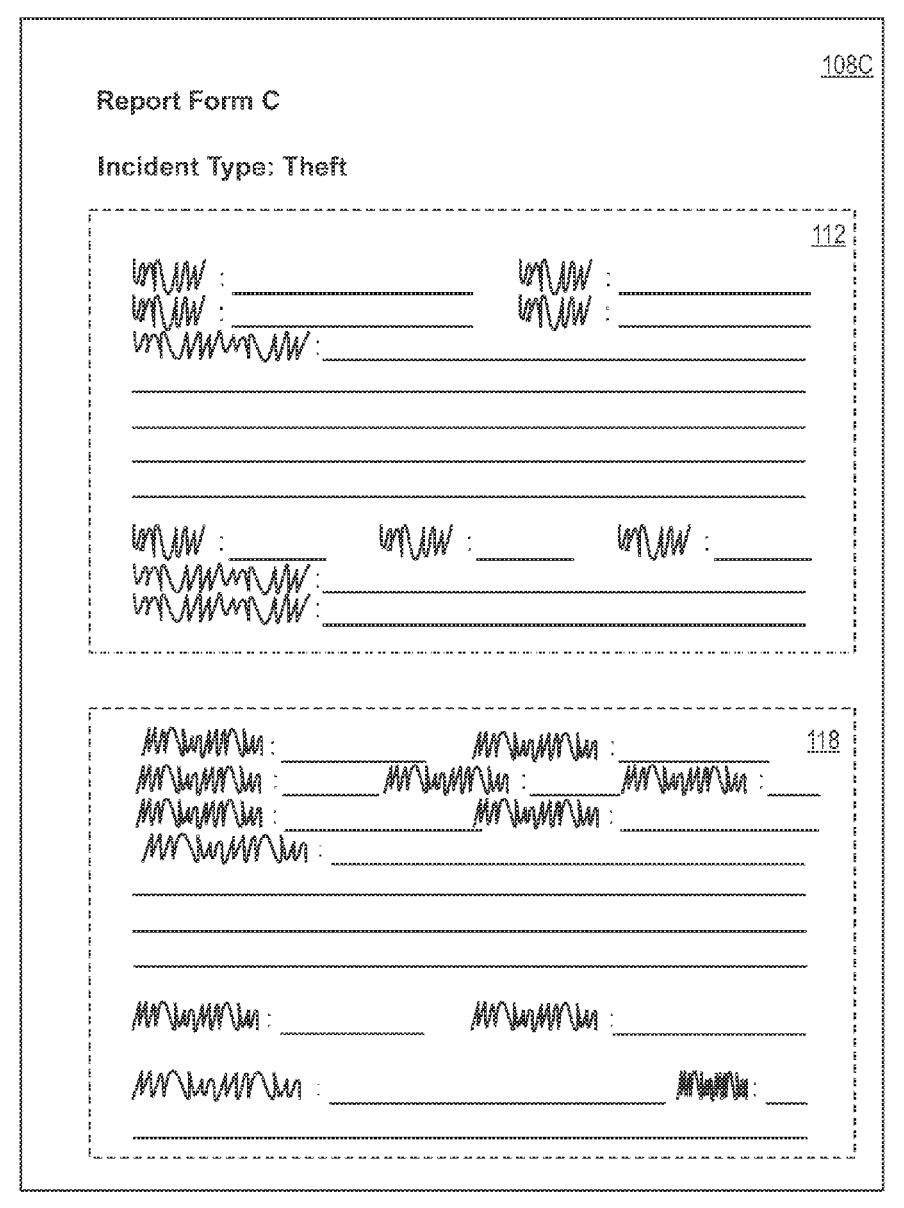

Examples of some report forms that are specific to various types of incidents to be reported are shown in FIGS. 4, 5 and 6. In FIG. 4, the form 108A relates to an Incident Type of Fraud. The form 108A includes a section 112 of questions that are common to each of the types of forms. The form also includes a section 114 of questions that are unique to each of the types of forms. Similarly, FIG. 5 shows a form 108B that relates to an Incident Type of Sexual Harassment. The form 108B includes a section 112 of questions that are common to each of the types of forms. The form also includes a section 116 of questions that are unique to that type of form. Similarly, FIG. 6 shows a form 108C that relates to an Incident Type of Theft. The form 108C includes a section 112 of questions that are common to each of the types of forms. The form also includes a section 118 of questions that are unique to that type of form.

It can be appreciated that the anonymous reporting system may be administered by one entity, such as the entity that maintains and administers the www.mysafeworkplace.com website.

Various companies, institutions or customers may engage this administrator/entity to list those customers as organizations at the entity's anonymous reporting system website so that reporting individuals can make reports about those customers (these customers may be referred to herein as client organizations, among other terms used herein). The individuals who visit the website and make reports are referred to herein as reporting individuals, reporting parties, or reporters 16, among other terms. Thus, it can be appreciated that each of the administrator, the client organizations, and the reporting individuals have different rights and abilities to modify the website and enter data there.

The following sections illustrate and describe in greater detail various aspects and features associated with the anonymous reporting system 10. It should be appreciated that the description is in no way meant to be limiting of the associated heading, and may be implemented and/or coded in software or otherwise without departing from the scope and spirit of the overall system. As such, one of skill in the art reading the description and viewing the illustrations, screen shots and flowcharts may decide to reorder or eliminate certain aspects and/or features without departing from the underlying scope and spirit of the system and its features.

Entering the Enterprise and Report Portals

Figure 6A:
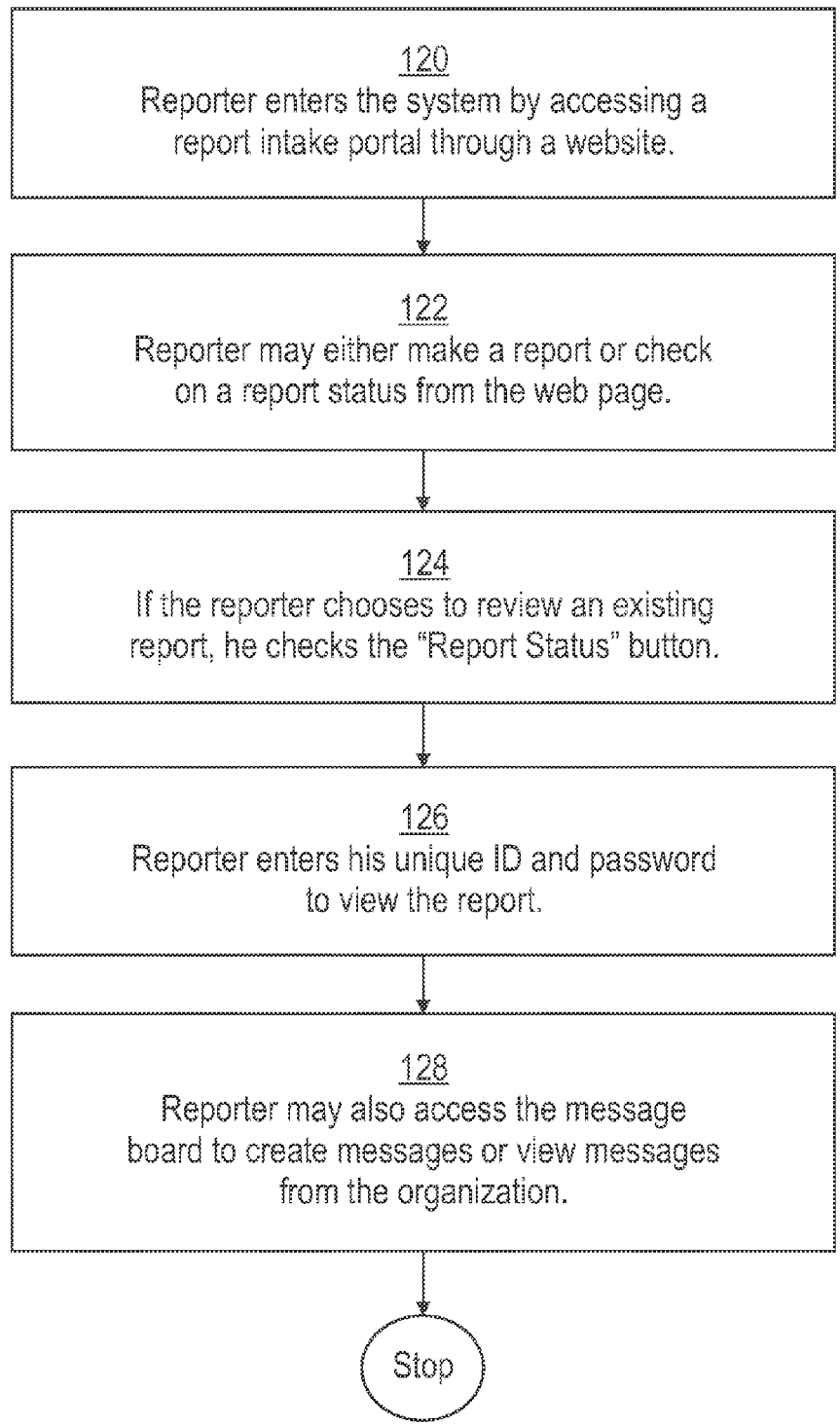
FIG. 6A is a flow chart illustrating one example of a reporting party entering a reporter portal through a website.

As illustrated in the flowchart of FIG. 6A, in the illustrated example, the reporter 16 enters the System by accessing www.mysafeworkplace.com through any internet browser (120). Typically, the Internet site is secure with the data transferred from the reporter 16 encrypted, however, the site does not have to be secure and the data transfer does not need to be encrypted to operate as intended. A secure website and data encryption provides an added level of security to the exchange of data between the reporter 16 and an intermediary/system provider. The System provides the Reporting Party two options (122) on its home page to enter the reporting portal: "Make A Report" or "Report Status." If, subsequent to filing the initial report, the Reporting Party moves the on-screen cursor over the "Go!" button for "Report Status" and performs a mouse click operation the system 10 opens a new page and prompts the reporter 16 to enter his "Login" information (124). The reporter 16 will enter a unique "Access Number" which the system 10 provided at the conclusion of filing the initial report. The Reporting Party will also enter his unique "Password" which the reporter 16 created when he filed his initial report (126). Upon clicking "Submit," the system 10 will open a new page to allow the reporter 16 to view his initial report.

As shown in the illustrated example, from the report page, the reporter 16 may access the System's "Message Board" by selecting a GUI button "Talk to Your Organization."In one example, the user is viewing a GUI with a button labeled Talk to Your Organization (128). and moves the mouse cursor over the GUI button and clicks the mouse to activate the choice. In response to the mouse click, the software program performs a series of operations to move the current GUI page to another GUI page having a message board specific to his/her report. In one particular embodiment the mouse click-to-new GUI screen operation is implemented in Microsoft .Net, however, any programming language may be used without departing from the scope of the invention. As stated, the system 10 opens a new GUI window that provides the message board specific to the reporter's 16 report. If the CPU 22 has posted a message, the system displays certain information about the message, such as message subject, author and date to name a few. The reporter 16 may then move the cursor over the HTML link. Activating a mouse click on the message subject HTML link displays the content of the CPU's 22 message in a new page. If the reporter 16 desires to post a message for the CPU 22, he will move the cursor over a GUI button titled, "New Dialogue" and click the mouse to activate the operation. The system opens a new page with a subject line and message body field for the reporter 16 to type free-form text.

Figure 6B:
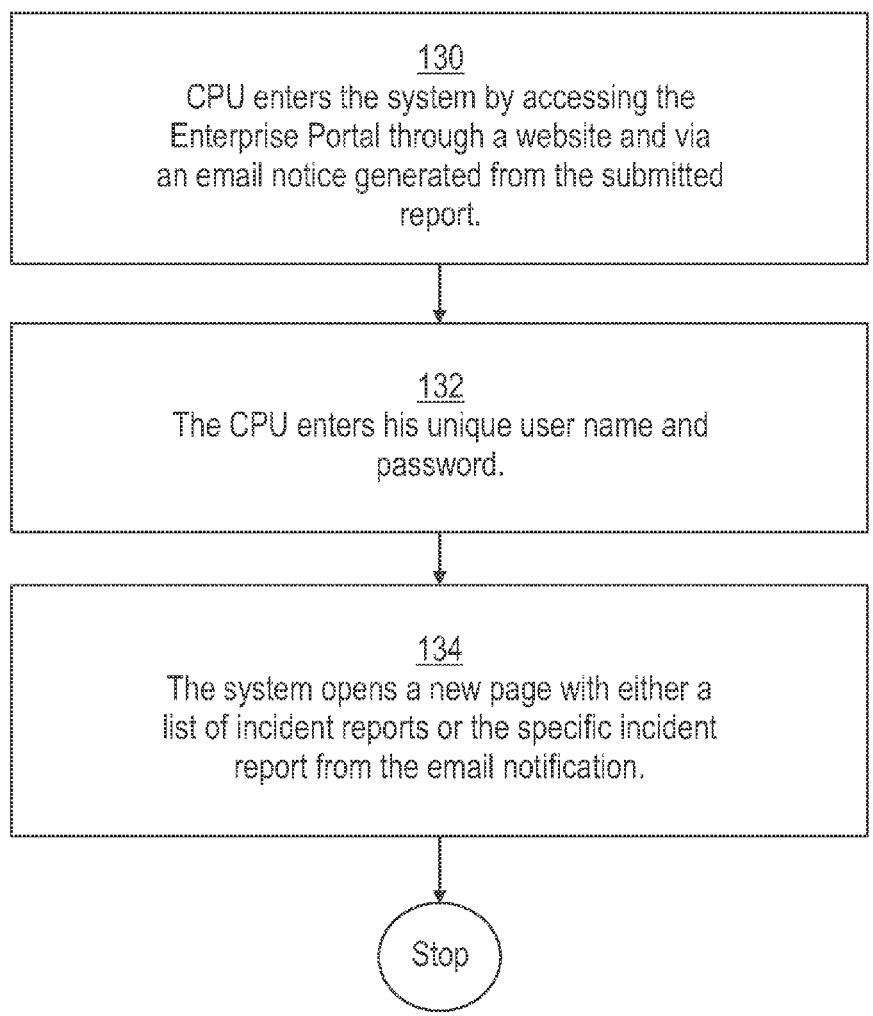
FIG. 6B is a flow chart illustrating one example of a client participant entering an enterprise portal through a website.

Referring now to the illustrated example of FIG. 6B, the client organization 14 enters the system's enterprise portal by accessing www.mysafeworkplace.com/[clientidentifier]/login.aspx through any internet browser. The [client identifier] tag is the unique location assigned to the CPU 22 within the system, thereby creating a URL unique to the CPU 22 so that all viewable information associated with the CPU 22 may be accessed. The system 10 provides the client organization 14 with a login page prompting him to enter a unique username and password. In response to the unique username and password, the system 10 opens a new page providing an incident report overview of reports the client organization 14 has received from a variety of reporting parties 16 and clicks the mouse to select the particular incident number. The client organization 14 may move the cursor over any incident number listed on the page. The system 10 opens a new page displaying the specific incident report. In one example, each incident number is an HTML link to the underlying report, so that selecting the particular incident number will automatically open the new page displaying the selected incident report.

The client organization 14 may alternatively enter the system 10 via the email notification automatically generated by the system 10 when a report is received by the system 10. When the client organization 14 receives an email notification, he may move the on-screen cursor over the unique incident report number and generate a mouse click, which the system 10 designates as a hyperlink directly to the specific report. The system 10 will then open a new Internet window providing the client organization 14 with a login page prompting him to enter a unique username and password. After the client organization 14 enters his username and password, the system 10 opens a new window displaying the specific incident report referenced in the email notification. If the client organization 14 has previously logged into the system 10, the system will bypass the login page and immediately display the specific incident report in a new window.

Selectable Levels of Anonymity

In one embodiment of the invention, an anonymous reporting system 10 may be provided with a plurality of different levels of anonymity for reporters 16 to utilize. In one example, a first level of anonymity includes complete anonymity wherein no contact information or personal identification information (e.g., name, telephone number or e-mail address) is provided by the reporter 16 in filing the incident report 28. In this way, the reporter 16 can submit an incident report 28 with complete anonymity, both towards the client organization 14, as well as towards the administrator 12. In one example, the anonymous reporting system 10 may utilize a computer display screen which provides the reporter 16 with a selection of a plurality of levels of anonymity, as illustrated in FIG. 7. In the example of FIG. 7, a computer display screen or graphical user interface (GUI) provides a drop-down menu for the reporter 16 to select from three levels of desired anonymity. In this example, if the user selects "remain completely anonymous" as the anonymity level, then the computer display screen removes the queries for identifying information, such as name, phone numbers, personal e-mail addresses, etc., as is shown in one example in FIG. 8.

In FIG. 8, once the reporter 16 has selected an anonymity level of completely anonymous, the computer display screen is provided with one or more fields requesting that the reporter 16 provide a password which the anonymous reporting system 10 will associate with this incident report. As will be described below, once the reporter 16 submits the incident report with the follow-up password, the anonymous reporting system 10 randomly generates an access number for the reporter 16 and notifies the reporter 16 of this access number. The reporter 16, after submitting the incident report, may engage in follow-up communications with the client organization 14 using only the access number and follow-up password, without any personally identifying information, such that the reporter's 16 anonymity may be maintained. FIG. 9 illustrates an example of a computer display screen wherein the anonymous reporting system 10 communicates a unique access number to the reporter 16 after the reporter 16 has submitted an incident report.

A second level of anonymity may include anonymity towards the client organization 14. In this example, the reporter 16 provides identifying information which may include name, telephone numbers, personal e-mail addresses, etc.; however, this information is received only by administrator 12 and stored in databases 15, but not made available whatsoever to client organization 14. Hence, in this example, the administrator 12 obtains information to facilitate easy and quick follow up communications, but the administrator 12 does not supply such identifying information to the client organization 14. FIG. 10 illustrates an example computer display screen wherein the reporter 16 has selected to remain "anonymous toward your organization" and wherein a set of personal information fields are provided in order to obtain identifying information from the reporter 16.

In one example, another level of anonymity may be provided which is effectively "no anonymity" wherein the client organization 14 and the administrator 12 are both made aware of the identity and contact information of the reporter 16. In this example, a computer display screen may be generated by the system 10 in a manner similar to FIG. 10, except that the information obtained from the reporter 16 will be reported by administrator 12 to the client organization 14.

Figure 11:
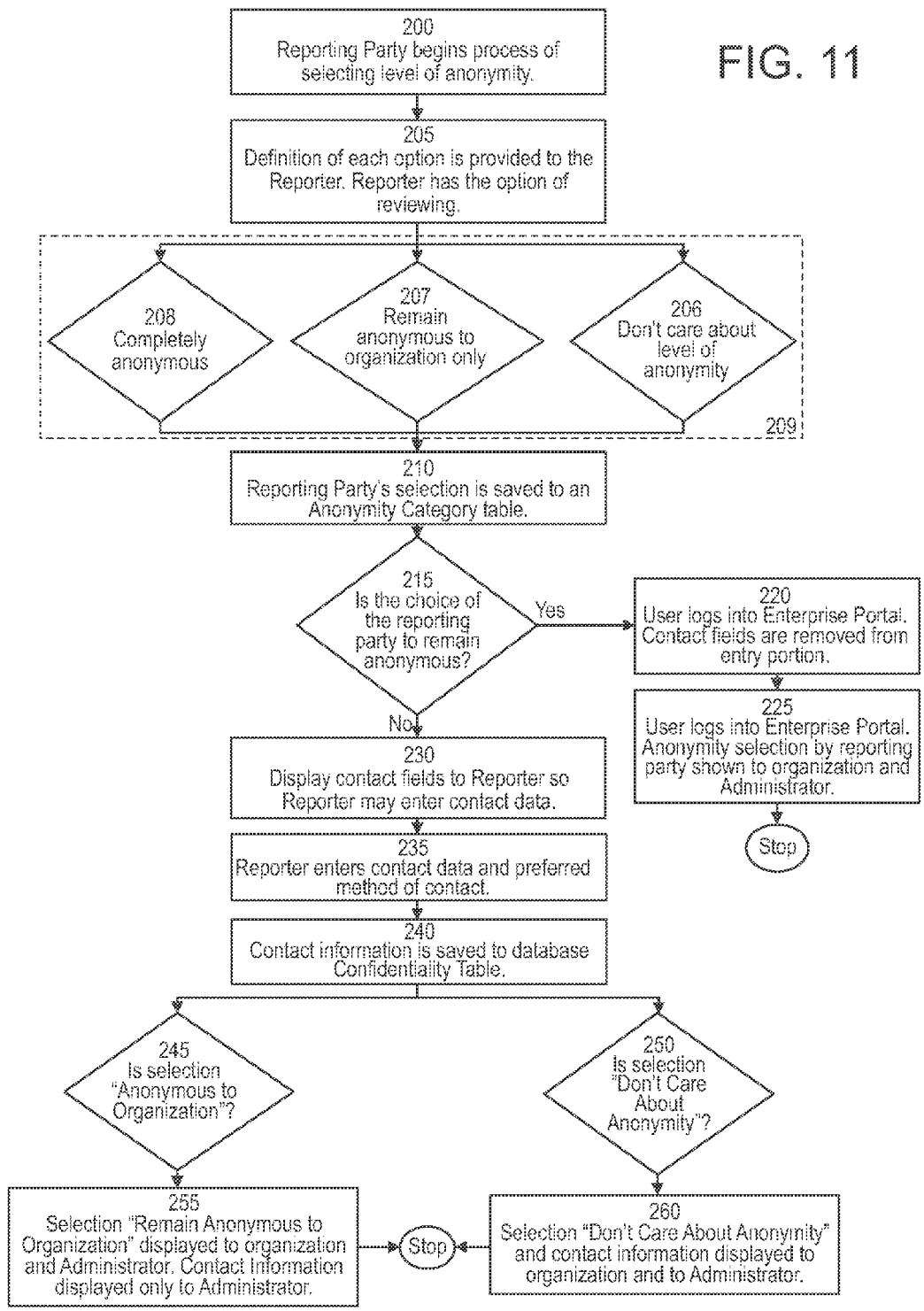
FIG. 11 is a flowchart showing an example of the reporting party selecting levels of anonymity.

As illustrated in the flowchart of FIG. 11, the system 10 allows the reporter 16 to select the level of anonymity the reporter desires (200), by prompting with the question "Do you wish to remain anonymous?" The system 10 provides three options in a drop-down menu (209) for the reporter 16 to chose from: "Remain completely anonymous" (208); "Remain anonymous toward your organization" (207); and "Do not care about anonymity" (206). The system 10 provides an optional pop-up window, titled "Explain", which provides definitions for each of the three levels of anonymity to allow the reporter 16 to review prior to selecting anonymity level (205). The reporter 16 makes his anonymity selection, which the system saves to a database (210). In one particular embodiment, the anonymous selection is stored in an anonymity category table in a relational database program such as SQL, however, any suitable database program may be used.

If the reporter 16 selects "Remain Completely Anonymous" (215), the system 10 automatically hides all contact fields where the reporter 16 would otherwise enter his identifying information (220), including name, email address, and phone numbers. The system 10 displays the reporter's anonymity category selection 12 of "Remain completely anonymous" (225) for the client organization 14 and the administrator 12 to view.

If the reporter 16 selects "Remain anonymous toward your organization" or "Do not care about anonymity", the system 10 displays the following contact fields, "Your name", "Day phone number", "Evening phone number", and "Personal Email" (230). The reporter 16 completes each contact field (235). In some cases, data must be entered into certain fields for the reporter 16 to continue to the next screen and therefore continue with the reporting process. In the illustrated embodiment, the reporter 16 would be required to enter his name, a daytime phone number and an evening phone number with personal e-mail being optional. The required fields for the illustrated embodiment should not be limiting as any combination of fields may be required prior to continuing the reporting process. The system also asks the reporter 16 to select a response to the question "How best may we contact you?" and provides a drop-down menu including the options of "Day Phone", "Evening Phone", "Personal Email", or "Any of the above". When the reporter 16 completes the contact fields, the system 10 automatically saves the data to a database (240). In one example, the information provided in each contact field is stored in a confidentiality table in a relational database program such as the one described for the anonymity category table.

If the reporter 16 selects "Remain anonymous toward your organization" (245), the system 10 displays that anonymity category selection for the client organization 14 and the administrator 12 to view. The reporter's 16 contact data that the system 10 saved to the database is displayed only to the administrator (255), for example.

If the reporter 16 selects "Do not care about anonymity" (250), the system 10 displays that Anonymity Category selection and the reporter's 16 contact data that the system 10 saved to the database for the client organization 14 and the administrator 12 to view, for example.

Automatic Notification of Incident Reports

In another example of an embodiment of the invention, an anonymous reporting system 10 may be provided with automatic electronic notification to a client organization 14, via e-mail or other electronic notification means, upon the occurrence of an identifiable event, such as a database transaction in a database. In one example, such a transaction may include the filing of an incident report 28 by a reporter 16. In one embodiment, the administrator's software system 13, immediately upon receiving an incident report filed by a reporter 16, automatically notifies the client organization 14 of the fact that an incident report 28 has been filed. In one example, the notification may be in the form of an e-mail or set of e-mails sent to one or more pre-CPUs 22 of the client organization 14.

Figure 12:
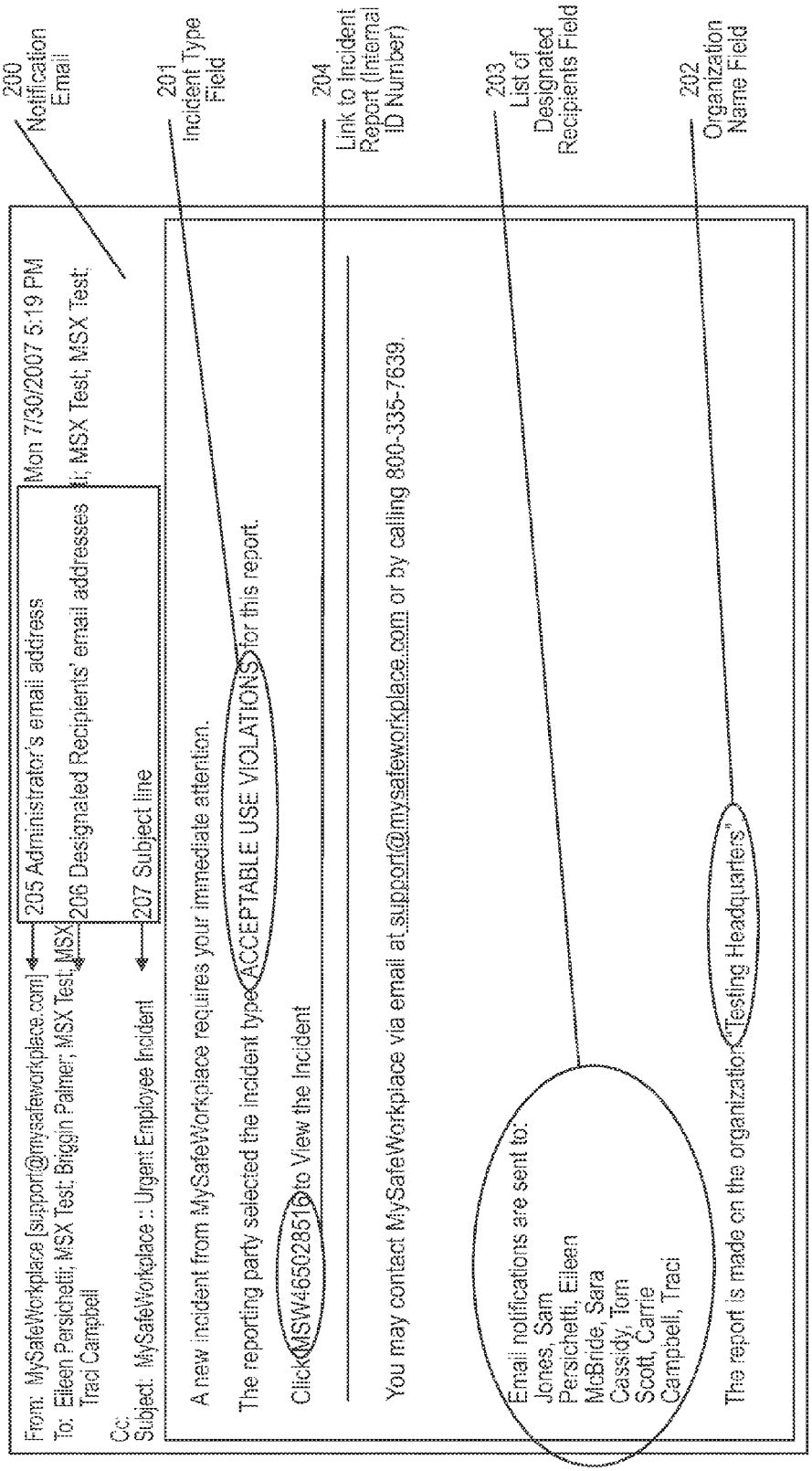
FIG. 12 is an example screen shot of a notification e-mail for the company participant users to notify them of the submission of an incident report.

FIG. 12 illustrates one example of an electronic notification, more particularly an email 200, in accordance with one embodiment of the present invention. As shown in FIG. 12, a notification e-mail 200, sent from the administrator 12 through the administrator's e-mail address 205, is sent to one or more CPUs 22 of the client organization 14 to the CPU's e-mail address 206 wherein the subject line of the e-mail 201 identifies that the e-mail relates to an urgent employee incident. In one example, the e-mail 200 includes a field 201 that describes the incident type, a field 203 that lists the CPUs of the e-mail notification, and a field 202 that describes the organization that is the subject of the incident report. In one example, the notification e-mail may also include a hyperlink to the incident report 204, which may be displayed in the form of an incident report number when the recipient moves the on-screen cursor over the hyperlink and activates a mouse click, a new page is opened requesting the recipient to enter his/her unique identification and password to gain access to the incident report.

Figure 13:
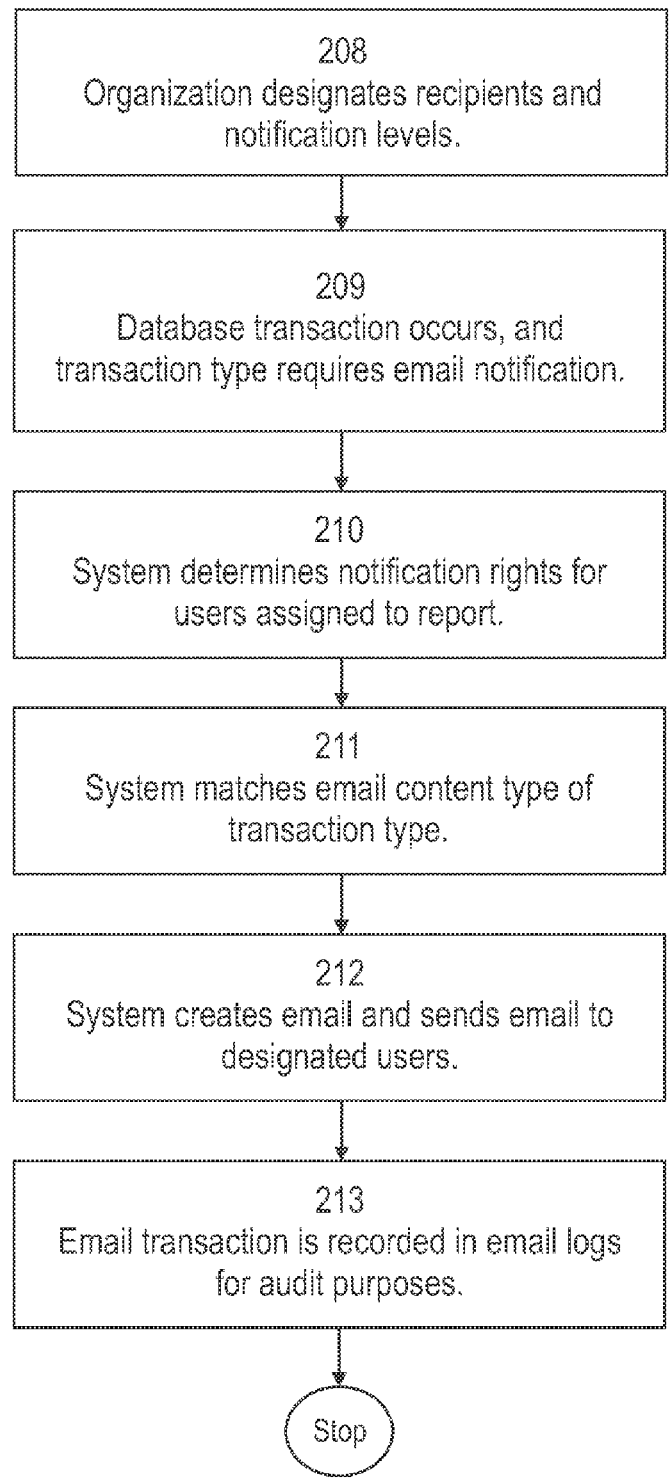
FIG. 13 is a flowchart for illustrating an example of the operations of providing automated notifications to designated recipients.

FIG. 13 illustrates an example of operations for providing automated electronic notifications to CPUs of the filing of an incident report, in accordance with one embodiment of the present invention. During enterprise setup, the client organization 14 specifies CPUs and desired notification levels (208). For instance, the client organization 14 may assign one or more individuals within the client organization 14 to be CPUs and have certain roles or privileges in receiving and processing incident reports made in the anonymous reporting system. Hierarchical tiers or groups may be defined, and CPUs may be specified to receive notifications under certain conditions, such as geographic conditions, entity or subsidiary relations, or other parameters that may be specified by the client organization, as will be described in greater detail below. Moreover, notification levels may be specified, so that certain CPUs receive electronic notifications of all activities related to a particular incident report, whereas other CPUs may receive notifications of only a subset of all of the events related to a particular incident report, as may be desired by a particular client organization 14.

When a database transaction occurs that triggers an operation to send an electronic message to the client organization 14, such as an incident report being received by the software system 10 (209) for example, the system matches the incident report against the privilege level of the CPUs as well as the user group settings defined by the client organization 14 to determine which CPUs should receive notification of the filing of the incident report (210). In one embodiment, a database transaction may be a number of organization transaction types such as submitting a new report by a reporting party, adding a new user a report, making a change to report distribution or a reporting party posting a message to a message board to name a few. In another embodiment, a database transaction may be a number of reporting party transaction types such as an organization posting a message to a message board. Operation 209 may also exclude notification of the filing of an incident report, for example, when the incident report relates to a complaint against a person who happens also to be a designated recipient of the report. In one example, an incident report includes a field for the reporter 16 to identify a "named party" involved in the offending incident. The system 10 may exclude from notification any person who is specified by the reporter 16 as a "named party" in the incident report.

Having determined what persons should receive notification of the particular incident report, the system 10 matches electronic notification content type to the transaction type (211), creates an electronic notification and transmits the notification to the individuals determined previously (212). In one example, an electronic notification may be an e-mail having an incident type field, an organization name field, a list of CPUs field, and a link to the incident report, as shown in the example of FIG. 12, although other electronic notification formats may be used depending upon the particular implementation.

The system 10 may log or track the transmission of the incident report 28 to each individual that accesses the incident report (213). In one example, all e-mails related to an incident report are logged in the database 15, and such logging data may include the recipient's name, a time and date stamp that the e-mail was sent, and the internal report number of the incident report. In this way, the client organization 14 and its CPUs are immediately notified of the filing of an incident report on a 24 hour/7 day basis regardless of when a reporter 16 submits the incident report.

Figure 14:
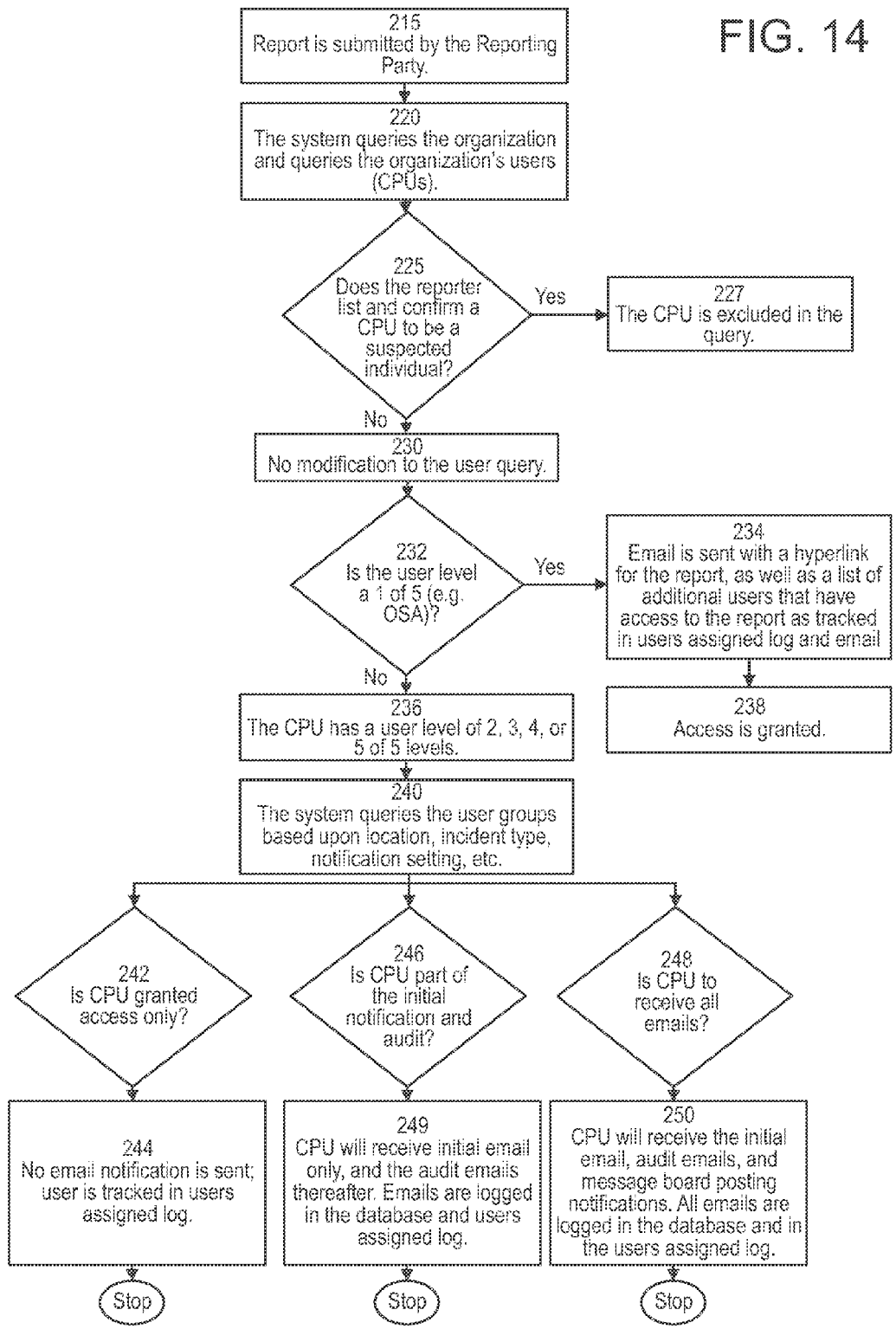
FIG. 14 is a flowchart for illustrating the notification system in accordance with one embodiment.

As illustrated in the flowchart of FIG. 14, upon submission of an incident report, the Client Participant Users (CPU) 22 have access to the report and may receive notification via email about the new report, based on certain criteria. In one example, if a CPU 22 has been named in a report and excluded by the reporter 16, which is defined step within the report submission process, the system will exclude such user from all access and notification processes (227). If a CPU 22 has been named, but not excluded by the reporter 16, then access and notification will be completed the same as for any other CPU 22 (230).

The system 10 automatically sends notification of and provides access to the new report to several individuals based upon their privilege level. In one embodiment, all OSA level users receive an e-mail notification with an embedded hyperlink to the report. A list of all the additional users with access to the report is also included within the notification e-mail. The email notifications are typically tracked in a log, such as a user assigned log or e-mail log, for example. In one embodiment, all users who have been granted access to the report, regardless of notification settings, are logged in a "Users Assigned" log, which is displayed with the incident report view.

If the CPU 22 has a privilege level of less than an OSA (236), then the "User Group" CPUs are notified if the incident type, location, and organization are also contained within the User Group parameters (240). Notification is provided only if the incident type selected by the reporter 16 is set within the User Group configuration to allow for notification (249)(250). Otherwise, access is provided without specific notification (244).

Message Boards, Notification of Message Board Activity, Message Board Anonymity

Moreover, a system 10 may also be provided with the feature of a message board that may be utilized to provide communication between client organizations 14 and reporters 16. If desired, the system 10 may be provided with the capability of providing electronic notifications to CPUs 22 of the client organization 14 that there is new message board activity.

In one example, a system 10 is provided with a message board that permits client organizations 14 to communicate with reporters 16 vis-à-vis message boards. This provides the client organization 14 with the ability to ask further questions of the reporter 16, as well as for the reporter 16 to provide additional information or facts relating to the incident, all while maintaining the anonymity of the reporter 16.

The process of notifying CPUs 22 of client organization 14 of activity on the message board related to a particular incident may be provided utilizing a manner similar to that described above with reference to FIG. 13. Specifically, after the client organization 14 has set up or selected particular recipients to receive notifications of message board activity, then thereafter when a reporter 16 posts a message to a message board related to a particular incident report, the system 10 automatically notifies the CPUs 22 of the client organization 14 that a message posting exists.

Figure 15:
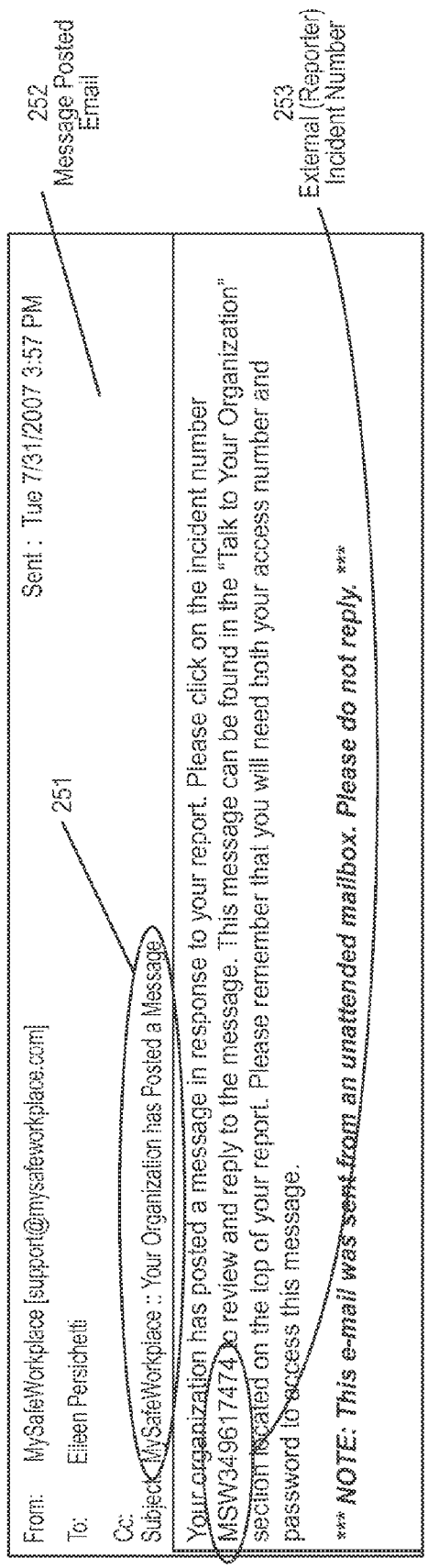
FIG. 15 is an example of a notification email sent to the reporting party in response to the organization posting a message to a message board.

E-mail notifications 252 of message board activity can also be sent to reporters 16 if the reporter 16 selected an anonymity level where the reporter 16 provided the administrator 12 with an e-mail address of the reporter 16. An example of such an e-mail is illustrated in FIG. 15, wherein an e-mail notification 252 is sent to a reporter 16 (in this example shown as "Jake@yahoo.com") and the subject line 251 identifies that "your organization has posted a message." The notification e-mail 252 may include an incident number field 253 which displays the incident number, as well as text indicating that the reporter's 16 client organization 14 has posted a message in response to the incident report.

Figure 16:
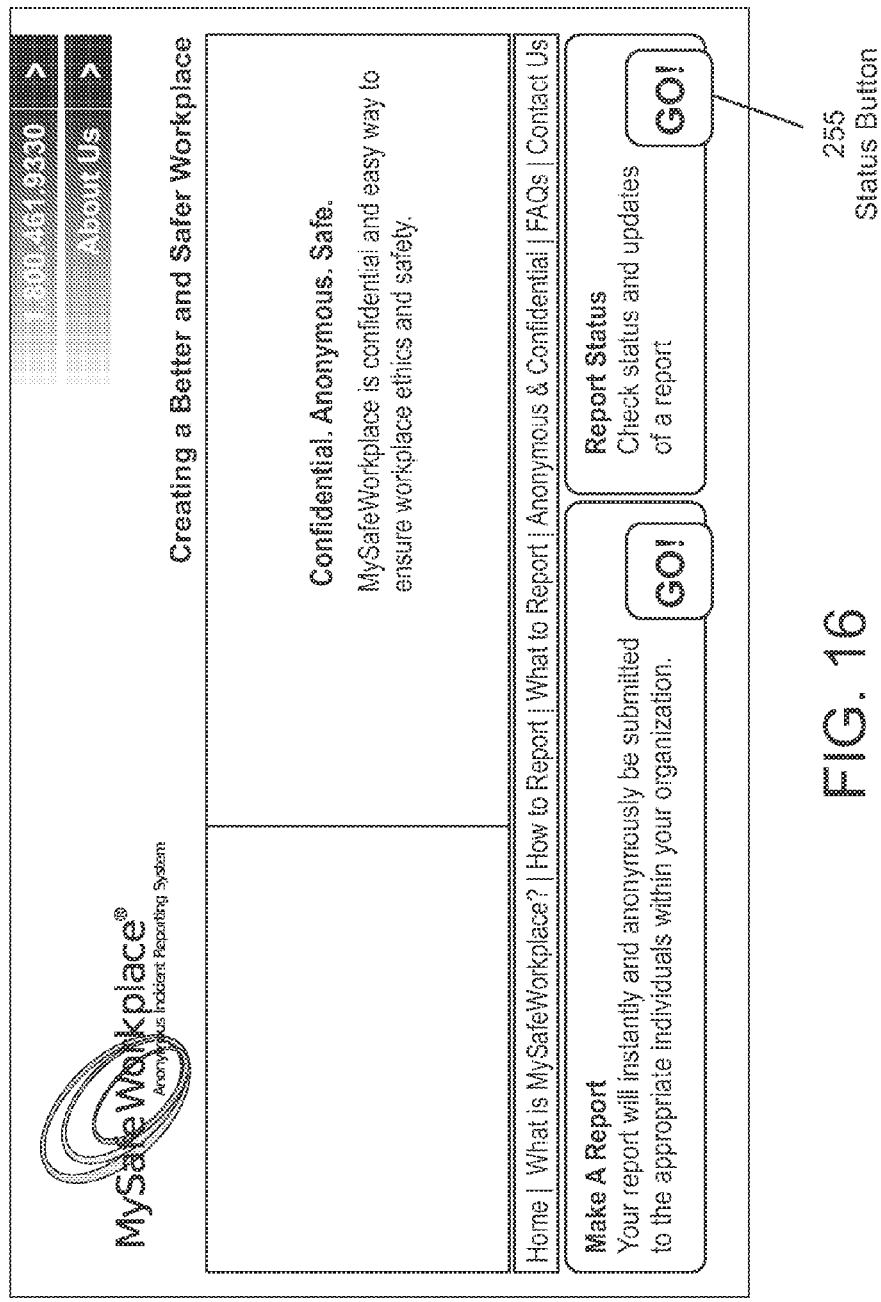
FIG. 16 illustrates an example of a computer display screen having a status button option for a reporting party to select to display a report status.

In cases where the reporter 16 has chosen to remain completely anonymous to both the client organization 14 and the administrator 12, a message board may be provide that is accessible to the anonymous reporter 16 whenever the anonymous reporter 16 checks the report status. In one example, administrator 12 provides, as part of the reporter's portal, a status button that permits the reporter 16 to check the status of the incident report which they filed. FIG. 16 illustrates an example of a computer display screen having a status button 255 that a reporter 16 may select in order to view report status; and upon activating the status button, in one example, a computer display screen, such as shown in FIG. 17, is provided that has an access number field 259 for querying the reporter 16 for an access number (which was previously provided to the reporter 16, see FIG. 9) as well as a field 258 for querying the reporter 16 for their follow up password (which was previously specified by the reporter 16 as part of the report they submitted, see FIG. 8).

Figure 18:
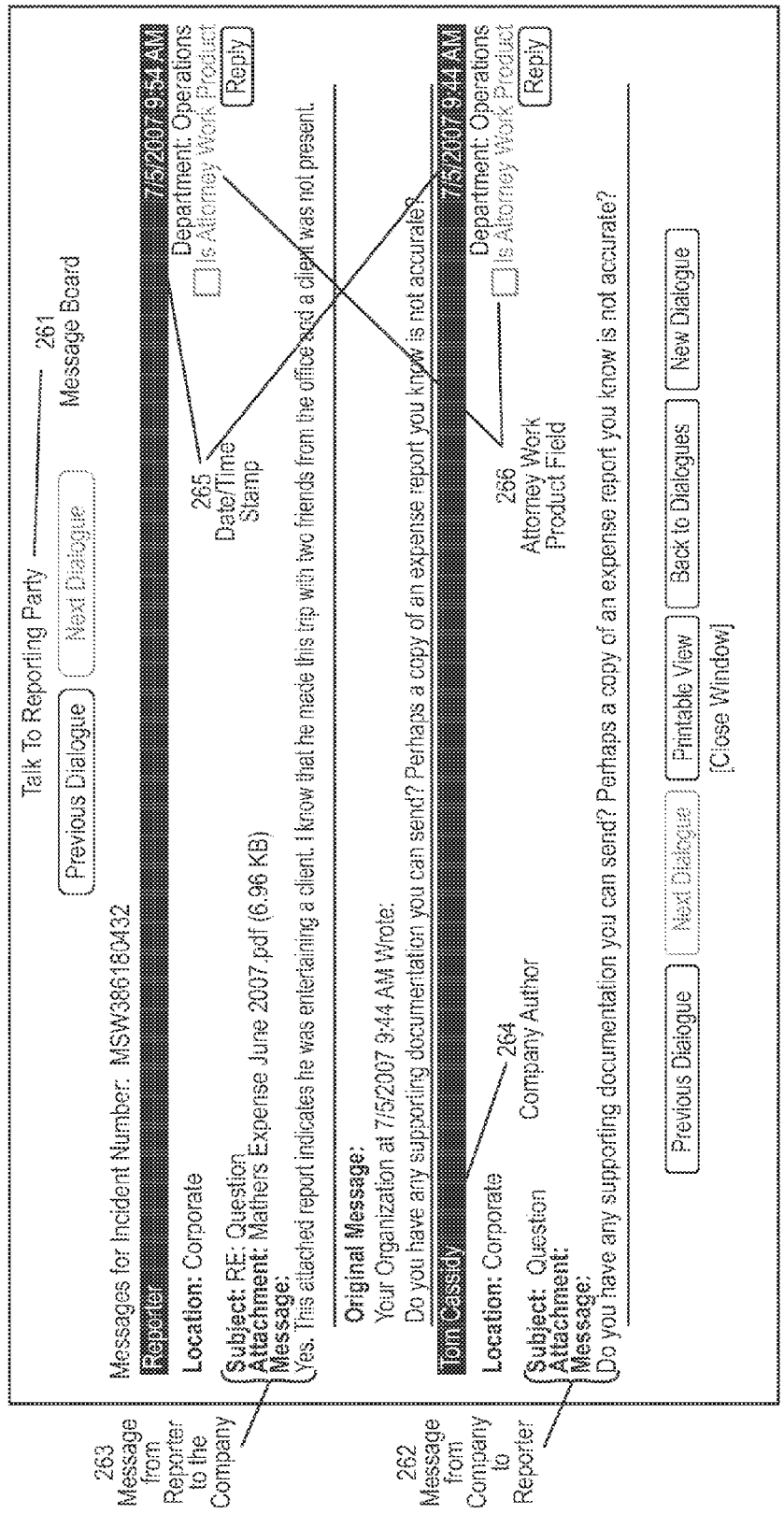
FIG. 18 is an example of a message board message in accordance with one embodiment.

In FIG. 18, an example of a message board 261 is illustrated, wherein a series, set, or string of messages related to an incident report are displayed for viewing by the reporter 16. As shown in the example of FIG. 18, a computer display screen may be provided with messages from the client organization 14 (262) to the reporter 16, as well as messages from the reporter 16 to the client organization 14 (263). In one example, the messages from the client organization 14 to the reporter 16 may identify the author of the client organization's 14 message 264, as well as a date/time stamp 265. As shown in FIG. 18, the reporter's 16 anonymity is maintained, as the message board 261 does not display identifying information about the reporter. In one example, each message may be provided with a display field 266 indicating whether the particular message is "attorney work product."

In one example, when the corporation posts a message to the message board 261, the message is internally tagged with the CPU's 22 user ID, which is used later for audit trails and historical recordkeeping (not shown). The message may then be posted to the message board, and when the reporter 16 views the message, the CPU's 22 name is not displayed on the message board, but instead the author is displayed as "your organization" or the like. If the reporter 16 replies to the CPU's 22 message, then an event of a posting will spawn the appropriate e-mail notification back to the client organization 14.

In another embodiment, the name of the client organization's 14 author of a message may be withheld in the message board 261 when viewed by the reporter 16, so that the identity of the specific individual at the client organization 14 who is posting a message is anonymous to the reporter 16. FIG. 19 illustrates an example of a computer display screen wherein a message board 270 is provided that does not display the name of the CPU 22 who posted the message to the reporter 16 271. FIG. 19 is the message board view 270 from the perspective of the reporter 16; preferably, the view of the message board from the client organization's 14 perspective would display the CPU's 22 name who authored the particular message on behalf of the client organization 14, such as in the example of FIG. 18. Hence, by providing a message board for anonymous communications between a reporter 16 and a client organization 14, embodiments of the present invention may provide for further investigation and follow-up of an incident report. The client organization 14 may also use the message board to communicate other facts or data to the reporter 16, such as the status of the investigation into the reported incident.

Figure 20:
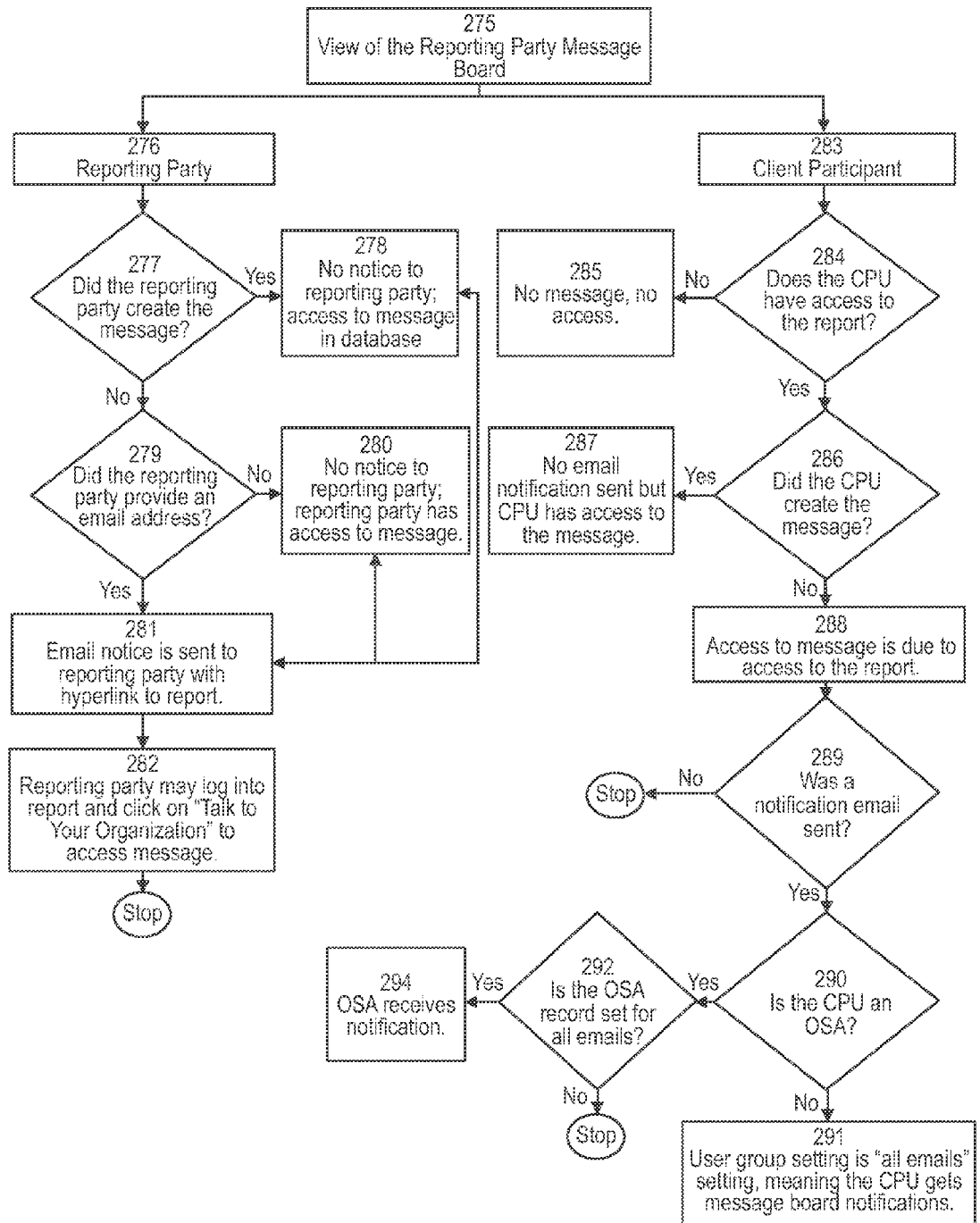
FIG. 20 is a flow chart illustrating one example of posting a message to a message board.

FIG. 20 shows a flowchart for one example of the posting of message to a message board. A message is posted by either a reporter 16 (276) or a CPU 22 user (CPU) 22 (283), by opening the message board, creating the message with subject line, and saving the text. The message may either be an original message, or a reply to an existing message. If the message was saved by the reporter 16, then the system 12 automatically sends notification to the CPU 22 if the CPU 22 belongs to a user group with the notification level of "All Emails" for that specific incident type (291) or if the CPU 22 is at the organizational super administrator (OSA) level, then the OSA 467 automatically receives the e-mail notification if the user record flag is set to "all emails" (294). However, if the OSA's user record flag is set to "initial/audit emails only", they will not receive message board notifications (292). If the message was saved by the CPU 22, the notification is sent automatically to the reporter 16 if the reporter 16 provided an email address in their contact information contained in the database (e.g., Confidentiality Table) (281). A notification is also sent to the CPUs 22 (except for the author of the message) if the CPU 22 belongs to a user group with the notification level of "All Emails" for that specific incident type. A notification is also sent to the OSA level users, if the OSA user record has the notification level of "All Emails".

In the case of investigatory notes message board postings a message is posted by the CPU 22 by opening the message board, creating the message with the subject line, and saving the text to the database. The message may either be an original message, or a reply to an existing message. Notification is sent to the CPUs 22 (except for the author of the message) if the CPU 22 belongs to a user group with the notification level of "All Emails" for that specific incident type. A notification is also sent to the OSA level users, if the OSA user record has the notification level of "All Emails." In the illustrated example, reporters 16 do not have access to, or receive notification about investigatory notes message postings.

Figure 21:
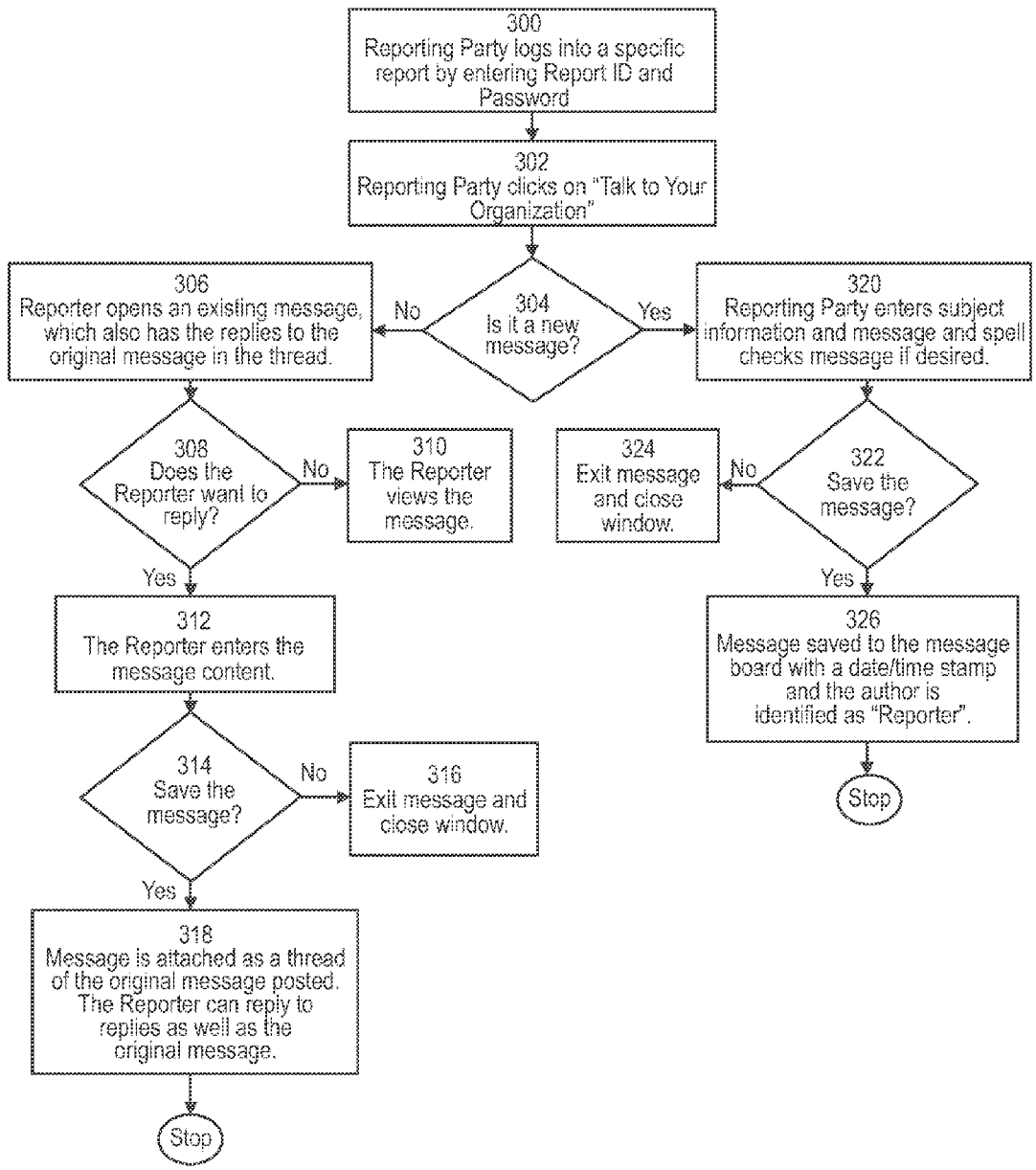
FIG. 21 illustrates, using a flowchart, one example of how a reporting party may create an original message or reply to an existing message in a message board.
Figure 22:
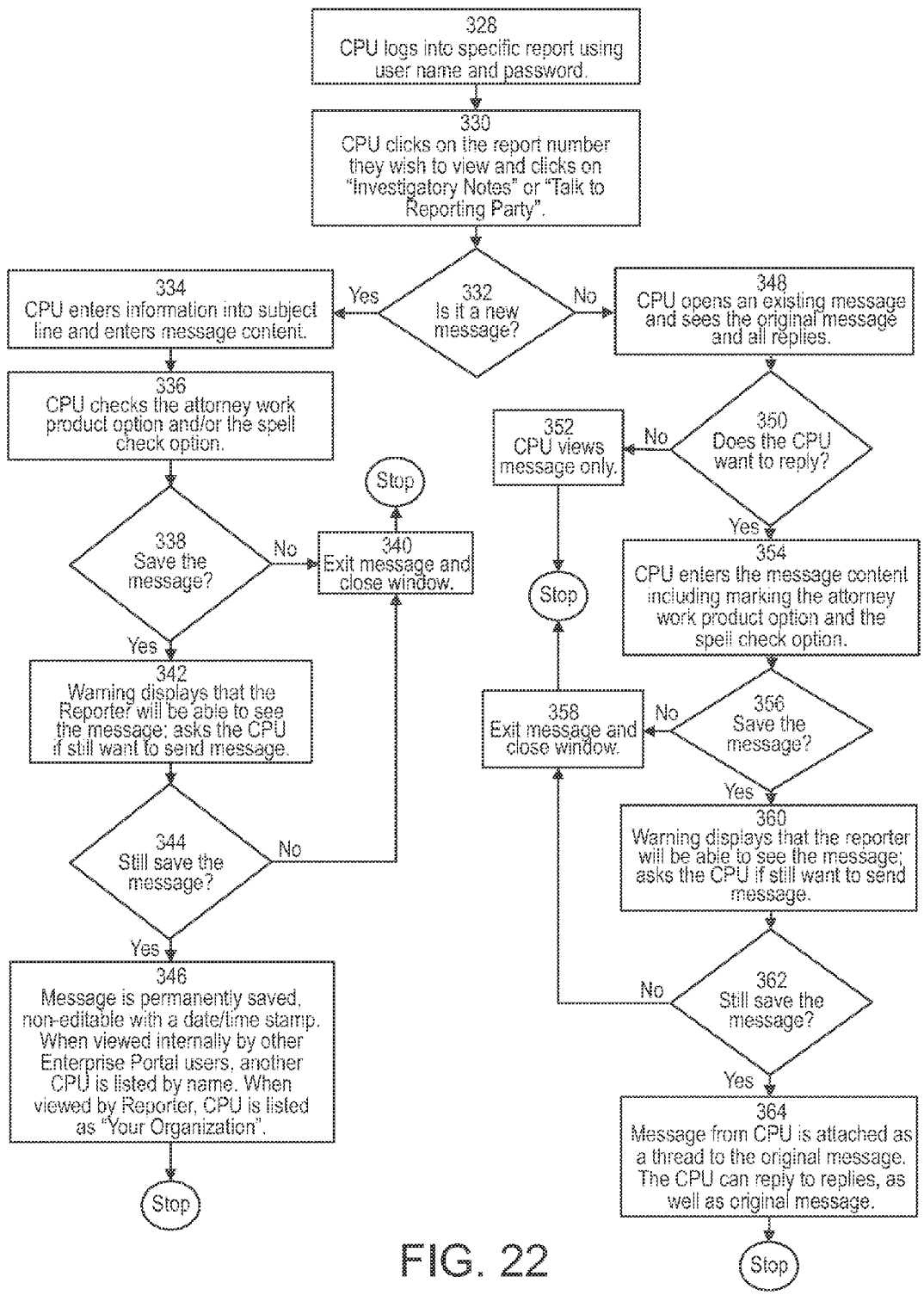
FIG. 22 is illustrates, using a flowchart, one example of how a client participant user may create an original message or reply to an existing message in a message board.

As illustrated in the flowcharts of FIGS. 21 and 22, a message board, or method to create and save information, is provided for the both the reporter 16 and the client participant users 22, and is entitled "Talk to Your Organization" (from the reporter's 16 view when checking status of their report) and "Talk to Reporting Party" from the CPU's 22 view in reviewing a specific incident report. The input screen is designed to capture text for the purpose of recording communications between the reporter 16 and the client organization 14. Such communications may include questions about the incident, additional information provided as part of the report, or resulting conclusions reached by the client organization 14. Additionally, the client organization 14 may use this message board to offer additional contact information to the reporter 16 for direct one-on-one communications between the parties by putting such information in the body of a message.

In one example, FIG. 21 illustrates how a reporter 16 may create an original message or reply to a message in a message board. For example, the reporter 16 may log into the report by selecting the "Go" button in the report status section of the main (home) web page of the system. The reporter 16 is prompted for their report ID number and the personal password they provided and was saved by the system 10 when submitting their report (300). The reporter 16 selects the button titled "Talk to Your Organization" by moving the on-screen cursor over the GUI button and performing a mouse click operation to open the message board (302).

A new window opens which displays any existing messages, listed by subject, original message author, and showing the number of replies, the author of the most recent reply, and the date of the most recent reply (or date of the original message submission if no replies exist). In one particular embodiment, the author of each message and/or reply is displayed as "Your Organization" for any messages or replies saved by CPUs 22, and displayed as "reporter" for any messages or replies saved by the reporter 16. If the reporter 16 desires to add a new message to the message board, the reporter 16 moves the on-screen cursor over a GUI button titled "New Dialog" and performs a mouse click operation to open a new message creation window. If the reporter 16 wants to respond to an existing message or just view an existing message (308), the reporter 16 simply clicks on the message in the message board (306). In the illustrated embodiment, the manner in which a message is authorized is the same for both a new message and replying to an existing message.

The new window contains an alert to the reporter 16 about the system time-out provisions, an entry field for the subject of the message and an entry field for the body of the message. In one embodiment, the system times out after 20 minutes. The reporter 16 enters the subject line and message text (312)(320). An optional spell-check button is available, and when selected, will process the text entries against a standard spell-check dictionary, prompting the reporter 16 for response to any non-matching text in order to correct spelling as needed.

In one example, once the text of the message is entered, the reporter 16 has two options available: save the message to the message board or cancel the message. A "save" GUI button is available to save the entered text (326). If the message is saved, the message will be shown in the message board with a time and date stamp and the author is identified as "reporter". Once saved, the message is not alterable in any way by any party. A "cancel" GUI button is also available to not save the entered text and therefore exit the message and close the new window (324).

The message author is saved as "reporter" for view by either the reporter 16 or the CPU 22. Any messages or replies authored by CPUs 22 are labeled as "Your Organization" for viewing by the reporter 16. Therefore, the anonymity of the reporter 16 is protected as no contact information from the database (e.g., Confidentiality Table) is displayed within the message board. The anonymity of the CPUs 22 is also protected as no identifying information is provided about the CPU 22 to the reporter 16.

In another example, FIG. 22 illustrates how a CPU 22 may create an original message or reply to a message in a message board. The CPU 22 logs into a specific report and enters his unique username and password (328). For example, the CPU 22 may choose the report from a list or from a hyperlink in an e-mail notification. The CPU 22 then moves the on-screen cursor over either the GUI button "investigatory notes" or the GUI button "talk to reporting party" and activates a mouse click (330). Choosing "talk to reporting party" takes the CPU 22 to the message board for the particular report.

In one embodiment, a new window opens which displays any existing messages, listed by subject, original message author, and showing the number of replies, the author of the most recent reply, and the date of the most recent reply (or date of the original message submission if no replies exist). In one particular embodiment, the author of each message and/or reply is displayed as "Your Organization" for any messages or replies saved by CPUs 22, and displayed as "reporter" for any messages or replies saved by the reporter 16.

If the CPU 22 desires to add a new message to the message board, the CPU 22 selects a GUI button titled "Talk to Reporting Party" to open a new message creation window. If the CPU 22 wants to respond to an existing message or just view an existing message (348)(352), the CPU 22 simply clicks on a message in the message board. In the illustrated embodiment, the manner in which a message is authored is the same for both a new message and replying to an existing message.

The new window contains an alert to the CPU 22 about the system time-out provisions, an entry field for the subject of the message, and an entry field for the body of the message. In one embodiment, the system times out after 20 minutes. The CPU 22 enters the subject line and message text (334)(354). An optional spell-check button is available (336)(354), and when selected, will process the text entries against a standard spell-check dictionary, prompting the CPU 22 for response to any non-matching text in order to correct spelling as needed. An optional attorney work product option is also available that internally marks the message as attorney work product (336), meaning such a designation is not visible to the reporter 16 but may be used internally in any manner.

In the illustrated embodiment, once the text of the message is entered, the CPU 22 has two options available, either save the message to the message board or cancel the message. A "save" GUI button is available to save the entered text (356). In the illustrated example, if the message is saved, the message will be shown in the message board with a time and date stamp and the author is identified as "Your Organization". A warning displays to the CPU 22 that the reporter 16 will be sent the message, thus asking the CPU 22 if he still wants to send the message (342)(360). Once saved, the message is not alterable in any way by any party (346). The CPU 22 may reply to original messages or reply to replies of messages (364). A "cancel" GUI button is also available to not save the entered text and therefore exit the message and close the new window (340)(358).

The message author is saved as "Your Organization" for view by the reporter 16 and with the CPU's 22 name for the other CPUs 22 of the organization. Any messages or replies authored by CPUs 22 are labeled as "Your Organization" for viewing by the reporter 16. The anonymity of the CPU 22 is protected as no identifying information is provided about the CPU 22 to the reporter 16.

Management Functions

In another embodiment, system 10 may be provided with a control for permitting CPUs 22 to assign or remove particular individuals from the anonymous reporting system 10. FIG. 23 illustrates an example display screen listing each authorized CPU 22 (370) to receive and handle incident reports as listed, as well as their privilege level 372. In one example, OSA privilege level provides organizational super administrative level and can be used to define the distribution of incident reports. An organizational manager privilege level (OM), in one example, provides all of the same privileges as an OSA, but does not receive automatic notification of every incident. An organizational administrative level (OA) provides for data entry, and a privilege level of a designated recipient (DR) can be utilized to specify individuals who are designated to receive incident reports, such as chief financial officers, senior managers, etc. Read only privilege levels (RO) can be provided for individuals who may read incident reports but cannot write data related to such reports within the system. As shown in FIG. 23, for each user, an active display field 374 can be provided which indicates whether the particular user is active, and a control 376 can be provided for enabling or disabling an account of a particular CPU 22 of a client organization 14, as shown in FIG. 24.

Generally, when a new client organization 14 establishes an account with the administrator 12 in the system 10, during the client setup process, an OSA or administrator is established which permits the OSA to set up other CPUs 22. The OSA can define organizational structures and distribution of incident reports as desired. Further, particular incident types can be assigned to certain individuals, for instance, if desired, discrimination incident types could be assigned to the client organization's 14 EEOC manager.

Figure 27:
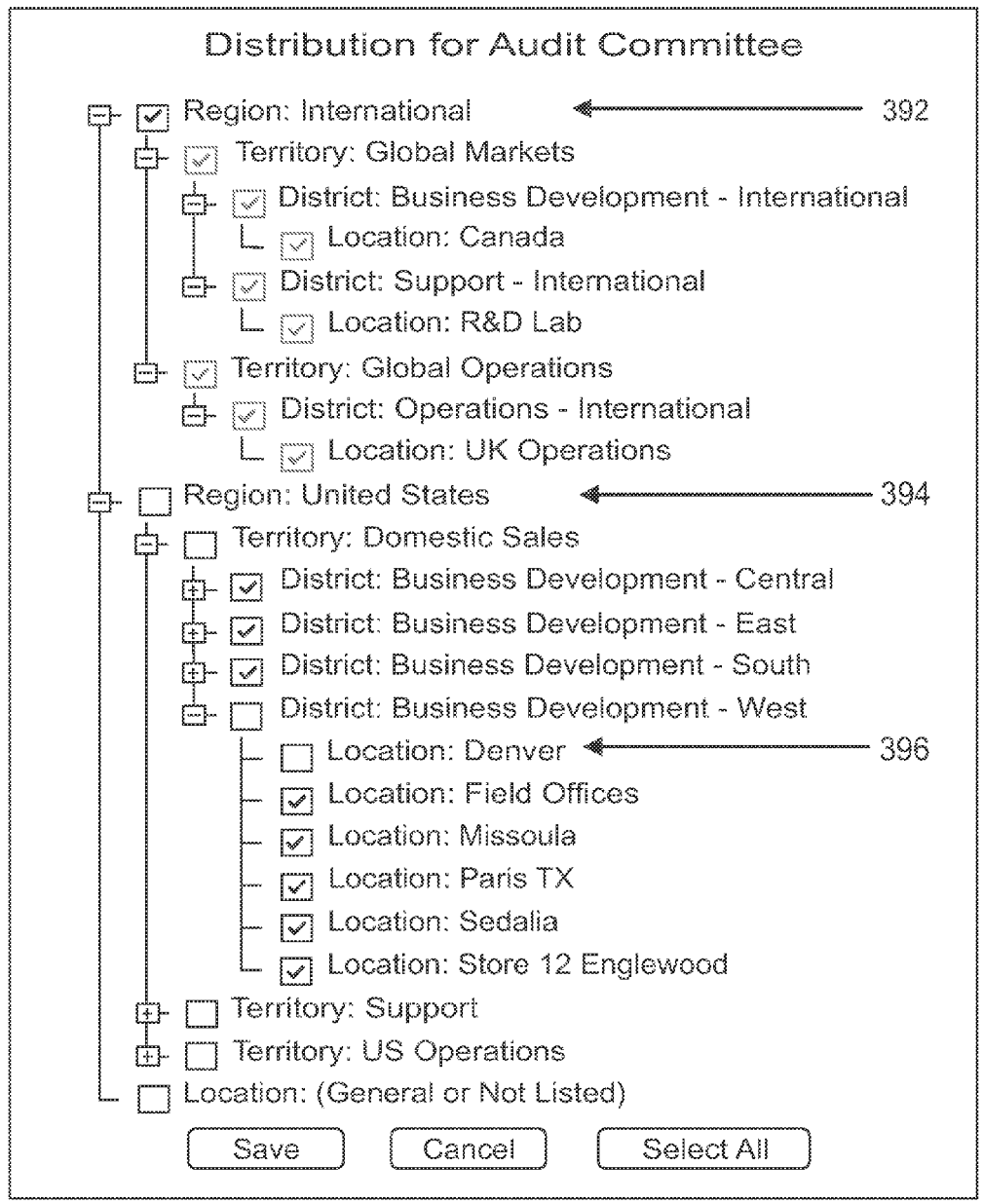
FIG. 27 illustrates an example of a computer display screen of an example distribution tier for a group "Audit Committee."

Organizational structures can be defined with unlimited multiple tiers to facilitate organized automated distribution of incident reports as they are received. For instance, a client organization 14 can set up tiers in tier fields 378, including regions 380, territories 382, districts 384, locations 386 or by other tiers as desired by the corporation (see FIG. 25). In one example, the tiers may be used to specify automated distribution of received incident reports based on user groups as shown in FIGS. 26 and 27. In FIG. 26, for example, the audit committee is provided with a distribution control display button 388 wherein the screen 390 of FIG. 27 may be displayed to show the distribution tiers for reports that will be sent to the audit committee. FIG. 27 shows an example of a completed tier structure with selections for a specific user group—in effect, FIG. 27 shows the various locations that, if involved or specified in an incident report, will have such incident reports distributed to the audit committee. In other words, reports from these specified locations are sent to the audit committee. In this manner, embodiments of the present invention can specify the locational sources that a particular user group will receive incident reports. In the example of FIG. 27, the audit committee receives reports from all locations in the East District 396 except from the Denver location. The checkboxes on each region 392, 394 permit the client organization 14 to specify the automated distribution of incident reports received from particular locations to a particular user group, such as the audit committee in this example.

As shown above, with respect to FIG. 14, distribution of incident reports may also be governed by the incident type, such that particular user groups receive incident reports that relate only to a specified one or more incident types.

Figure 28:
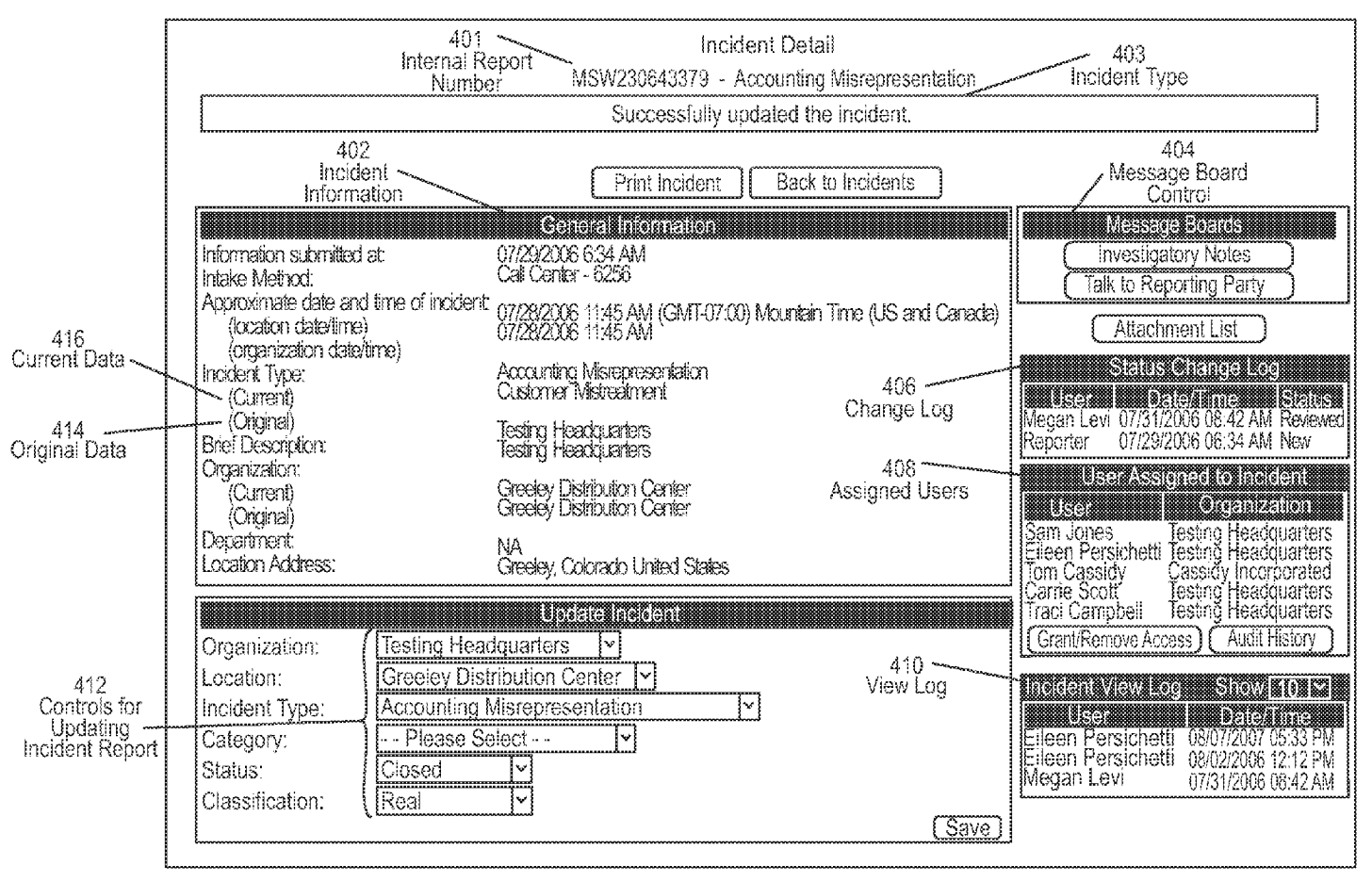

FIG. 28 illustrates an example of an incident summary or view page 400 that may be presented to a client organization 14 indicating the incident internal report number 401 and the incident type 403, in accordance with one embodiment of the present invention. The view page may include general information about the incident 402, controls for a message board/investigatory notes 404, a status change log 406, a display of users assigned to the incident as well as related controls 408, and an incident view log 410 showing the CPUs 22 which have reviewed the incident. Controls 412 may also be provided for updating the incident report data. For instance, in one example, the client organization 14 can revise or reassign the reporter's 16 designated incident type, location, or organization, and the software will permit such an update while maintaining the original data entered by the reporter 16. As shown in FIG. 28, for instance, the original incident type 414 was selected by the reporter 16 as "customer mistreatment," and the current incident type 416 has since been reassigned to "accounting misrepresentation," and both the original 414 and current 416 incident types are displayed in the incident information pane 402 that is displayed. Permitting a CPU 22 to reassign or update the incident type, location, or organization may be useful for a number of purposes, including improving the accuracy of the incident report and the subsequent actions taken by the client organization 14. Because the software maintains the original data entered by the reporter 16, the integrity of the initial incident report as entered by the reporter 16 is maintained. In one example, when an update to a field of an incident report (such as type, location, organization) is made, the CPU 22 is asked to specify and enter a reason for the change.

In another embodiment of the present invention, a system 10 may be provided wherein access rights to a particular incident report may be selectively controlled. As shown in FIG. 29, a set of controls 418 may be provided for a plurality of corporate representatives in order to enable the addition of CPUs 22 to view a specified report, and in one example, a reason for adding a particular corporate representative is required to be specified for audit and tracking purposes. In one example, the date/time that a user was added or removed is also tracked for audit purposes.

Figure 30:
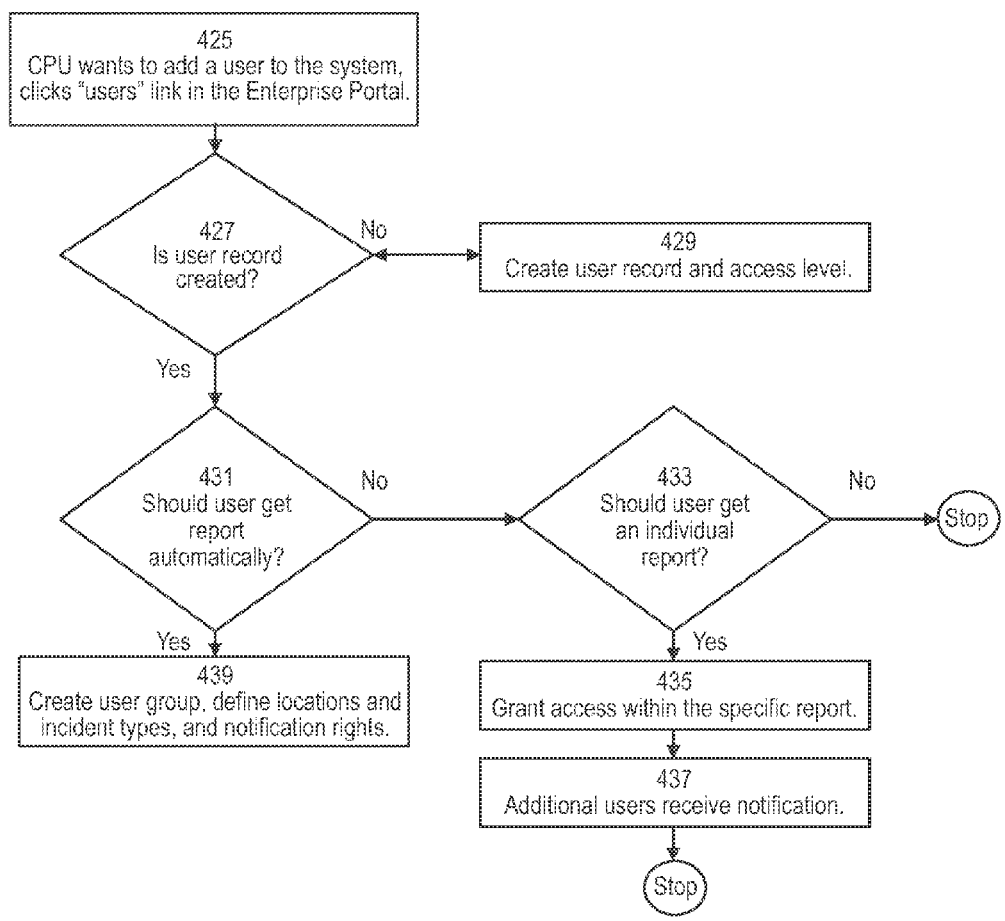
FIG. 30 is a flowchart illustrating one example of adding a user to a system.

FIG. 30 illustrates a CPU 22 adding a user to system 12 by moving the on-screen cursor over the "users" link in the enterprise portal and activating a mouse click operation. In one example, a CPU 22 may create a user record and access level (429) so as to add a user to the system 10. In one particular operation, the CPU 22 clicks on the "Users" link in the Enterprise Portal, and the system opens a new page displaying all the current CPUs 22. The CPU 22 then clicks the "Add" button and the system 10 opens a new page. The CPU 22 enters the user's name, username (for login purposes), position, and contact information, and saves the change.

The CPU 22 then determines if the individual user should have automatic distribution of reports (431). If so, the CPU 22 adds the user to a user group (439), as described herein. If user does not get automatic notification of reports, the CPU 22 determines if user should have access to an individual report (433).

Continuing with the example of FIG. 30, an individual user is to have access to an individual report, CPU 22 must grant the user access to the report. To do so, for example, the CPU 22 opens the individual report (435). Within the report, there is a box titled "Users Assigned to Incident" displaying each user who has access to that report. The CPU 22 moves the on-screen cursor over the "Grant/Remove Access" GUI button within the user assigned to incident box and performs a mouse click operation. In response to the mouse click operation, the system 10 then opens a new page that displays a list of all users within the organization. The CPU 22 then checks the user to add to access the report, provide a reason for granting access, and save the change. The system 10 notifies the new user via email that he has been granted access to the report (437).

Figure 31:
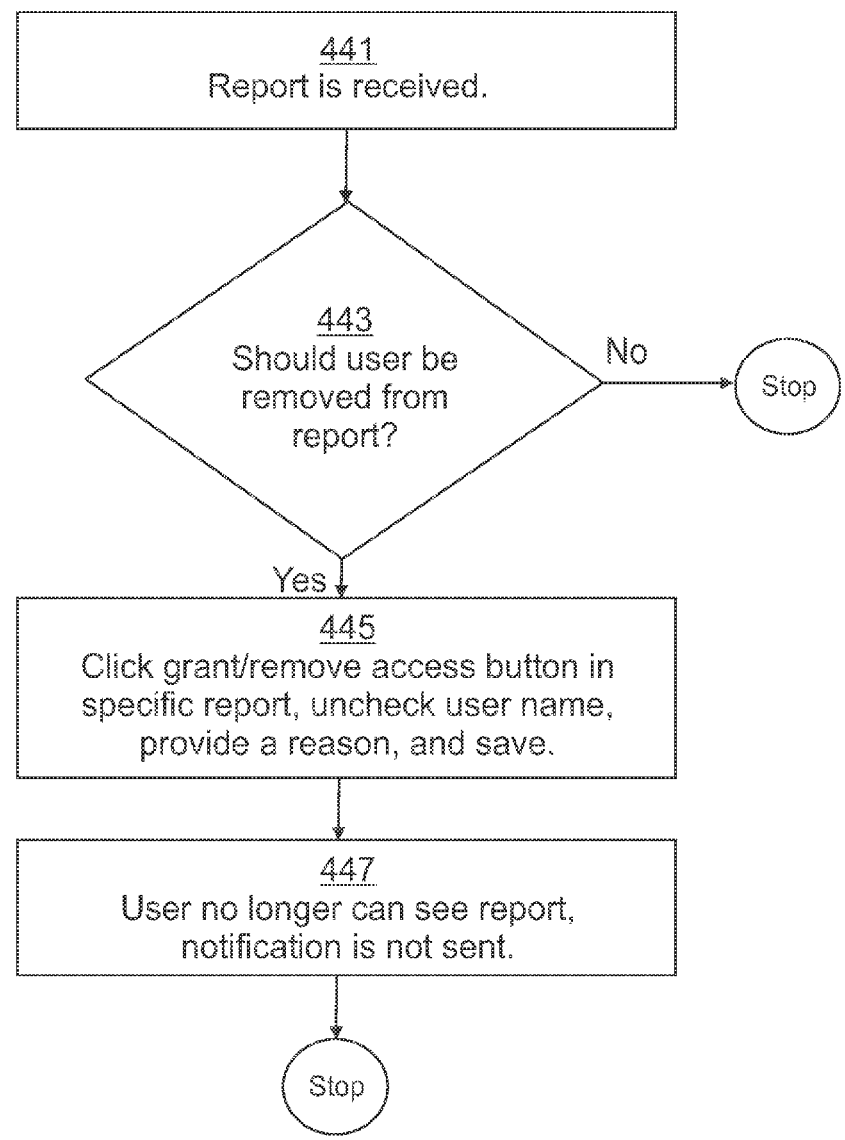
FIG. 31 is a flowchart illustrating one example of removing a user from a particular report.

In FIG. 31, if a user receives automatic access of the report, the CPU 22 may remove access to the report (441). To do so, for example, the CPU 22 opens the individual report. Within the report, there is a box titled "Users Assigned to Incident" displaying each user who has access to that report. The CPU 22 moves the on-screen cursor in the GUI over the "Grant/Remove Access" button within the Users Assigned to Incident box and performs a mouse click operation. The system 10 opens a new page showing the list of all users within the organization. The CPU 22 unchecks the box by the user's name, provides a reason for removing access, and saves the change (445). In one example, the system 10 does not send any notifications to the user, but it will deny access of the report to the user (447).

Figure 32:
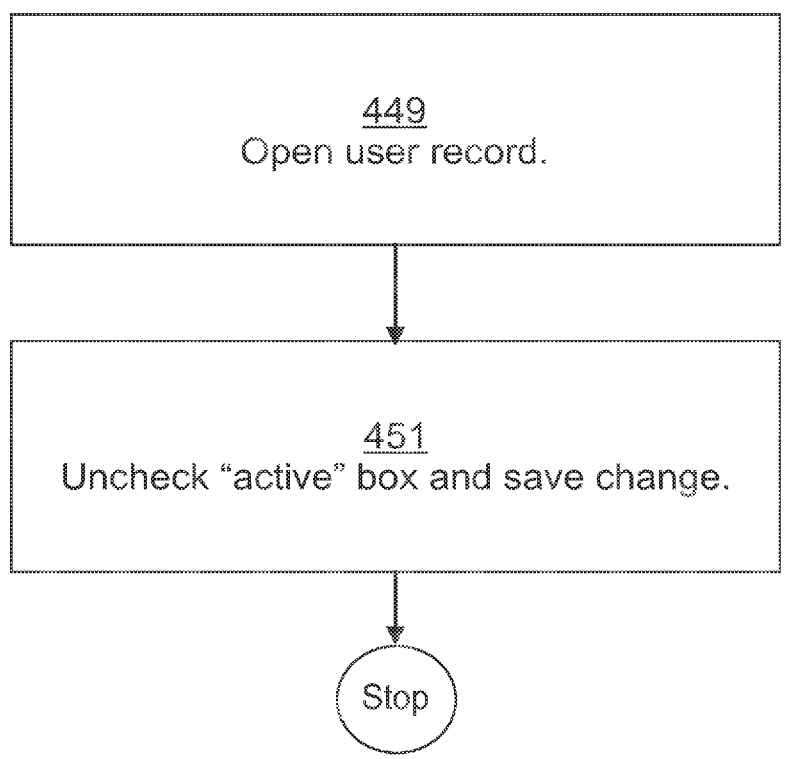
FIG. 32 is a flowchart illustrating one example of removing a user from a system.

FIG. 32 shows one example of removing a user from system 10. To remove a user from the system 10, the CPU 22 opens the user record for that individual, accessed through clicking on the "Users" link in the Enterprise Portal. The CPU 22 then clicks on the box next to "Active" to delete the checkmark from the box and saves the change.

Figure 33:
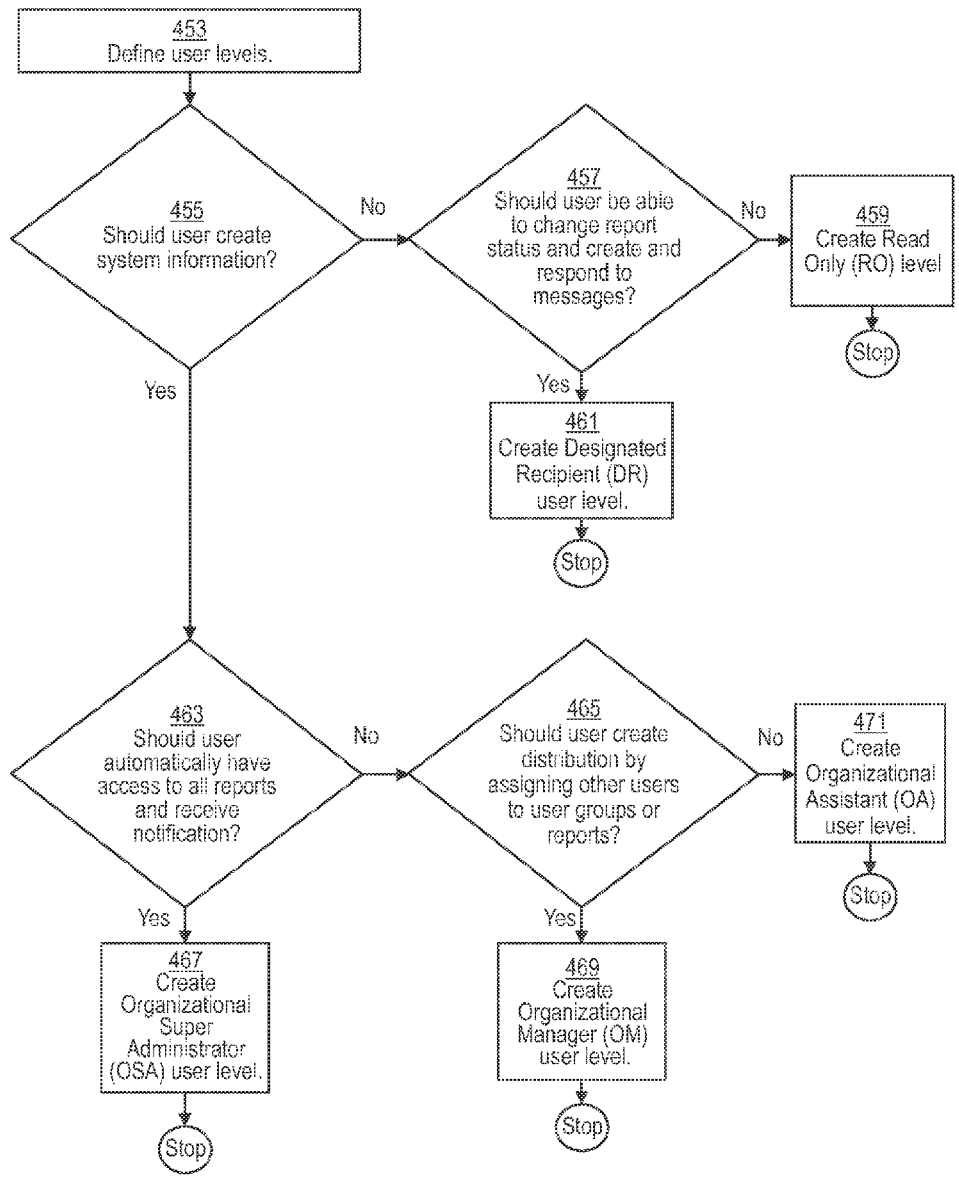
FIG. 33 is a flowchart illustrating one example of creating a user record for each individual having access to a system.

As illustrated in the flow chart of FIG. 33, the CPU 22 may create a user record for each individual who may have access to the system 10. User records includes, name, title, contact information, and in one embodiment one of five privilege levels.

In the illustrated example, the top Privilege Level is Organizational Super-Administrator (OSA). The OSA gets automatic notification for every report, access to all reports, creates and configures the organization and users within the enterprise portal. The next Privilege Level is Organizational Manager (OM). The OM has the same privileges as the OSA, but does not receive automatic notification of every report. The next Privilege Level is Organizational Administrator (OA). The OA may create the organizational configuration, but cannot affect distribution and does not receive reports unless he also assigned to a user group. The next Privilege Level is Designated Recipient (DR). The DR receives notification of reports if he is assigned to a user group, has access to those reports, and cannot affect any organizational configurations or any other settings within the System. The final Privilege Level is Read Only (RO). The RO has view-only access to reports if he is assigned to access them in a user group. It should be appreciated that any number of privilege levels may be created, and therefore, the five illustrated in FIG. 33 are not intended to be limiting in any way.

To set the privilege level, the CPU 22 must then open the user record for the user, by moving the on-screen cursor over the users link in the enterprise portal and performing a mouse click operation. In response to the mouse click operation, the system 10 opens a new page listing all of the users, which allows the CPU 22 to click on the name of the individual user to change his/her privilege level he wants to affect. The CPU 22 must then click on the corresponding privilege level in the user record and save the change.

Figure 34:
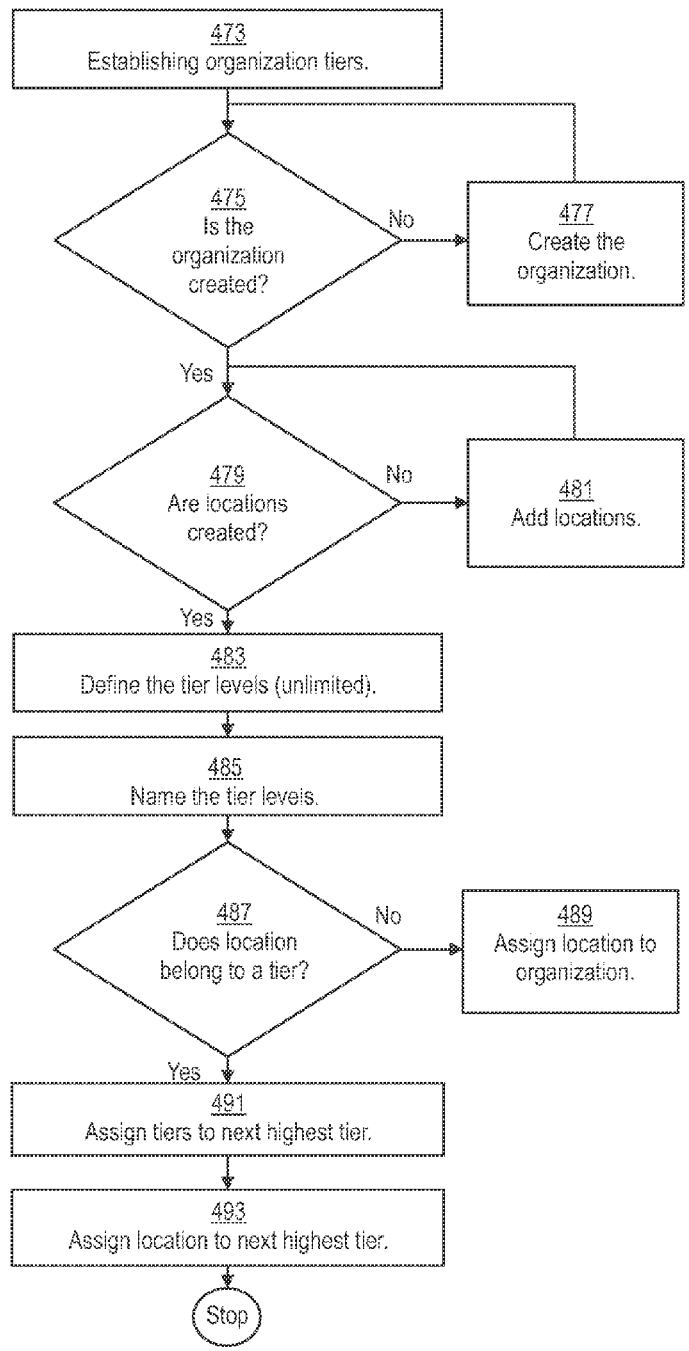
FIG. 34 is a flowchart illustrating one example of establishing organizational tiers in the system.

As shown in the flow chart of FIG. 34, the administrator 12 first determines if a client organization 14 has previously been created for the client (475). If not, the system 10 directs the administrator 12 to a new page to create an organization profile for the client organization 14 (477). More specifically, in one particular embodiment, the CPU 22 clicks on the "Organization Profile" link in the enterprise portal, and the system 10 opens a new page that allows the CPU 22 to enter the organization's contact information and save the changes.

After the administrator 12 creates the organization profile, the CPU 22 determines if locations have been added to the client organization 14 (479). If not, the system 10 directs the CPU 22 to add locations for the client organization 14 (481), including an address and time zone for each. In one example, the CPU 22 enters the new screen by clicking on the "Locations" button from the Enterprise Portal. The CPU 22 then adds the location name and address for the client location and saves the changes.

The system then allows the CPU 22 to define Tier Levels for the organization (483). In one embodiment, the CPU 22 selects the "Tiers" link from the enterprise portal. The CPU 22 may define the number of tiers and name each tier, based on region, division, or other sub-groups of the organization (485). For example, the CPU 22 might name each region in the tier as East Region and West Region. Then, the CPU 22 might name each division in the tier as District 1, District 2, and District 3.

The CPU 22 may then determine whether an client organization's 14 location is associated with the lowest level of a tier (487). For example, if Location A, Location B, and Location C are associated with District 1, then the CPU 22 assigns each location accordingly to District 1. The CPU 22 then assigns each tier in the structure to the next higher level (491). For example, the CPU 22 will assign District 1 and District 2 (with each district's corresponding assigned locations) to East Region. The CPU 22 will continue the assignments all the way to the top Organization level (493).

Figure 35:
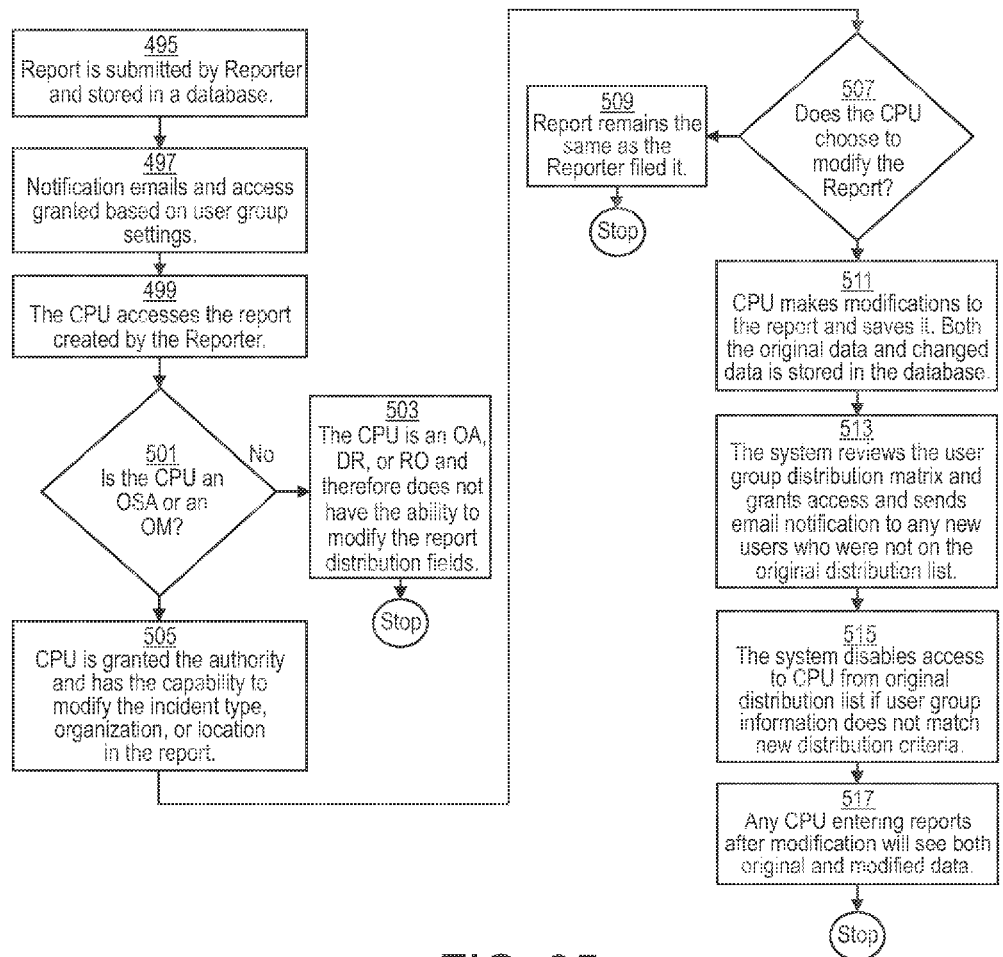
FIG. 35 is a flowchart illustrating one example of modifying a report submitted by a reporting party at the organizational level.

FIG. 35 illustrates one example of revising a report distribution while maintaining the original. The reporter 16 creates a new report which is saved by the system 10 (495). The system sends notification emails to the CPUs 22 who have access to the report as defined by user group settings (497). Depending on the privilege level of the CPU 22, the CPU 22 may revise the incident type, organization, or location that was identified by the reporter 16.

If the CPU 22 has a privilege level of OSA or OM, the CPU 22 may modify the incident type, organization, or location from the original settings identified by the reporter 16 in the report (505). In the illustrated example, if the CPU 22 is a DR, OA or RO privilege level, the CPU 22 may not modify the report (503). To modify the report, the CPU 22 opens the report, which contains a box titled "Update Incident." In one embodiment, the box contains five parameters which may be modified: "Organization," "Location," "Incident Type," "Priority" and "Status." For example, from a drop-down menu, the CPU 22 may select (1) any of the client's pre-defined organization levels, (2) any of the client's pre-defined locations and (3) any of the client's pre-selected incident types. The CPU 22 saves the changes (511).

The system 10 saves the original data entered by the reporter 16, and retains the new data entered by the CPU 22. The system 10 then reviews the user group distribution matrix and grants new access and/or sends an email notification to any new users who should receive access to the report based on the new data entered by the CPU 22 (513). The system 10 disables access to the report to any users who do not have access based on the distribution criteria entered by the CPU 22 (515).

The system 10 will display both the new modifications and the original data entered by the reporter 16 for any CPU 22 to view (517).

Figure 36:
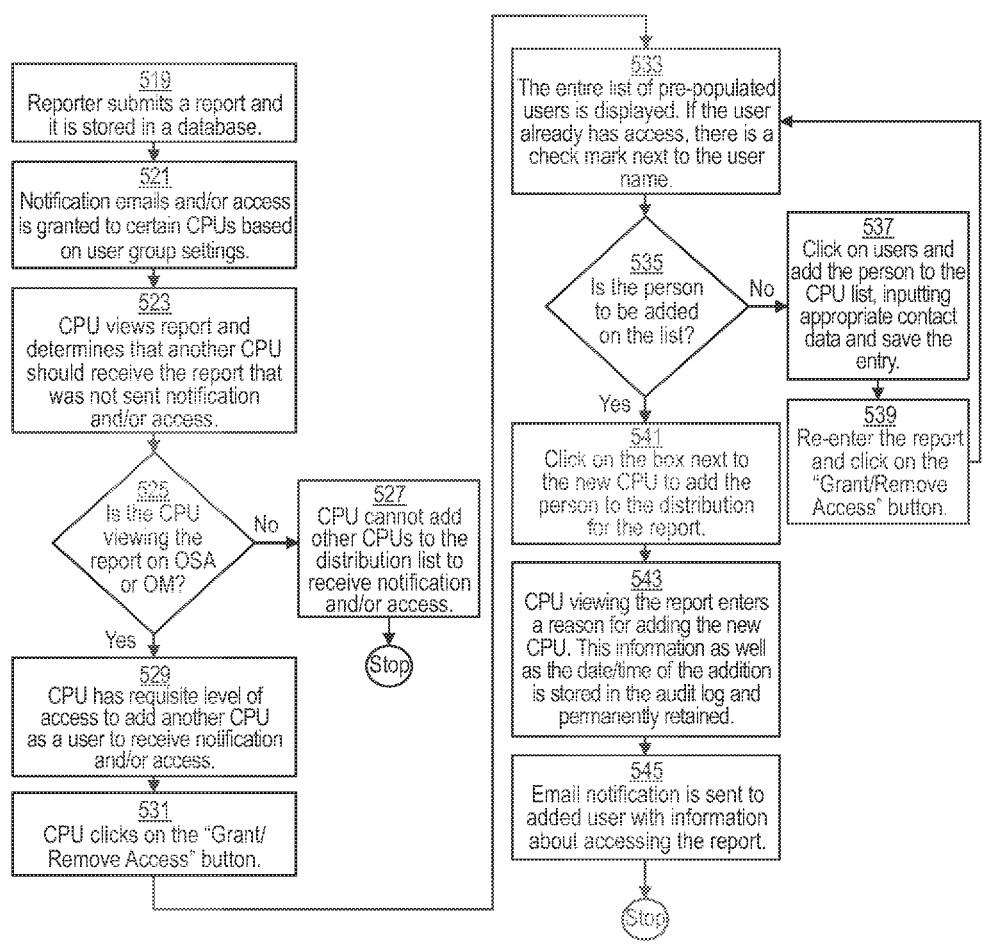
FIG. 36 is a flowchart illustrating one example of changing the report distribution list at the organizational level.

As illustrated in the flow chart of FIG. 36, in one example, the reporter 16 submits a report to the system 10 and the report is stored in a database (519). The System 10 sends notification emails to the users included in the user groups who are designated to have access to the report based on user group settings, such as location, incident type, and privilege level to name a few (521). If a CPU 22 enters the report and determines that another organizational member, who does not have automatic access, should receive the report, then the CPU 22 may grant access for the individual report (523).

In illustrated example, if the CPU 22 has an OSA or OM privilege level (525), the CPU 22 may grant access to the report. For example, when the CPU 22 opens the report, the system may display a table titled "Users Assigned to Incident." In this example, this table has two columns listing every organizational user and his corresponding client organization 14, who has automatic access to view the report. The CPU 22 may then move the on-screen cursor over the "Grant/Remove Access" button at the bottom of the table in the GUI and activate a mouse click operation. In response to the mouse click operation, the system 10 may open a new page displaying a table with the names of all CPUs 22. The CPU 22 may then click on the check box next to each name to grant access to a new user (541), and also provide a written reason for the change. The system 10 stores the reason, date, and time of the change permanently within its audit log (543). The system 10 may be configured to automatically send an email notification to the new user who has been granted access to the report (545).

In one example, if the CPU 22 desires to grant access to a report to a new user who is not previously created for the client, the CPU 22 selects the Users link from the Enterprise portal (537). The CPU 22 creates a new user record for the new user and saves the data. The CPU 22 re-enters the report, and grants access to the new user by utilizing the above-described methods (539).

Graphical and Analytical Display Tools

In another embodiment of the present invention, various graphical and statistical displays of incident report data may be provided to both the client organizations 14 and/or the administrator 12, if desired. These graphical and statistical displays help provide the client organization 14 with the ability to analyze trends or hot points within its organization structure. In one example, historical data may be viewed graphically, based on categories of incident types, report status, aging of active reports, aging of active reopened reports, closure rates of non-reopened reports, closure rates of reopened reports, frequency of reporting over time, and location. FIG. 37 illustrates an example of a listing 600 of the types of reports that may be generated, if desired.

Figure 38:
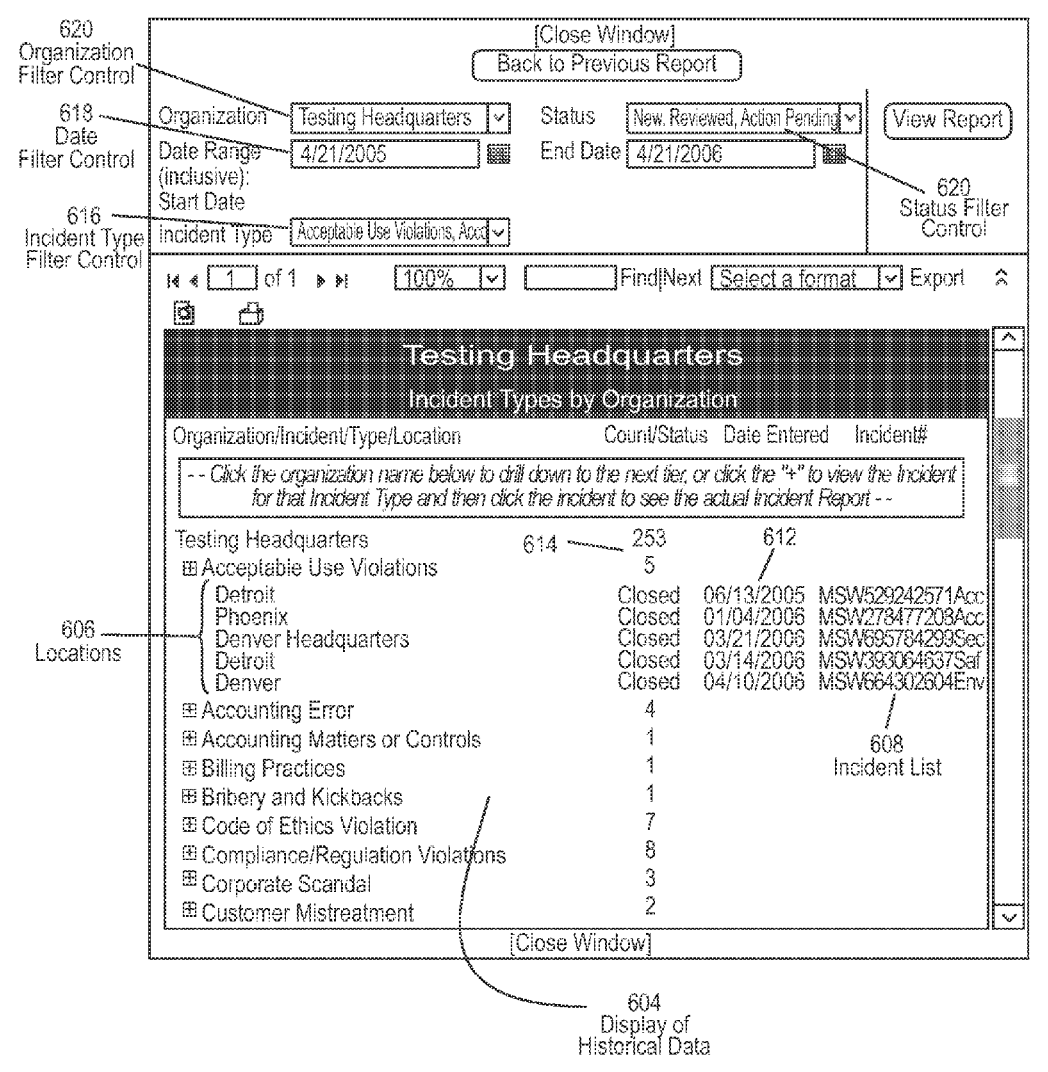

In one example, controls may be provided so that a CPU 22 may view data based on the organization, a date range, an incident type, or a report status. In FIG. 38, controls for each of these parameters are provided which effectively filter the data presented based upon the selection of one or more particular filter parameters. In FIG. 38, a display of historical data 604 for a one-year period of time based on location is provided. This example shows that between the dates of 4/21/2005 and 4/21/2006, there were five "acceptable use violations" in various locations of the organization. The incident list 608 provided includes the internal report number 610 (shown as an incident number), the date the report was entered 612, the status of the report 614, as well as the location related to the report 606. Such a display assists the client organization 14 to examine the types of incidents that are being reported at various locations over specified periods of time. The display of historical data may be filtered using an incident type filter 616, a date control filter 618, an organization control filter 620 and a status filter 620 to further limit the useful information displayed.

Figure 39:
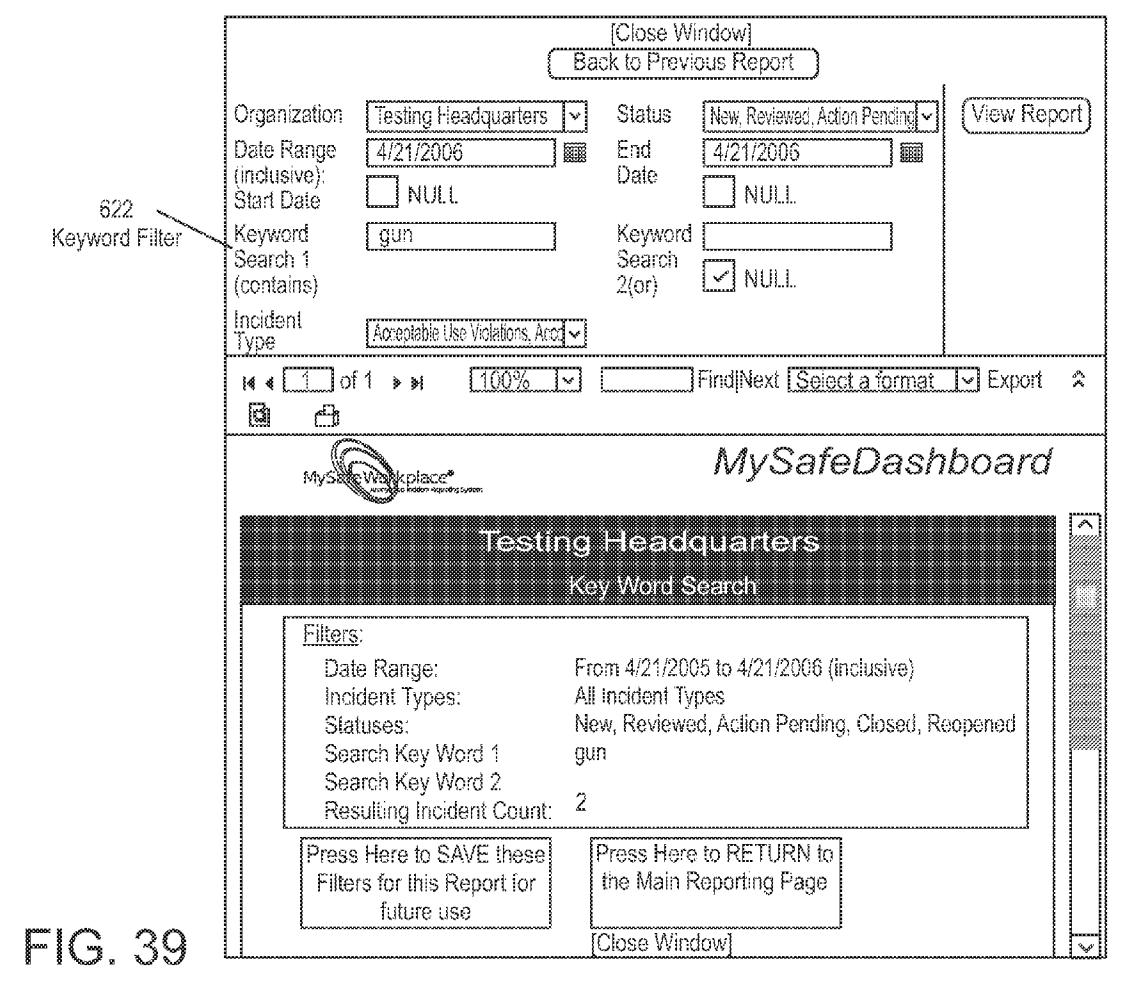
Figure 40:
FIG. 40 illustrates an example of a company/institutional participant filter to filter data across organizations
Figure 41:
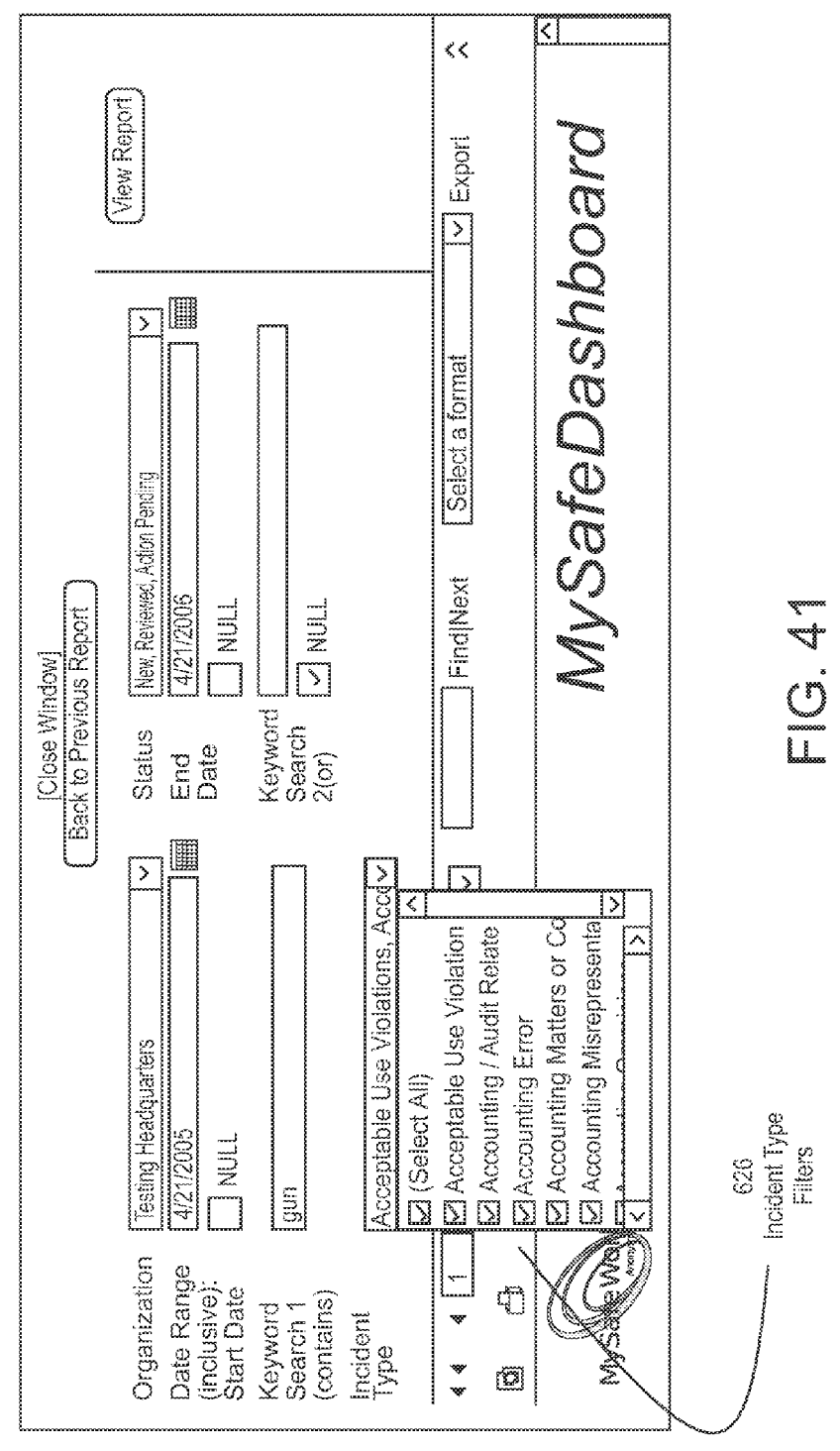

In another embodiment, a keyword search 622 may be provided as a filter parameter, so that a client organization 14 can look for incident reports that include certain keywords, such as the keyword "gun" as shown in FIG. 39. An entity control 624 may also be provided for allowing a client organization 14 to filter data across organizations including parent organizations and subsidiaries thereof, as shown in FIG. 40. An example of an incident type data filter 626 is shown in FIG. 41 that includes a drop down menu listing a plurality of incident types, as well as a control for each incident type to allow the CPU 22 to select or deselect particular incident types for historical display purposes.

Figure 42:
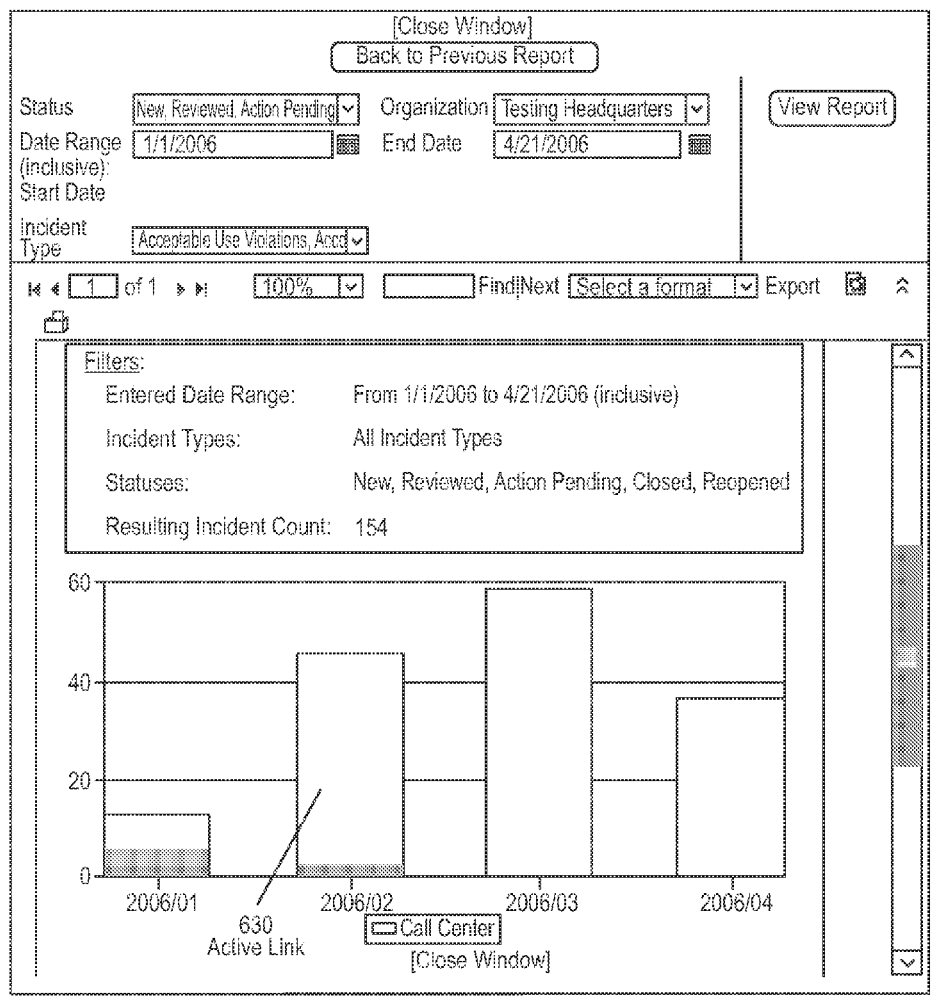
FIG. 42 is an example of a histogram display showing the number of reports filed each month for a four month period.
Figure 43:
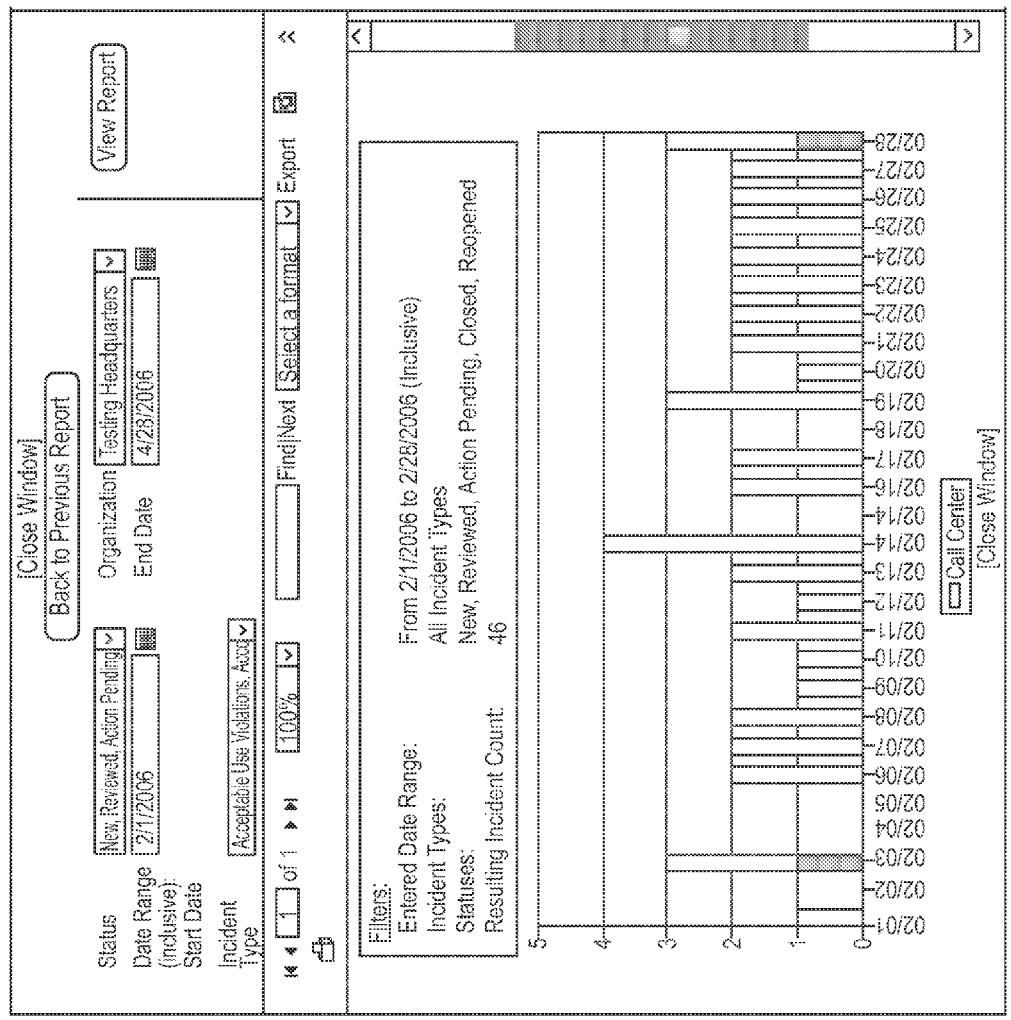
FIG. 43 is an example of a computer display screen shown in response to clicking the active link of FIG. 42.

In another embodiment, a CPU 22 may view statistical information regarding incident reports. In FIG. 42, a histogram 628 is shown which illustrates the number of reports filed each month during the first four months of 2006 which satisfy the filter parameters specified in this example. In one example, each vertical column display is an active link 630 to greater detail data, as shown in FIG. 43, which shows a greater amount of the timing of various incident reports that were filed during the month of February 2006. The columns in FIG. 42 may also be active links to greater detailed information, for instance the user may select the February 14 date in FIG. 43 and, in one example, may be presented with the data from one of the two incident reports 632 that were filed on February 14, as shown in FIG. 44. Preferably, the incident reports are viewed as read-only when displayed through an analytical, graphical or statistical tool. Hence, embodiments of the present invention may be provided with graphical display tools for displaying statistical data or historical data relating to incident reports, in such a manner that if a user desires, the detailed report may be provided as an end point to the data display.

In addition, pie charts can be utilized to display graphical representations of incident reports by incident types, status, or age of reports, as desired. Examples are shown in FIGS. 45, 46, 47 and 48.

Figure 45:
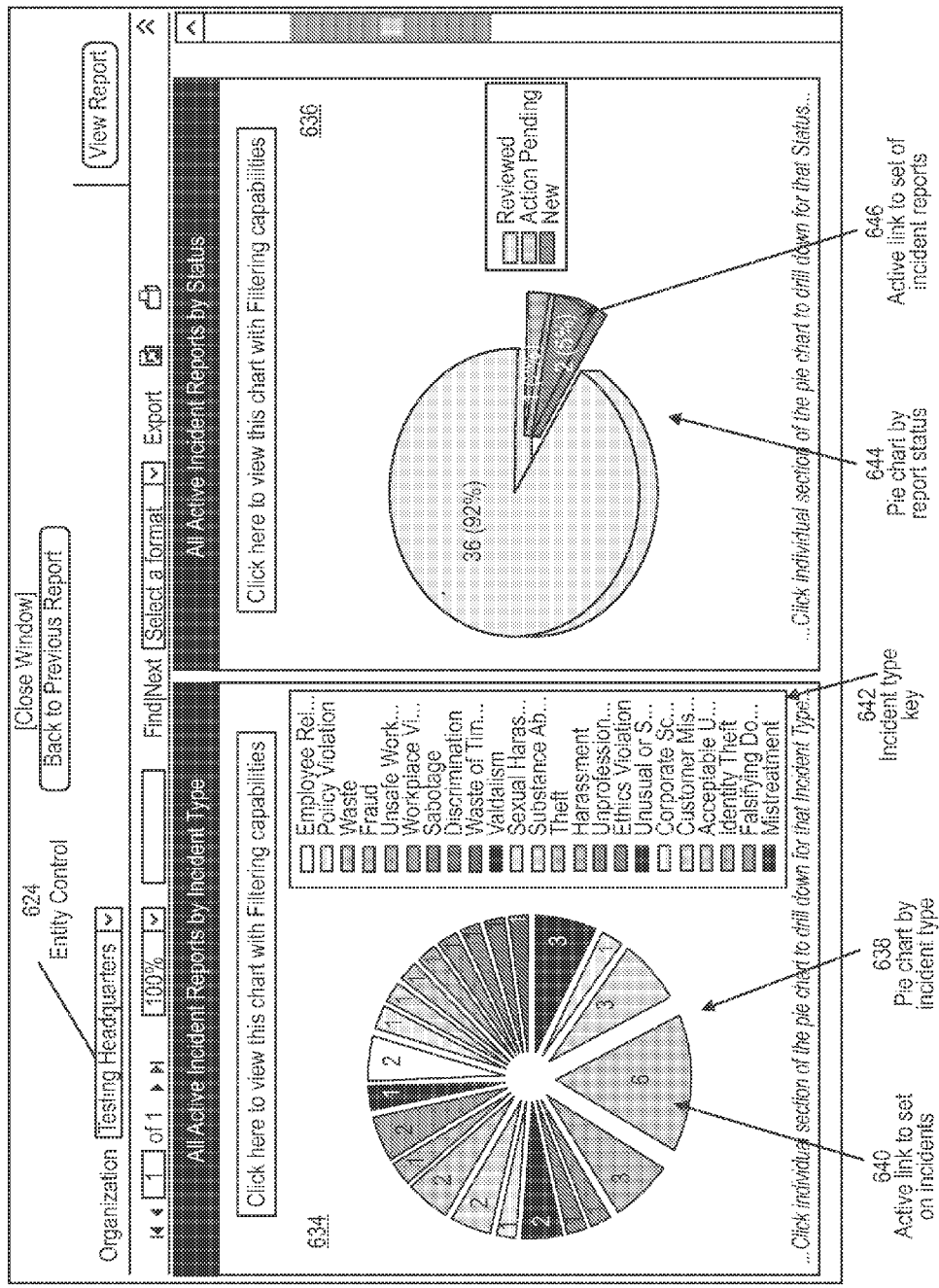
FIG. 45 is a graphical presentation of active incident reports by type and status, in one embodiment.

FIG. 45 illustrates an example of a graphical representation (pie chart) of active incident reports by type 634 and by status 636. Through such a display, a CPU 22 or other user can easily view the number of different incident types of incident reports received by a particular entity. An incident type key 642 may also be displayed, and the pie chart and key are preferably color-coded. In one example, each of the slices or portions of the pie-chart represent a different incident type 638, and each of the slices or portions of the pie-chart are active links 640 which when selected will activate a display of a level of more detailed information relating to the particular incident type selected.

In another example, a pie-chart can be displayed that is divided up based on the current status of incident reports (e.g., reviewed, re-opened, action pending, new, etc.). In one example, each of the slices or portions of the pie chart represent a different incident report status 644, and each of the slices or portions of the pie-chart are active links 646 which when selected will activate a display (such as in FIG. 46) of a level of more detailed information relating to the particular incident report status.

Each segment of the chart, whether displayed as a pie chart or bar chart, is an active link, allowing the CPU 22 to view the specific incident types, by location, which are represented by that segment; and then a further active link from the incident type listing to a read-only version of the actual incident report.

Figure 46:
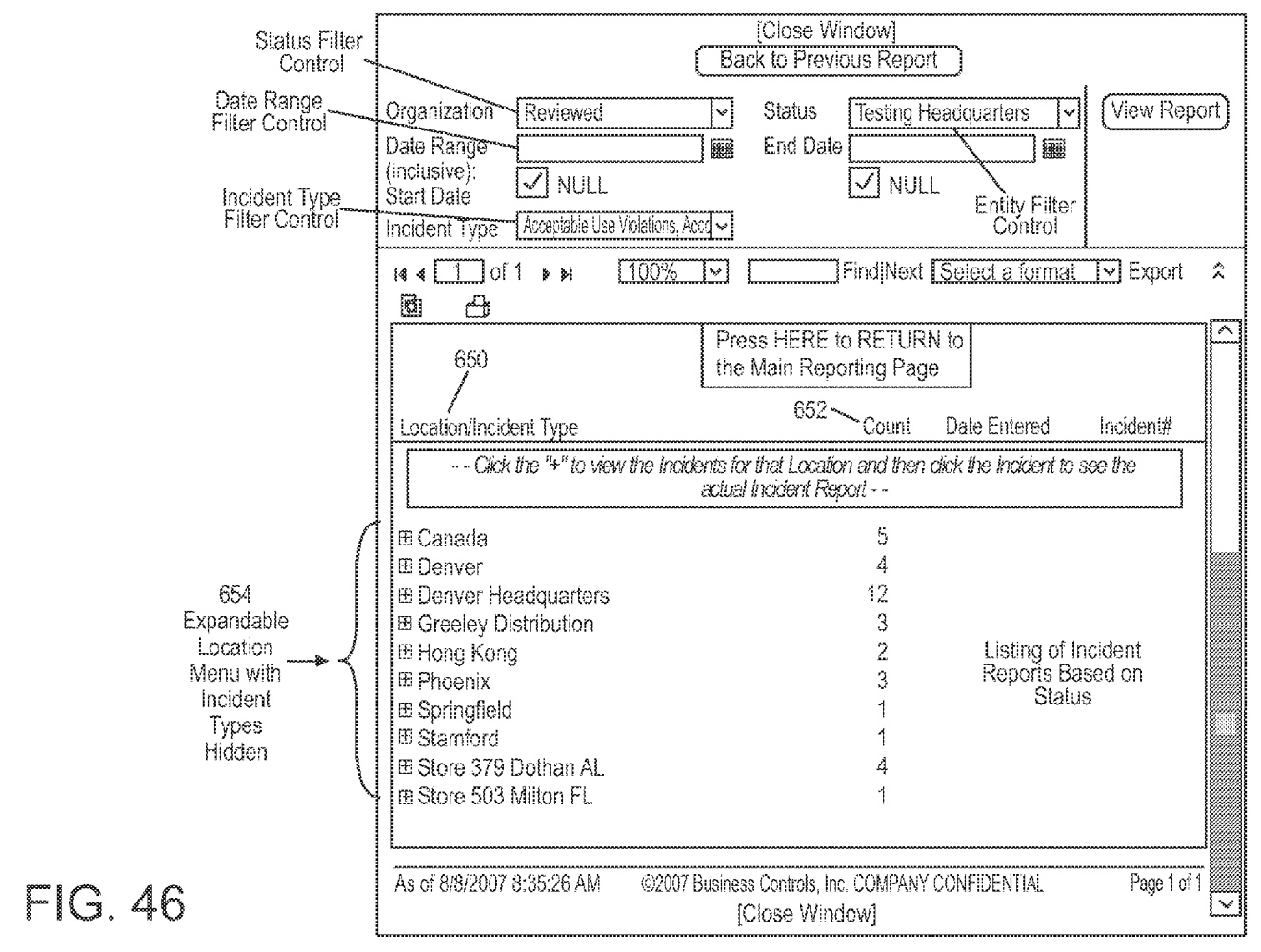
Figure 47:
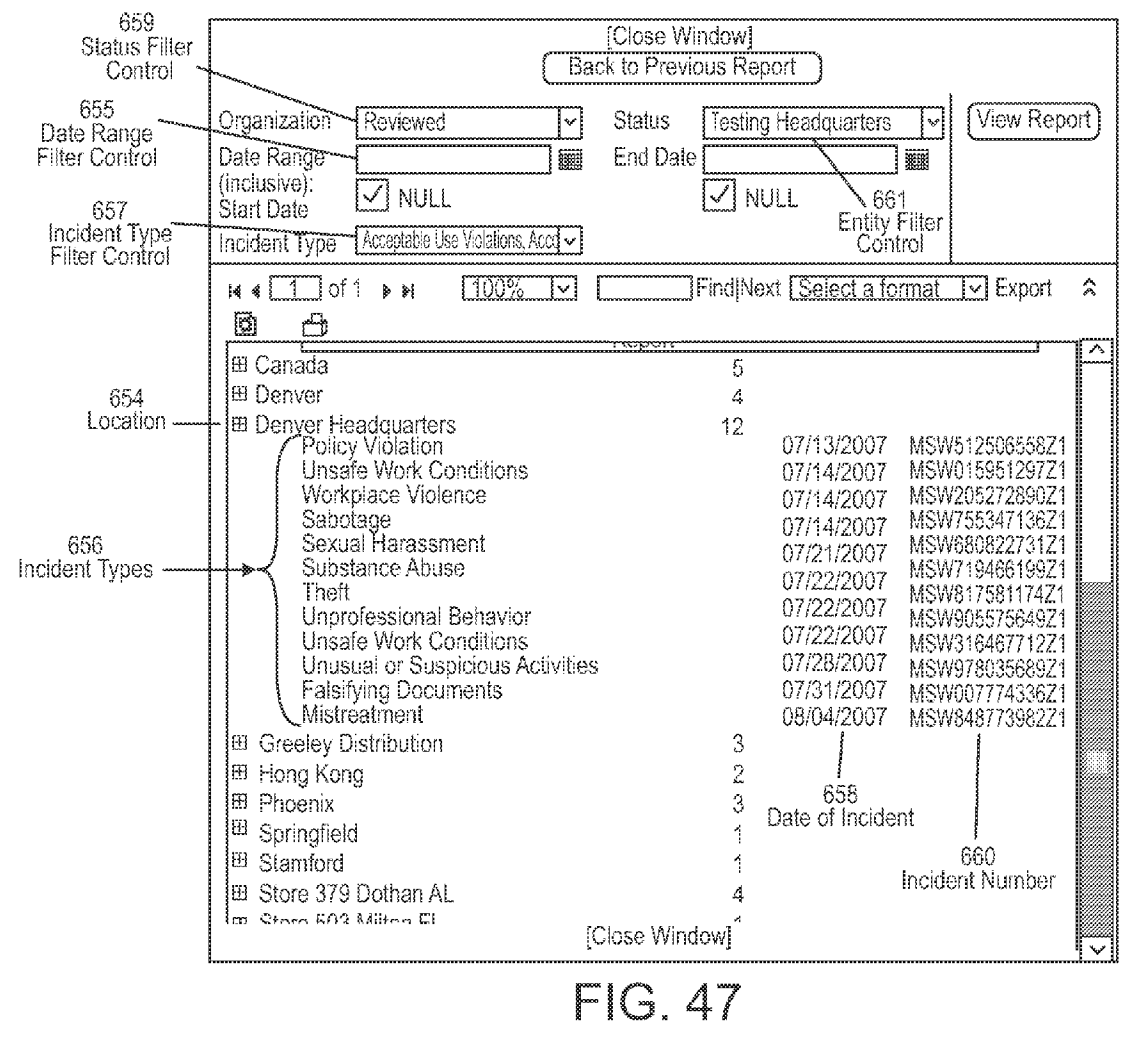
Figure 48:
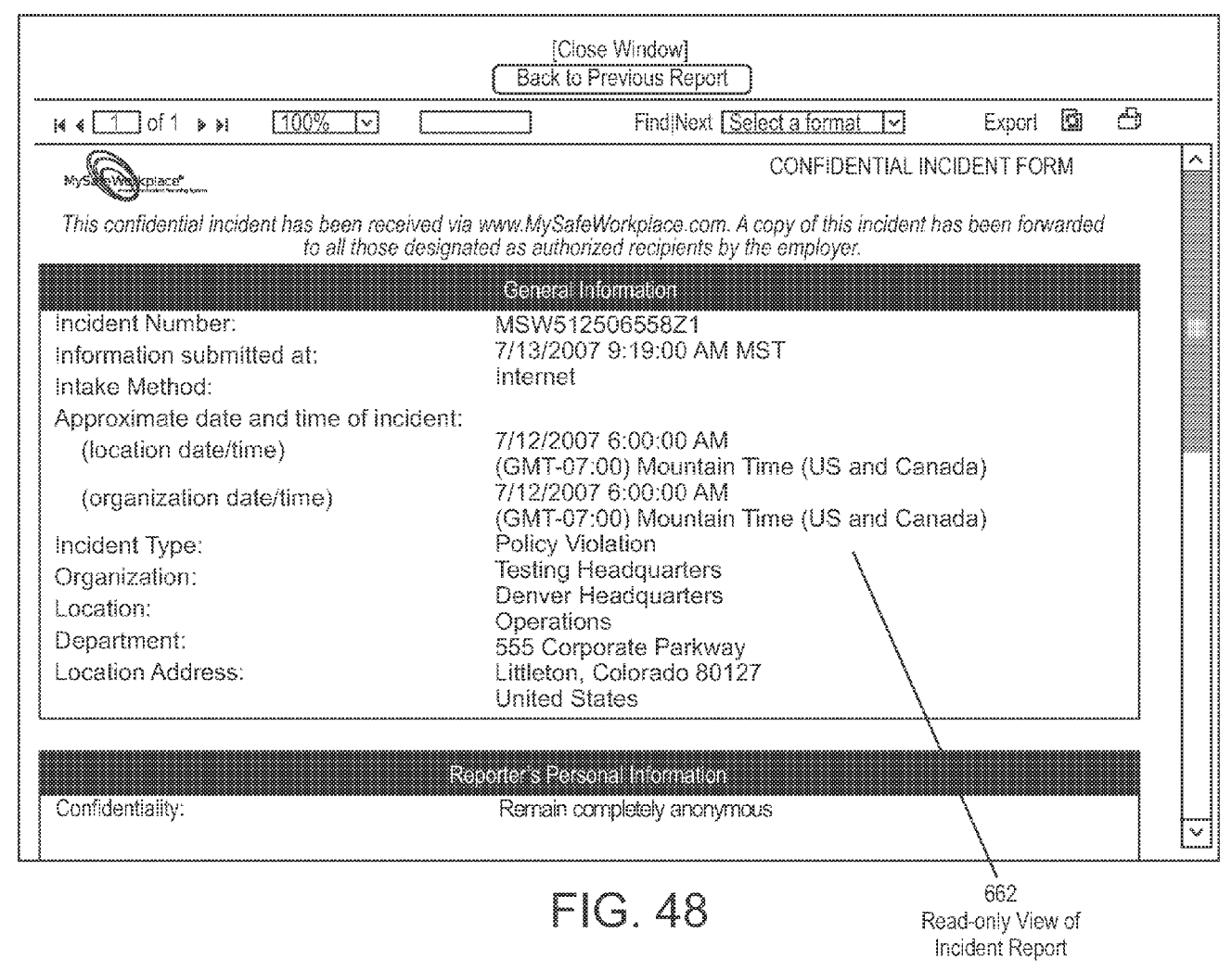

FIG. 46 illustrates a display of a number of reports by location from the pie segment selected from FIG. 45, as FIG. 46 shows a first layer of "drill-down" information. In FIG. 46, a list of locations 650 is displayed along with the corresponding number of incidents related to each location 652. In one example, each location listed in FIG. 46 has a control for expanding the information 654 relating to each location, and in this example the information which may be selectively displayed beneath each location includes the incident types 656, dates of incident 658, and incident number 660 as shown in FIG. 47. As shown in FIG. 48, a CPU 22 may then view, in read-only display 662, any or the particular incident reports listed in FIG. 48.

In one example and as shown in the example computer display screens of FIGS. 46 and 47, these displays can also be provided with one or more filter controls, such as data range controls 655, incident type filter controls 657, status filter controls 659, and entity filter controls 661. These controls/filters can be used by the CPU 22 for specifying parameters in order to display data that is relevant or important, for instance when performing trend analysis.

Investigatory Notes

Figure 50:
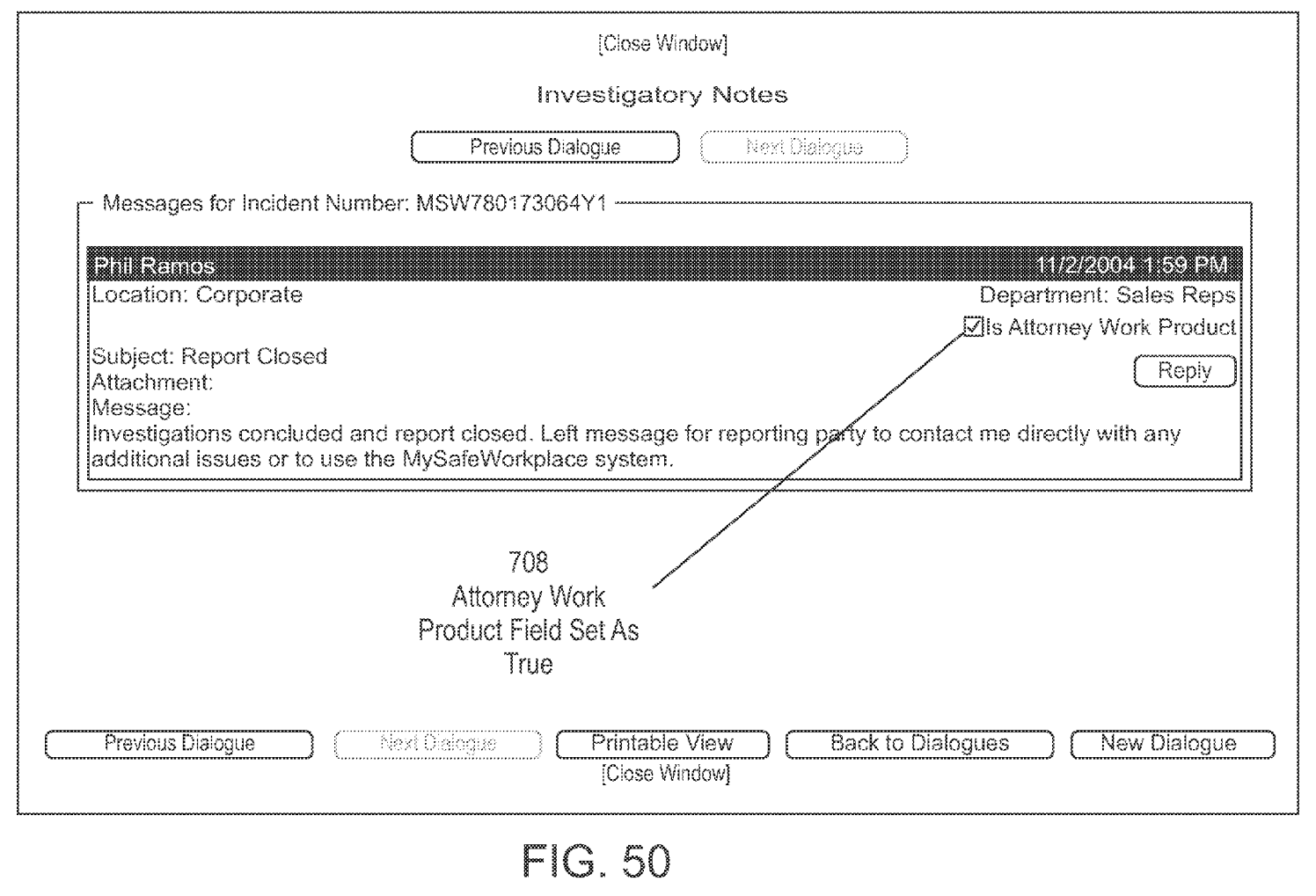

In another embodiment, a system 10 may also be provided with an ability to create and log investigatory notes by a client organization 14, and to designate those investigatory notes as attorney work product. In one example, investigatory notes may be entered into the system in the same manner illustrated and described with respect to the flowchart of FIG. 22. FIGS. 49 and 50 illustrate examples of computer display screens, wherein FIG. 49, an investigatory note screen 700 is provided which has a subject field 704 a body portion 702 for entry of the investigatory notes, and an attorney work product designation control. The attorney work product designation control 706 permits the CPU 22 to indicate whether the particular investigatory note is attorney work product, and when the investigatory note is saved by the system 10, the attorney work product designation control is read by the system and saved as an attribute for each message, stored permanently. In one example, messages or investigatory notes are permanently stored and cannot be altered once posted. Such messages or investigatory notes may be "write once, read many" data types. FIG. 50 illustrates that the message posted by the CPU 22 has been designated as attorney work product by setting the attorney work product field 708 set as time.

Aliases for Client Organization's Name

Figure 51:
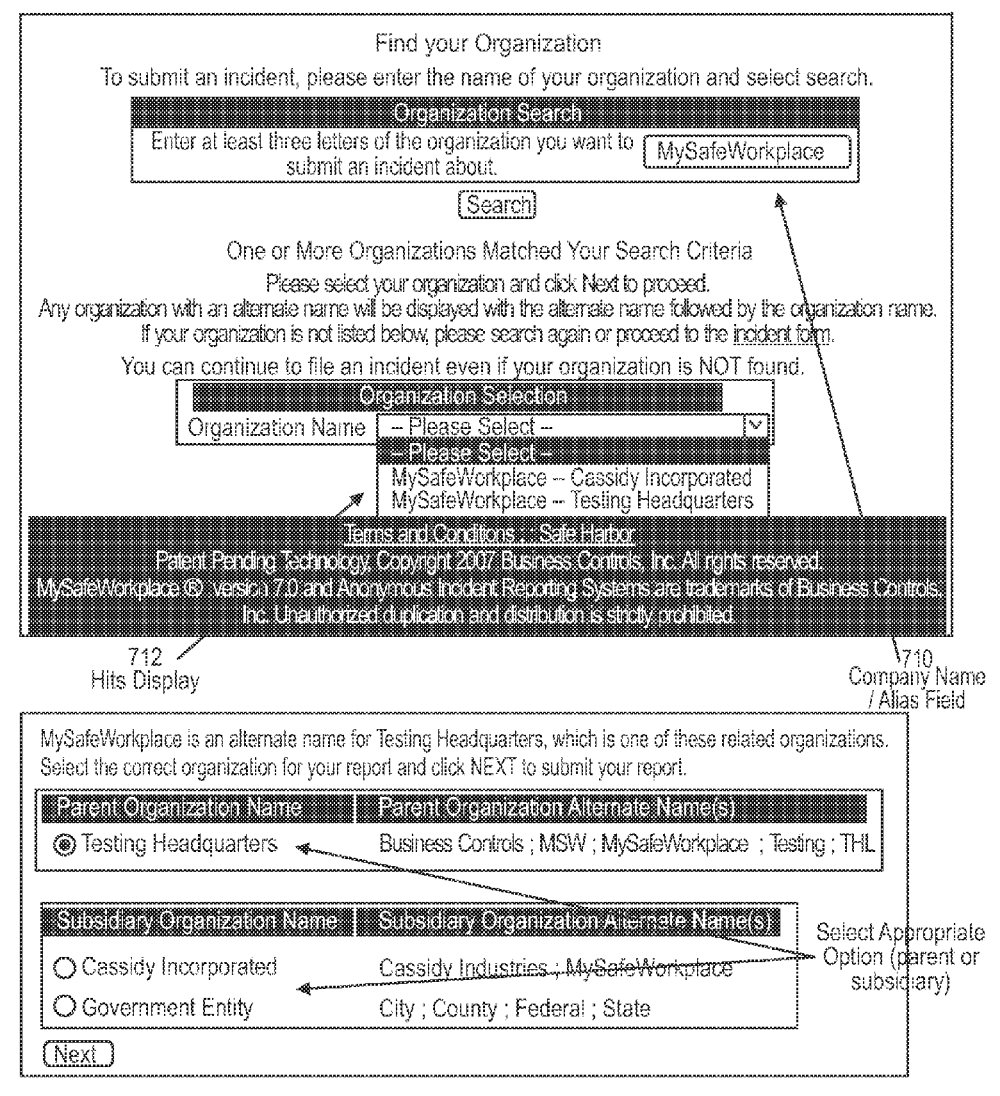

A system 10 may also be provided with a feature that permits a reporter 16 to enter an alias of a client organization 14 name when preparing an incident report. The establishment of aliases permits the client organization 14 to make it easier for a reporter 16 to specify the client organization 14, through the use of alternative names of an organization. For instance, if the formal client organization 14 name is MySafe-Workplace, the client organization 14 could establish an alias or nickname for that client organization 14 as MSW. Generally, this capability may be provided and established through the client organization's 14 enterprise portal during setup or as a property, as the organization can define one or more aliases for the organization's name. Once the aliases have been established, in the report intake portal, an organization's search field is displayed to the reporter 16, and the reporter 16 enters the formal client organization 14 name or the alias or nickname for the client organization 14. The characters entered by the reporter 16 may then be searched against the literal names stored in the databases 15, as well as against all of the aliases stored in the databases 15. Conventional search algorithms may be employed as desired. FIG. 51 illustrates an example of a display screen wherein the reporter 16 enters data into a client organization 14 name/alias field 710 and in response, the computer display shows a drop-down list 712 of the hits that are generated so that the reporter 16 can select the proper entity which it desires to make an incident report on.

Log of Views of Incident Reports

Figure 52:
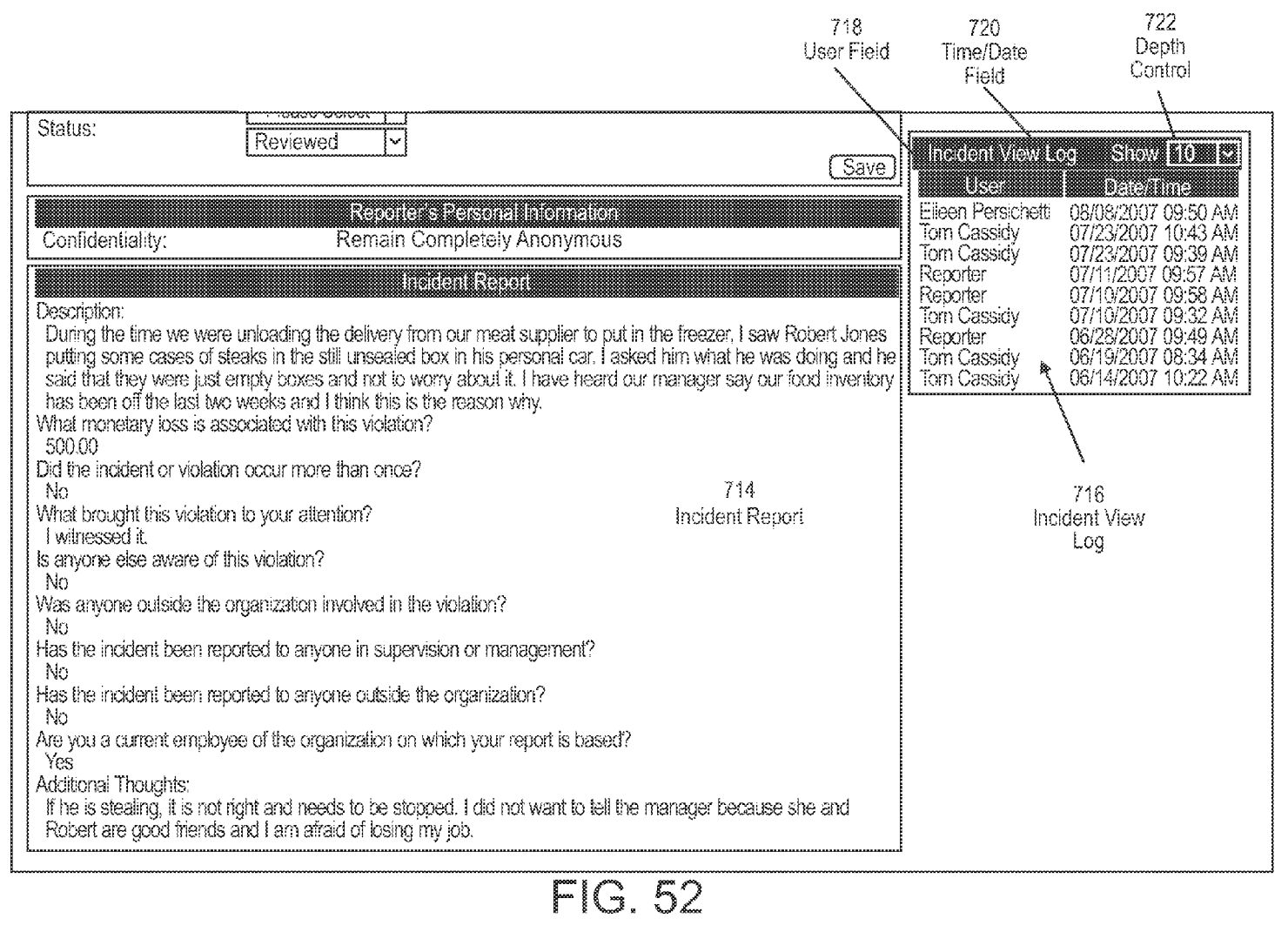

A system 10 may also be provided with a "view log" tracking feature wherein a log is maintained of each individual that has viewed a report, as well as a time and date stamp when that viewing occurred. In one example, when the software received a request from a user (such as a CPU 22 or the reporter 16) to view the report, the software writes the user ID, the report ID, and the data and time stamp to a log table. In one example, the software maintains a single table that stores all incident report views and all access to incident reports, and such data may be stored sequentially and linearly and indexed by the report ID, if desired. This feature provides an audit trail in terms of individuals who have reviewed a particular incident report. FIG. 52 illustrates an example of a computer display screen wherein an incident view log is shown associated with a particular incident report. The incident view log, in one example, includes a listing of each time a particular incident report was viewed, and may include a user field specifying which user (or an anonymous reporter 16) viewed the reports, and a time and date field indicating when the particular user accessed the incident report. A depth control may also be provided which permits the CPU 22 to control the depth of the log that they are viewing. The log may be displayed in chronological or reverse chronological order, or any other order desired.

Figure 53:
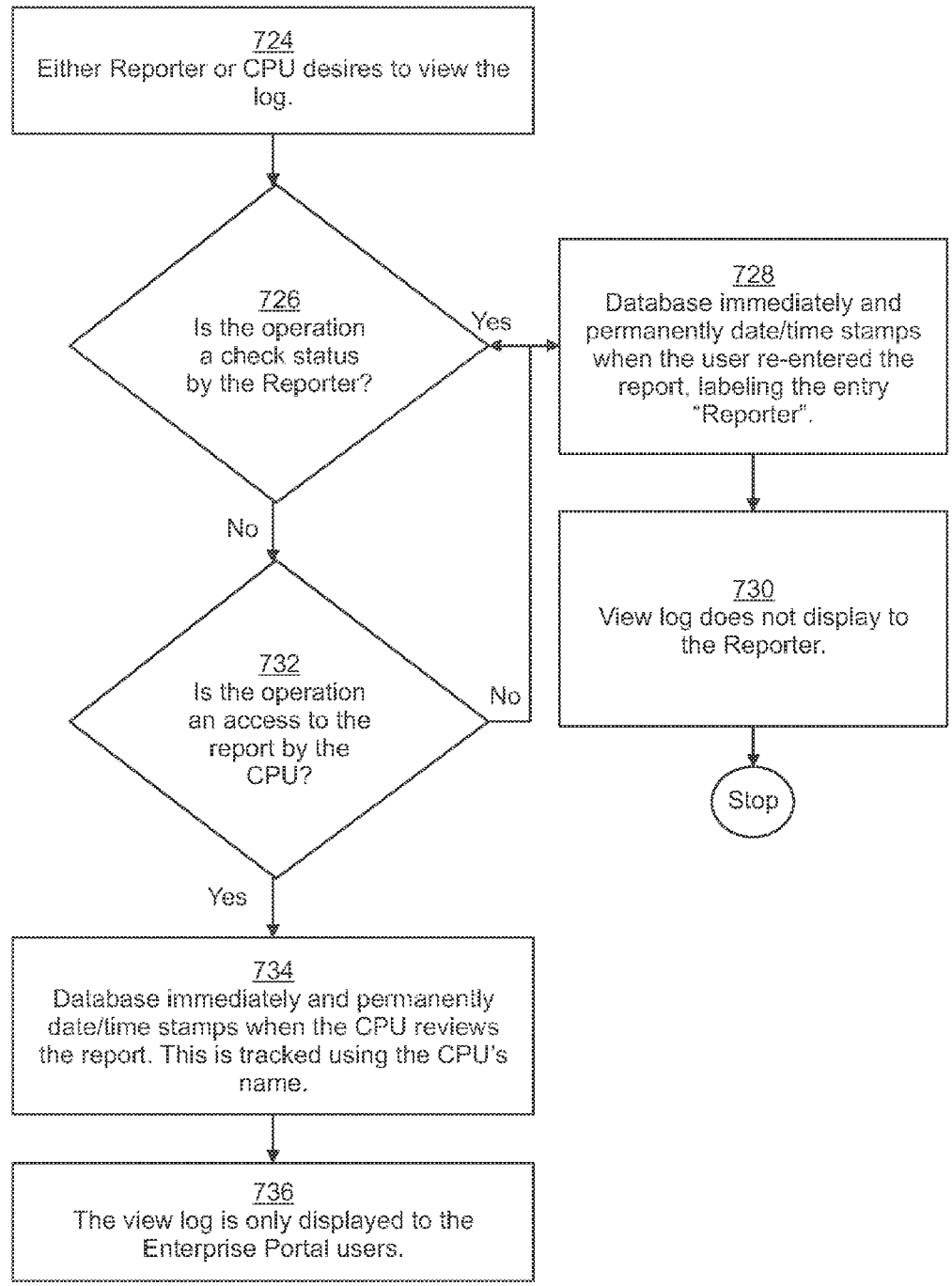
FIG. 53 is a flow chart illustrating one example of a view log operation.

FIG. 53 illustrates an example of a view log operation that may initiate after user accesses system 10 as described in FIGS. 6A and 6B. In one embodiment, if the user is the reporter 16, he accesses the system 10, subsequent to filing the report, by selecting the "Check Status" button on the home page 724. Typically, upon selection, the system 10 immediately and permanently saves the date and time when the reporter 16 re-enters the report in a database 728. The view log does not display the date and time stamp to the reporter 16 (730).

In another example, if the user is the CPU 22, he accesses the system 10 by moving the on-screen cursor over the hyperlink contained in the email notification and performing a mouse click operation or by accessing the client-specific webpage. For either operation, the system 10 immediately and permanently saves the date and time when the CPU 22 views the report. The date and time stamp is typically saved using the CPU's 22 individual name (734).

Typically, the system 10 displays the view log for CPU 22, but not the reporter 16, under the title "Incident View Log." In one example, the View Log has two columns: (i) "User" which lists the names of the CPUs 22 who viewed the report and "reporter" to identify the reporter 16 when he has viewed the report, and (ii) "Date/Time" which lists the corresponding date and time that the user viewed the report.

Spell-Checking for Report Input

Figure 54:
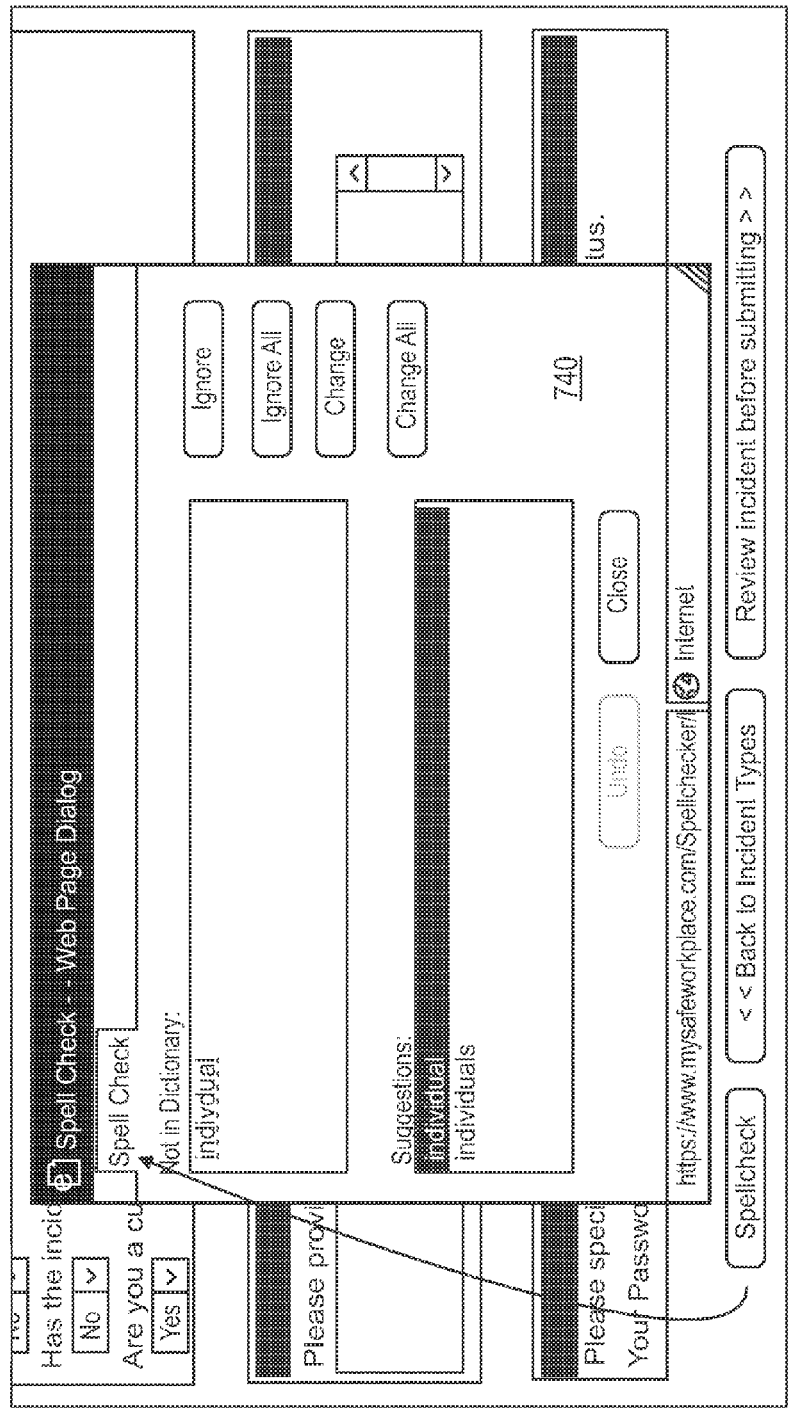
FIG. 54 illustrates an example of a computer display screen having a spell check control.

A system may also be provided with spell check functionality for each report input. For instance, spell check functionality may be provided to spell check the body of the report details prior to a reporter 16 finally submitting the incident report. Spell check functionality may also be provided for each message board posting, prior to submission of a particular message. In one example, conventional spell checking may be provided with a U.S./English dictionary, although other languages could be supported if desired. Moreover, specialized dictionaries, such as medical dictionaries, legal dictionaries, automotive dictionaries, or the like, could be utilized as well with the spell check, as desired. FIG. 54 illustrates one example of a computer display screen 740 wherein a spell check control is provided for the reporter 16 prior to submission of a report.

Automated Report Questions and Automated Follow-Up Questions

In another embodiment, a system 10 may be provided with predefined or automated report questions that are specific to particular incident types. As described above, the client organization 14 or CPU 22 can specify the types of incidents that are available for a reporter 16 to file an incident report on. In one example, when a reporter 16 selects a particular type of incident to file a report on, the system 10 automatically selects a set of questions that are specifically tailored to the particular incident type selected by the reporter 16. In this way, the system 10 adapts the questions posed to the reporter 16, and thereby permits more relevant information to be obtained from the reporter 16 with respect to the particular incident type. In one example, the incident type will dictate which questions are used and presented to the reporter 16. Questions may be defined in database 15 and associated with different incident types which are tied to a particular organization.

For instance, FIG. 55 illustrates an example of a plurality of different incident types 742 that may be presented to a reporter 16 for selection when making an incident report. The incident types include "accounting error," "accounting misrepresentation," "accounting omission," and could include various other types of incidents depending upon the implementation. If the reporter 16 selects "accounting error" as the incident type, then in one example, system 10 may display questions 746 related to the "accounting error" incident, as shown in FIG. 56. If, however, the reporter 16 had selected an incident type of "workplace violence," then different questions 748 related to workplace violence (and not to accounting errors) would be displayed to the reporter 16, as shown in FIG. 57.

In another embodiment, a system 10 may be provided with automated follow-up questions that are displayed based on a reporter's 16 input or responses to prior questions. In one example, questions may be stored in the database 15 as having automated or smart follow-up questions, and if a particular automated question is answered with a first response, then the software displays a particular first follow-up question; and if such a question is answered with a second response, then the software displays a second follow-up question, the second follow-up question being different than the first follow-up question. FIGS. 58 and 59 show an example of automated follow-up questions, wherein in FIG. 58, the initial display screen 756 is shown, and in FIG. 59, based on the reporter's 16 answers to a first question, a subsequent set of questions 762 are displayed which ask for additional information. In this manner, the questions presented to the reporter 16 are adaptive based on the input received from the reporter 16.

Figure 60:
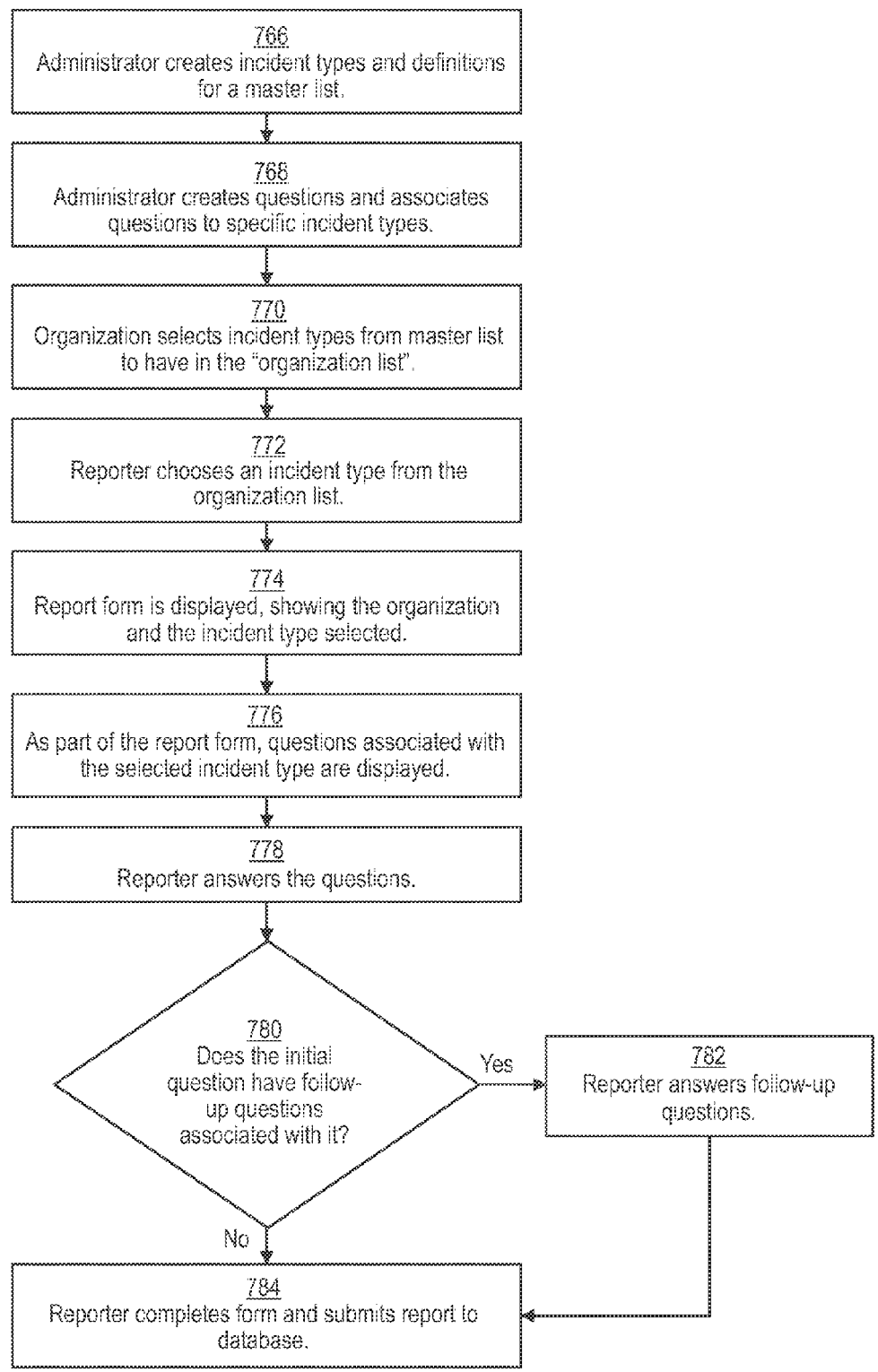
FIG. 60 is a flow chart of one example of a reporting party answering a series of questions in a report.

In accordance with the flowchart of FIG. 60, for one example, in the "system set-up" section of the database, the administrator 12 creates incident types and definitions (766). This list is the master list of incident types that the CPU 22 may select from to determine what incident types are allowed for their employees to report on. Typically, the administrator 12 creates questions and associates them with each incident type (768). A link is then created between incident types and associated questions within the system 10, typically in code by a programmer.

When establishing an client organization's 14 configuration in the system 10, the CPU 22 selects incident types from the master list (770). They may also determine the order in which incident types populate for their employees. For instance, workplace violence may be their biggest concern so it is the first option for employees to chose from.

When filing a report, the reporter 16 chooses from the incidents designated as options from the client organization 14 (772). The report form is displayed and includes the organization name and the incident type chosen (774). As the reporter 16 scrolls through the questions on the report form, only the questions associated with the chosen incident type are displayed to the reporter 16 (776). The reporter 16 answers the questions in the form (778). Depending upon the answer of the reporter 16, follow-up questions may populate the report. For example, an answer to the question "Did the incident or violation occur more than once?" may populate the report with the follow-up question "How many times did it occur?"

The reporter 16 completes the report and submits it. The report is stored in system database 15 and sent to appropriate CPUs 22 based on user group distribution matrix.

Selectively Enabling/Disabling Notifications Regarding Report Activity

In another embodiment, a system 10 may be provided with a control to deactivate or disable report activity notifications after initial notifications have been sent to CPUs 22. In one example, CPUs 22 can be set up with access to reports without any notifications (i.e., access to reading reports without necessarily being notified of a filing of a report or of any message board activity related to the report); or can be set up to receive notifications of the filing of incident reports and any changes to those reports; or can be set up to have access to reports as well as receive notifications of incident reports and changes to such reports.

FIGS. 61-63 illustrate examples of client organization's portal and user groups with notification attributes. In FIG. 61, the user groups 790 that have been defined for a particular client organization 14 are listed, and for each user group, particular incident types 792 can be assigned for reporting to that particular user group. Further, incidents related to particular locations 794 can be assigned or associated with a particular user group, and a designated contact person 796 may be specified per user group. For instance, in the example of FIG. 61, the "audit committee" has been assigned or selected to receive notifications of any incident reports relating to 13 particular incident types (shown in FIG. 62), and one individual has been designated as a contact person for receiving notifications relating to the incident types assigned for the audit committee.

In FIG. 62, a list of incident types 800 is displayed, with a control 798 for each to be assigned or associated with the particular user group of "audit committee." For each incident type, different notification controls may be provided so that a user group can define the type of notification that they received with respect to specific incident types. An access only control 802 permits the user group to access an incident report, but not to receive any e-mail notifications of the filing of incident reports or any related activity to the incident report specific to a particular incident type. A second control 804 may be provided that, when enabled, provides the user group with e-mail notifications of the filing of an incident report and any changes to the incident report thereafter, but does not include any e-mail notifications of message board postings related to the incident report, in one example. A third control 806 may be provided which, when enabled, provides the user group with e-mail notifications of all activity relating to an incident report of a particular type, including the filing of an incident report, the change to an incident report, and all message board postings or other activity related to the incident report.

If desired, on a user level for a CPU 22, a set of controls may be provided which defines the notification properties for that user. FIG. 63 illustrates an example of a computer display screen wherein a control 808 is provided to notify the particular user via e-mail of the filing of incident reports and subsequent changes/audits of the incident reports; or for the user to receive notification of all e-mail messages relating to activity relating to an incident report, changes/audits, and message board activity.

Figure 64:
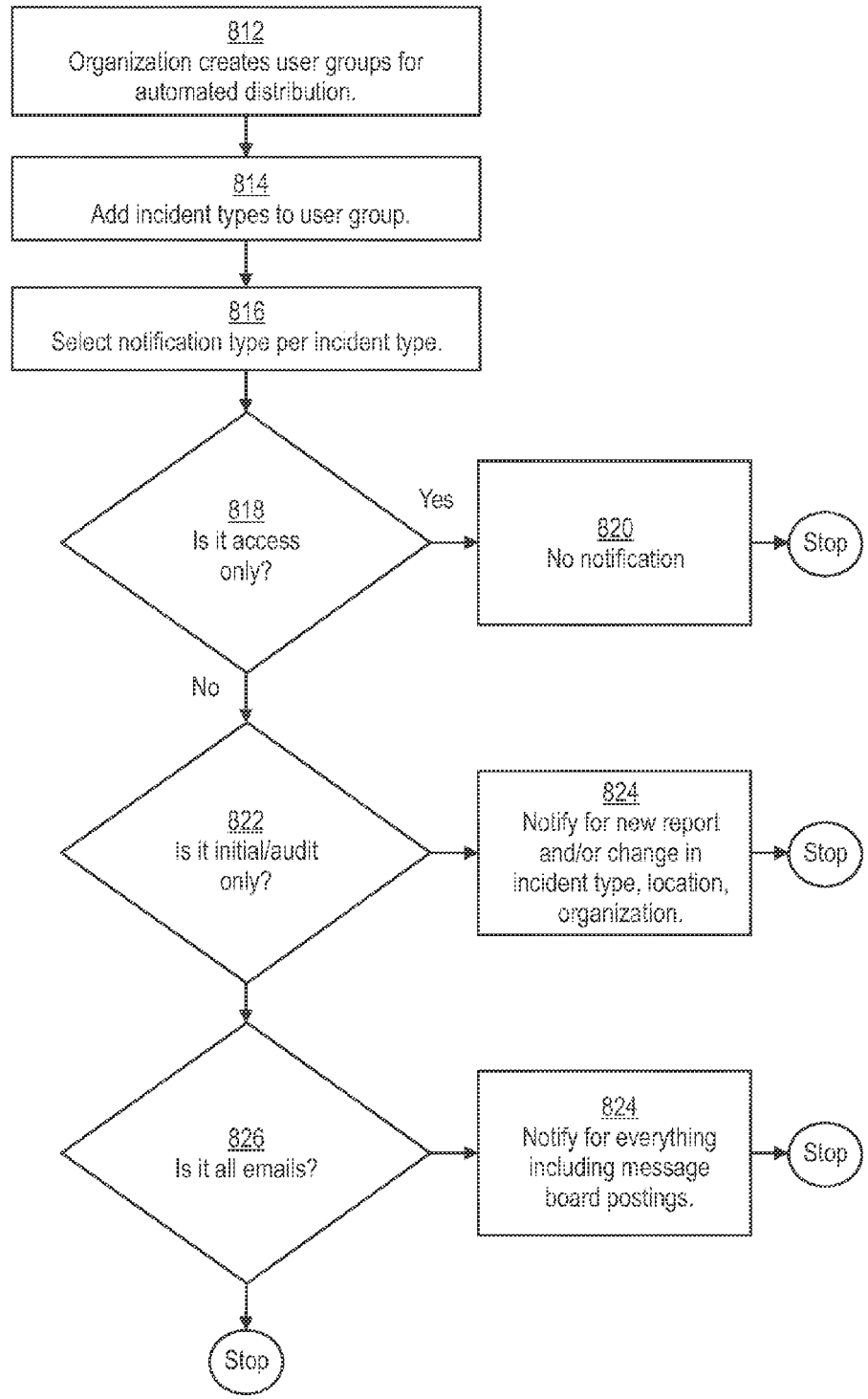
FIG. 64 is a flowchart showing one example of creating user groups for automated distribution of reports.

As illustrated in the flow chart of FIG. 64, the CPU 22 creates user groups for automatic distribution of reports based on predefined parameters, including incident types, locations, and individual CPUs 22 (812). The CPU 22 clicks his mouse on the "User Groups" link in the Enterprise Portal, causing the system 10 to open a new page displaying a user groups table with columns for "User Group Name," "Incident Types," "Distribution," "Users" and "Active." The CPU 22 clicks on the "Add" button on the page to create a new user group.

The system 10 opens a new page which requires the CPU 22 to create the name for the user group (for example, "Legal"). When the CPU 22 clicks "Save," the system 10 refreshes the screen and includes the new user group name in the user group table. The CPU 22 then clicks on the number under the incident types column (which the system defaults to 0), and the system 10 opens a new page displaying all available incident types for the client. The CPU 22 then checks the box next to each incident type for which the user group should receive notification. The CPU 22 may then select which notification type should relate to each incident type (816).

In one embodiment, the three notification type options may be (i) "Access Only," (ii) "Initial/Audit Emails Only," and (ii) "All Emails." The CPU 22 selects the notification type by clicking in the corresponding button on the same page. The "Access Only" notification level directs the system 10 to provide no notification of reports to the user group, but allows the CPU 22 within the user group to have access to an individual report when he logs into the System (820). The "All Emails" notification type directs the system 10 to provide automatic email notification to the users of the user group of all reports and activity and allows the CPUs 22 to have access to all reports (828). The "Initial/Audit Emails Only" notification type directs the system 10 to provide notification of all reports only for the initial notice that the report was made, and any audit change to the distribution of the report, but not for message board or investigatory notes activity (826). Further, it also provides the CPUs 22 within the user group access to all reports within that incident type. Once selected, the system 10 refreshes the screen to include the notification type information.

The CPU 22 then selects the icon under the Location/Distribution column and the system 10 opens a new page displaying the client organization's locations. The CPU 22 click his mouse on the boxes next to the locations to be associated with the user group. When the CPU 22 clicks "Save," the system refreshes the screen and includes the locations in the user group table. The CPU 22 then clicks on the number under the users column (which the system defaults to 0), and the system 10 opens a new page displaying all available users for the client. The CPU 22 then checks the box next to each CPU 22 who should receive notification within that user group.

Verification of Suspect Names and Access Blocking from Incident Reports

In another embodiment, a system 10 may include a feature to verify suspected individuals involved with an incident report. In large organizations, there may be many individuals who share the same last name, and accordingly, embodiments of the present invention may include a name search and verification feature. As described above, the reporter 16 is asked to list individuals that may be involved in the particular incident. (See FIG. 65, for example, which includes fields for specifying suspects 832) In one example, the software, upon receiving the data entered by a reporter 16 that specifies a suspect, searches the database 15 against a list of CPUs 22 provided by the client organization 14 as well as their titles or positions. Upon searching the database for the name entered by the reporter 16, the software may confirm the suspected individual name by displaying the name and position/title of the suspected individual to the reporter 16, as shown in the example of FIG. 66.

In FIG. 66, the display is provided with a confirmation control 838, along with a display of a name field 834 and title field 836 that permit the reporter 16 to confirm that the suspected individual specified earlier (i.e., in FIG. 65) by the reporter 16 is in fact the appropriate person to list as a suspected individual.

Figure 67:
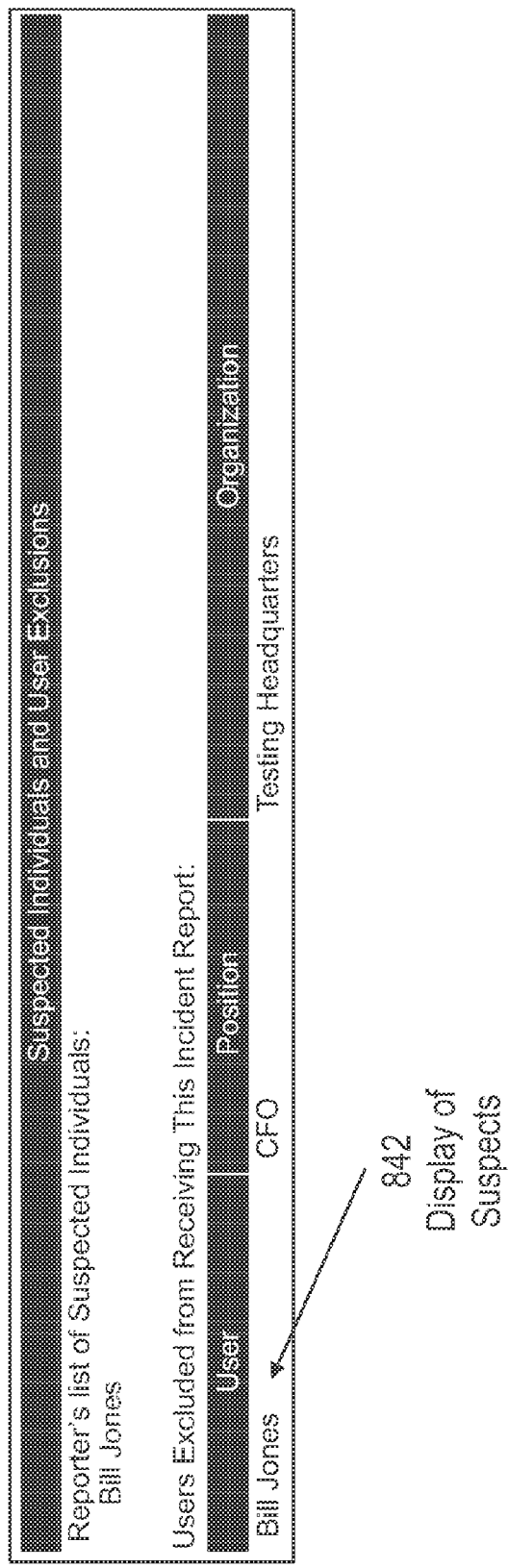
FIG. 67 illustrates an example of a computer display screen showing a party that is excluded from receiving reports based upon the reporting party naming the excluded individual by the reporting person.
Figure 68:
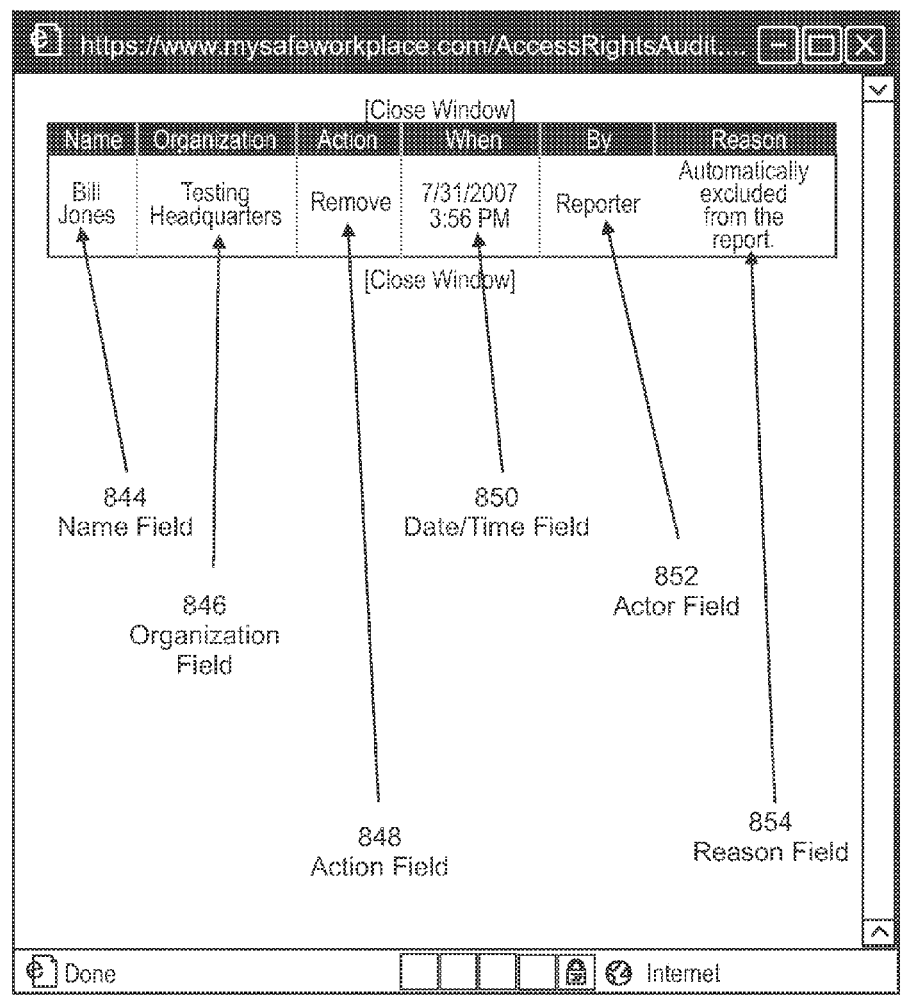
FIG. 68 illustrates an example of a computer display screen showing information related to an excluded party.

As discussed above, if a suspected individual for a particular incident report is also in the e-mail distribution for the particular incident report (i.e., suspect is included in the client organization's 14 access and notification parameters), in one example, the suspected individual is excluded or removed from the e-mail distribution (i.e., removed from notification and access) for the incident reports so that the suspected individual does not receive an e-mail notification, have access, or receive any other information from the system 10 related to the incident report. FIG. 67 illustrates a display 842 of an exclusion from receiving an incident report based on the naming of a person as a suspected individual by the reporter 16. In one example, the removal of the CPU 22 from the e-mail distribution/notification and any other communications may be logged by the system 10, as is shown in FIG. 68. In FIG. 68, a log entry may include a name field 844 specifying the name of the CPU 22, an organization field 846 specifying the CPU's 22 organization, an action field 848 specifying the action that was taken with respect to the individual (i.e., removing this individual from the e-mail distribution), a time and date field 850, an actor field 852 specifying who took the action, and a reason field 854 that explains the reason for the action.

Figure 69:
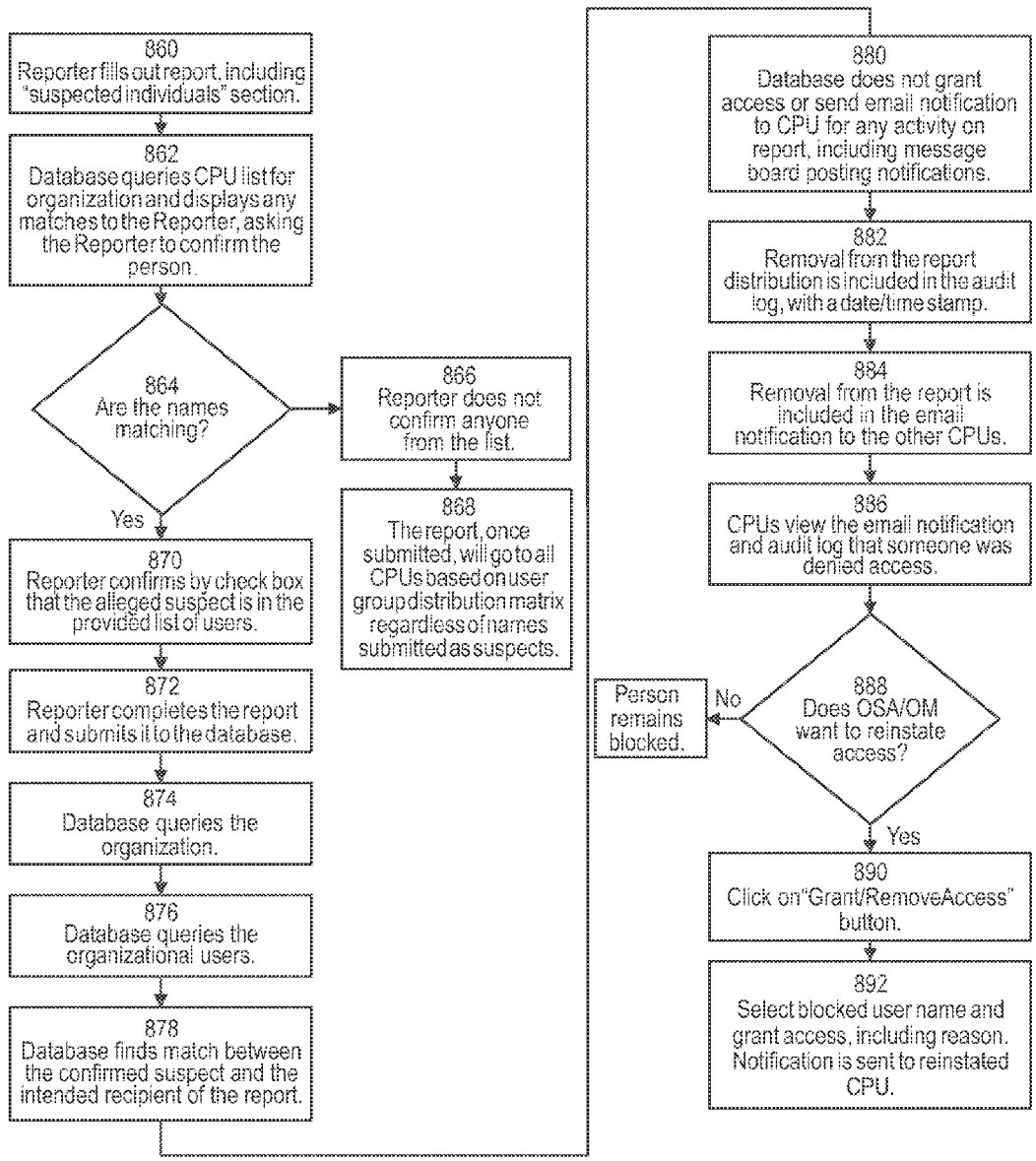
FIG. 69 is a flowchart illustrating an example of excluding a suspected individual from a report distribution by a reporting party.

In accordance with the flowchart of FIG. 69, for one example, the reporter 16 fills out report, including "suspected individuals" section (860). The reporter 16 lists the first and last name of the people they suspect to be involved. If they do not know one of the names, they enter "unknown" in the suspected individuals section. The reporter 16 submits the report upon completion.

The System searches for a direct match between those names listed and any CPU 22 in the database for that client organization 14 (862). Typically, the spelling of the names must be an exact match, however, in another example, phonetic and frequently misspelled names may also be searched. If the system 10 locates a match between the suspected individuals listed by the reporter 16 and a CPU 22 in the database, the system 10 will prompt the reporter 16 to confirm the individual (862). A screen populates with any CPU 22 that matches the reporter's 16 entry in the suspected individuals section of the report.

Continuing with the example of FIG. 69, if the reporter 16 locates a match in the list provided as a result of the search by system 10, the reporter 16 checks the box by the alleged suspect's name (870). The reporter 16 then completes the report and submits it to the system 10 (872). In the illustrated example, the system queries the organization, and more particularly, the CPUs 22 of the organization (876).

In a typical situation, the system 10 sends automatic email notifications and/or access to CPUs 22 in accordance with user group distribution matrix. However, if the system 10 locates a match between the confirmed suspect and one of the intended recipients of the reports (as determined by the user group distribution matrix) (878), the system does not grant access or send an email notification to the CPU 22 who was listed as the suspect (880). The CPU 22 does not have access to any activity on the report, including initial email/access, message boards, or audit emails and logs). The CPU 22 is disabled from the report. The system 10 automatically logs the CPU's 22 removal from the report in the audit log (882). The removal of the CPU 22 is date and time-stamped and lists removal as "automatically excluded from report." CPU's 22 removal from report is also included in email notifications to OSA and OM (884). At the bottom of the email notifications, it lists the CPUs 22 that still have access to the report.

The CPUs 22 are informed on the initial email notification and on the audit log that a CPU 22 was denied access to the report (886). The OSA and/or OM may decide to reinstate access to that person (888). If a decision is made to reinstate, the OSA or OM opens the particular report the CPU 22 was disabled from and click on "grant or remove access." The OSA 467 or OM selects blocked person's names and re-grant access. Email notification sent to CPU 22 that was previously blocked. If the OSA and/or OM decide that they do not wish to reinstate access, the CPU 22 remains blocked.

If the reporter 16 does not find a match or confirm anyone from the list (866), the report, once submitted, will go to all CPUs 22 based on the user group distribution matrix regardless of names submitted as suspects (868). The reporter 16 confirms a match for the system 10 to disable the CPU 22.

Change of Incident Types by Reporters

In another embodiment, the system 10 may be provided with a control for the reporter 16 to change the incident type after drafting the reports but prior to submission of the report. Preferably, when the reporter 16 changes the incident type, the software retains and displays to the reporter 16 the data that has already been entered by the reporter 16 which is relevant to the changed incident type. In one example, the software provides for the reporter 16 to select the organization, pick the incident type and fill in or provide general information regarding the incident. As the data is entered by the reporter 16, the data is saved to a temporary location. If the reporter 16 decides to change the incident type from the initial type to a second incident type, the software maintains the general information relating to the incident and pre fills those fields in the report displayed to the reporter 16 with respect to the second incident type. The software may also display specific questions relating to the second incident type. In one example, a computer display is provided with a control for changing the incident type by the reporter 16. FIG. 70 illustrates an example of a computer display screen having a control for changing the incident type 896, and in one example this control is displayed to the reporter 16 prior to the reporter's 16 final submission of the incident report.

Designation of Order of Incident Type Listing in Reporter's Portal

In another embodiment, a system 10 may be provided with a capability for CPUs 22 to designate the order of incident types as they are presented to reporters 16 through the reporter portal, as well as designate which incident types should be displayed whatsoever to the reporter 16. In one example, the default order of listing of incident types is alphabetical, and one or more controls may be provided so that an client organization 14 or CPU 22 may specify a display order that is something other than alphabetical. In FIG. 71, through the client organization's 14 enterprise portal, an incident type selection control 898 may be provided in a computer display screen which permits a client organization 14 to select or deselect a particular incident type from being displayed to reporters 16 through the reporter's portal.

For each incident type, an order control 900 may also be provided wherein the client organization 14 may specify the order in which the particular incident type will be displayed relative to other selected incident types. For example in FIG. 71, the client organization 14 has selected substance abuse as the first incident type to be displayed, followed by sexual harassment. As shown in the example of FIG. 72, which is a sample display screen of a reporter's portal 902, the incident types are listed with substance abuse first, followed by sexual harassment, followed by the remaining selected incident types in alphabetical order.

Display of Stale Incident Reports

Figure 73:
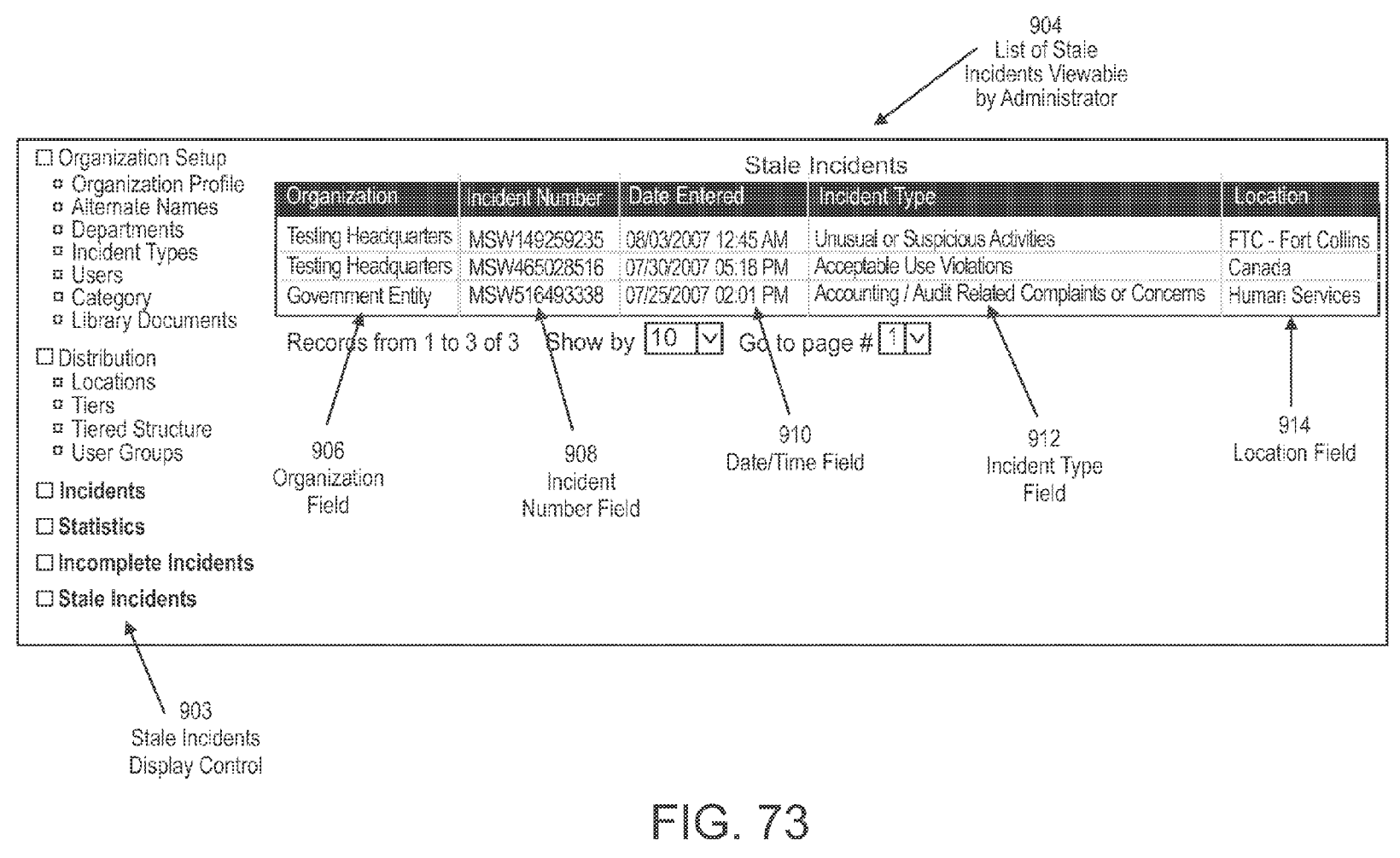

In another embodiment, a system 10 may be provided with a feature wherein the administrator 12 can view a list of stale incident reports. In one example, stale incident reports include incident reports that have been received but where no one from the client organization 14 has reviewed the report within a specified amount of time which renders the report "stale" (i.e., 48 hours, although other amounts of time can be used depending upon the implementation). In one example, the software may provide an administrator 12 with a stale incident report display control 903, as shown in FIG. 73, which provides a list of stale incidents 904 viewable by the administrator 12. In one example, the stale incident report may include, for each incident report which has not been initially viewed by a client organization 14, an organization field 906 for describing the name of the organization, an incident number field 908 containing the incident number, a date and time field 910, an incident type field 912 that includes the incident type specified by the reporter 16 in the incident report, and a location field 914. In this manner, an administrator 12 can be made aware of stale incidents, and may contact, if desired, a representative at a particular organization to inform the organization of the existence of an incident report that has not been acted upon or read by the client organization 14. While in one example, an incident report is deemed stale if no review of the report has occurred within 48 hours, it is understood that a time period of less than or greater than 48 hours may be utilized depending upon the implementation. If desired, a display of stale reports may also be provided to the client organization 14 in a similar manner.

Figure 74:
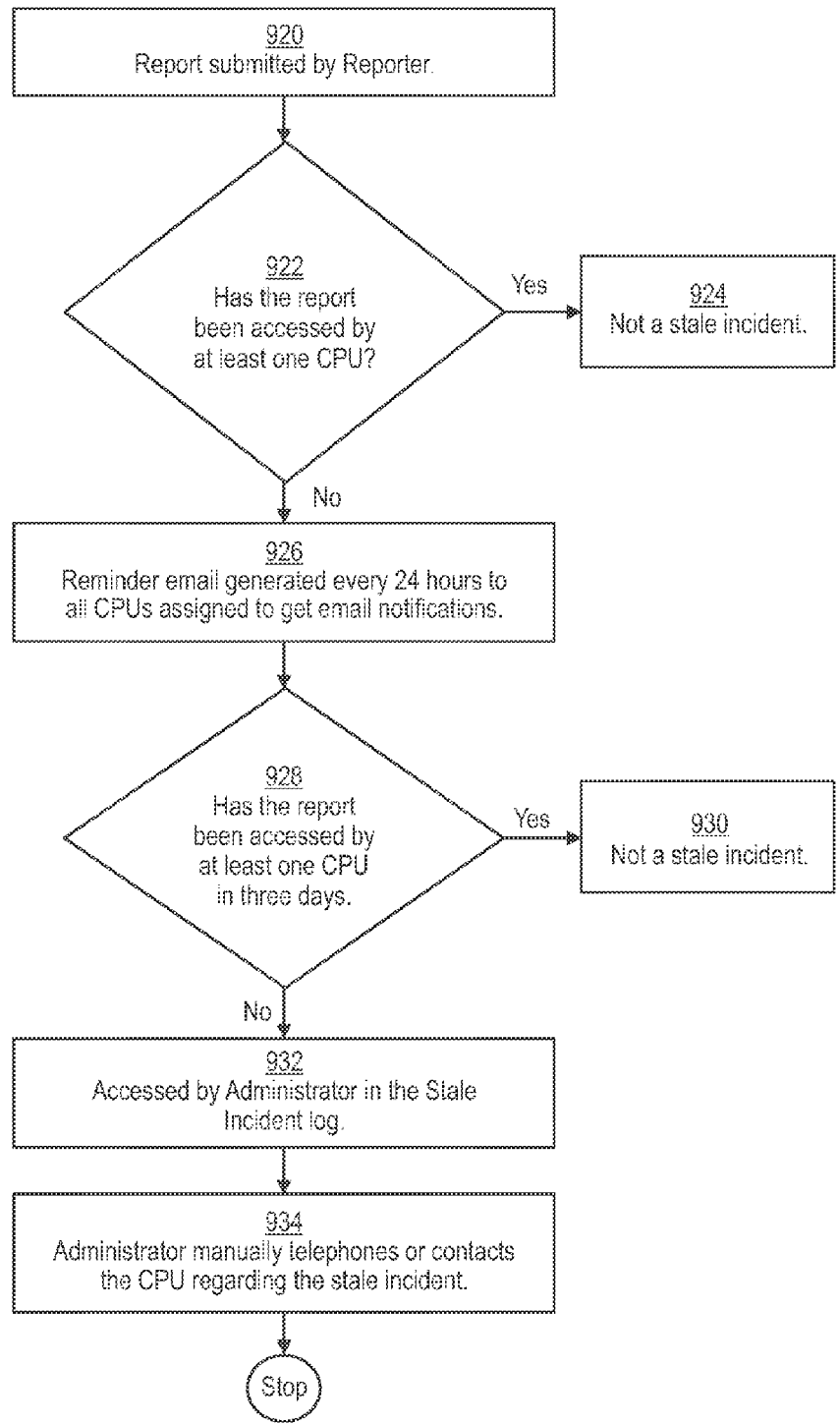
FIG. 74 is a flowchart illustrating one example of dealing with stale reports.

In the example illustrated in FIG. 74, a report is sent to certain CPUs 22 based on access and notification rights found in user group distribution matrix (920). The system, at a predefined interval, queries whether at least one CPU 22 has accessed the report (922). If the response is a yes, in one embodiment, the system 10 automatically changes the report status to "reviewed" and the report is not considered "stale" (924). If response is a no, in another embodiment, the system 10 generates a reminder email which it sends to all CPUs 22 who automatically receive that report based on access and notification rights found in user group distribution matrix (926). For example, the system 10 may send the email to the user group every 24 hours with the following message: "You have not reviewed a submitted incident within the last 24 hours. Please click the incident number (insert hyperlink) to review the incident details. The reporter 16 selected the incident type (insert incident type) for this report."

In one example, if a CPU 22 accesses the report within three days of the initial email reminder, the system no longer considers the report stale (930). In the same example, if a CPU 22 does not access the report within three days of the initial email reminder, the system 10 logs the report as a "stale" report. The Stale Report log is viewed through the "Stale Incident" link accessed only by the administrator 12 in the Enterprise Portal, not by any CPU 22 (932). The administrator 12 may then manually telephone and/or email the appropriate CPU 22 to alert him that no CPUs 22 have reviewed the report (934).

Display of Incomplete Incident Reports

In another embodiment, system 10 may include an incomplete incident reporting feature viewable by administrators 12. An incomplete incident report may include an incident report that is filed by a reporter 16 which does not properly specify the name of or location of a client organization 14 which is part of the system 10. For instance, if a reporter 16 submits an incident report that is related to a client organization 14 which is not part of the system 10, then such a report could be considered an incomplete incident report. In one embodiment of the invention, administrators 12 of the system 10 are provided with a control to display incomplete incident reports.

As shown in the example of FIG. 75, a list of incomplete incident reports 950 may be provided for viewing by an administrator 12. In one example, the list of incomplete incident reports includes, for each incomplete incident, the incident number field 954 and a field specifying the organization that was entered by the reporter 16 (956). If desired, the administrator 12 may attempt to reconcile the incomplete incident reports with a client organization 14 that is part of the system 10, or if the organization specified by the reporter 16 is not part of the system 10, the administrator 12 may provide such information to the organization specified by the reporter 16, if desired.

Figure 76:
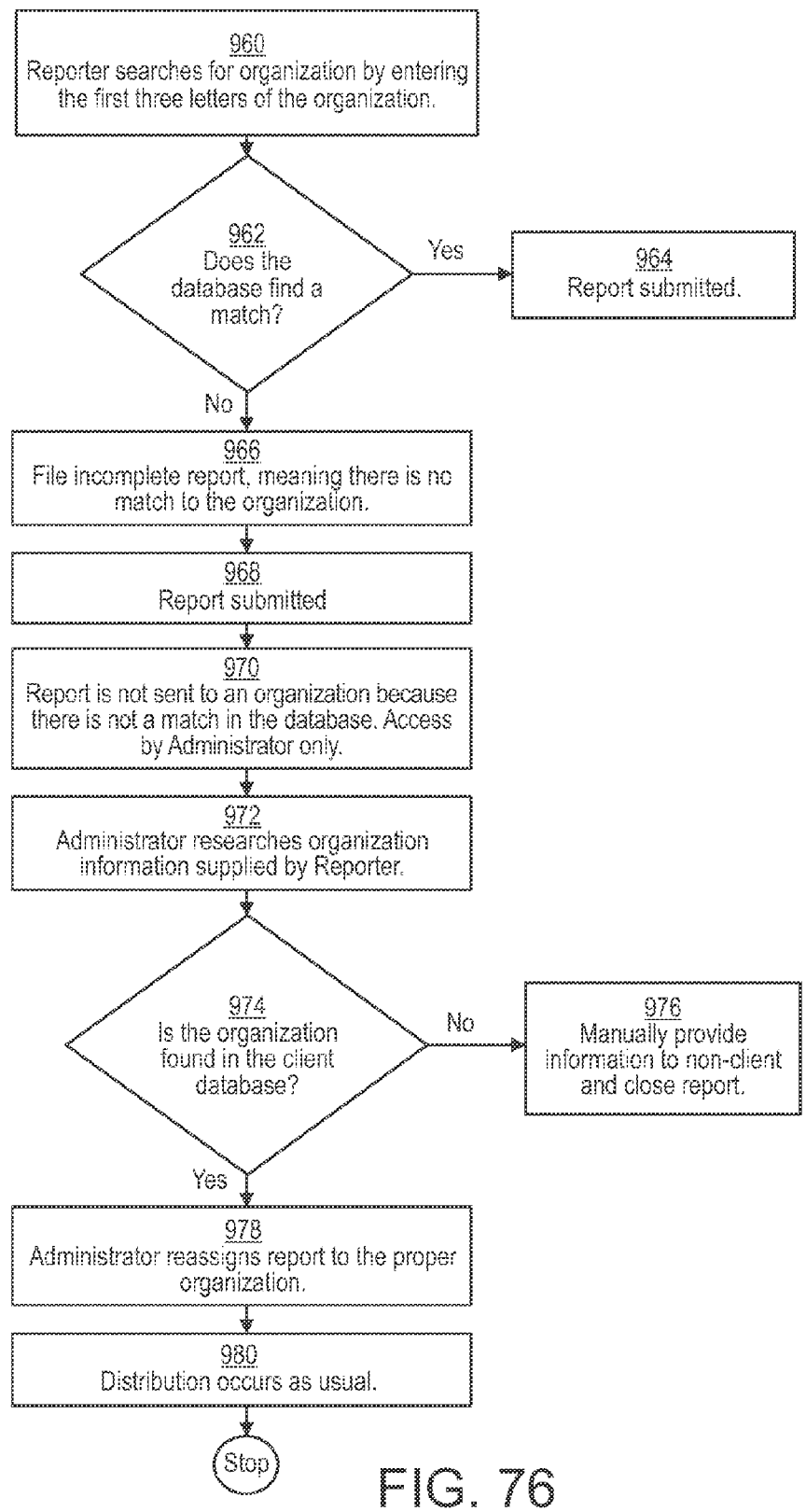
FIG. 76 is a flowchart illustrating one example of dealing with incomplete incident reports.

In the example illustrated in the flowchart of FIG. 76, the reporter 16 searches for his/her organization on the "make a report screen" by entering the first three letters of the organization's name (960). The system 10 searches the database 15 for a match (962). If organizations within the database matches the reporter's 16 entry, the system 10 displays a list of possible matches and the reporter 16 selects the correct organization. The reporter 16 submits the report (964).

Continuing with the example of FIG. 76, if no match is found, or the matches that are displayed are not correct, the reporter 16 may search again. If there is still no match, the reporter 16 may click on proceed to "incident form." The reporter 16 files a report for an organization that is not contained in the system database 15, so the system 10 designates the report as an "Incomplete Report" (966). The reporter 16 submits the report (968).

In one example, the system 10 does not send the report to any organization because there is no match in the database (970). The system 10 provides notification and access to the report to the administrators 12. The body of the alert email indicates the report is not associated with any client organization 14 and the system 10 funnels it into its "incomplete reports" section. Typically, the incomplete reports section is only accessible by administrators 12. The administrator 12 manually researches the organization in the report to determine if it belongs to any pre-existing client (972). If the organization is found to be a current client in the database, but the reporter 16 filed the report under a wrong name, the administrator 12 manually reassigns the report to the organization (978). This manual reassigning operation is initiated by accessing the "incomplete reports" link in the administrator's Enterprise Portal, clicking on the hyperlink associated with the report, selecting the appropriate organization, location, and incident type, and clicking save. Normal distribution takes place and the report is removed from the "incomplete reports" list (980). If the organization is not found to be an existing client in the database, the administrator 12 manually provides information to non-client if contact information was provided (976). If reporter 16 provides contact information, the administrator 12 also instructs reporter 16 that the organization does not use the system. The report typically remains in the "incomplete reports" list in the system 10.

Hence, it can be seen that various embodiments of the invention provide useful features for an anonymous incident reporting system. It is understood that, depending upon the implementation, a system could include one or more of the features or functions described here, alone or in combination with other features or functions disclosed herein.

Embodiments of the present invention may be embodied as computer readable code on computer readable media such as CD-ROMS or transmitted as computer signals on carrier waves. While the methods disclosed herein have been described and shown with reference to particular operations performed in a particular order, it will be understood that these operations may be combined, sub-divided, or re-ordered to form equivalent methods without departing from the teachings of the present invention. Accordingly, unless specifically indicated herein, the order and grouping of the operations is not a limitation of the present invention.

It should be appreciated that reference throughout this specification to "one embodiment" or "an embodiment" or "one example" or "an example" means that a particular feature, structure or characteristic described in connection with the embodiment may be included, if desired, in at least one embodiment of the present invention. Therefore, it should be appreciated that two or more references to "an embodiment" or "one embodiment" or "an alternative embodiment" or "one example" or "an example" in various portions of this specification are not necessarily all referring to the same embodiment. Furthermore, particular features, structures or characteristics may be combined as desired in one or more embodiments of the invention.

While the invention has been particularly shown and described with reference to embodiments thereof, it will be understood by those skilled in the art that various other changes in the form and details may be made without departing from the spirit and scope of the invention.

What is claimed is:

1. A computer implemented method of providing a reporting system for the exchange of confidential data between a reporting party and an organization, the method comprising:
providing a report with a plurality of data fields configured for receiving confidential data input by a reporting party;
receiving the confidential data from the reporting party into the plurality of data fields;
receiving a level of anonymity of the reporting party;
associating the confidential data with the plurality of data fields in the report;
storing the confidential data, the report and the level of anonymity in a database;
providing a reporting party interface for the reporting party to retrieve and view the report, the reporting party interface comprising a graphical user interface for use with a browser on a computer connected to a network;
providing an organization interface for the organization to retrieve and view the report, the organization interface comprising a graphical user interface for use with a browser on a computer connected to a network;
displaying the report to the reporting party using the reporting party interface; and
displaying the report to the organization using the organization interface, the report populated with confidential data based upon the level of anonymity;
wherein at least one of the plurality of data fields is configured for receiving the level of anonymity of the reporting party;
wherein the level of anonymity is chosen from a group consisting of remain completely anonymous, remain anonymous to organization, and do not care about anonymity; and
wherein the level of anonymity of remains anonymous to organization comprises the reporting party providing personal identification information to an intermediary without providing the personal identification information to the organization.

2. The method of claim 1, wherein the plurality of data fields are configured for receiving information relating to an incident revealed by the reporting party.

3. The method of claim 1, wherein the personal identification information comprises a name of the reporting party and a phone number for the reporting party.

4. The method of claim 1, further comprising the reporting party selecting a level of anonymity, wherein the level of anonymity is chosen from a group consisting of remain completely anonymous, remain anonymous to organization and do not care about anonymity.

5. The method of claim 1, wherein the database is a relational database.

6. The method of claim 1, wherein the graphical user interface for use with a browser is a secure website having data encryption configured for encrypting confidential data transmitted over the network and the network is the Internet.

7. The method of claim 6, wherein the reporting party interface is a first portal and the organization interface is a second portal, the first portal having an interface configured to transmit and receive data between the reporting party and an intermediary and the second portal having an interface configured to transmit and receive data between the organization and the intermediary.

8. The method of claim 1, further comprising storing the associations between the plurality of data fields and the confidential data in the database.

9. A method for navigating a plurality of linked web pages on the Internet using a graphical user interface, the method comprising: accessing a first web page capable of being displayed on a browser of a computer; displaying the first web page, the first web page having embedded therein,
a first plurality of data fields configured for receiving confidential incident data entered into a report,
a second plurality of data fields configured for receiving confidential contact data relating to the reporting party,
an anonymity data field configured for receiving a level of anonymity from the reporting party, wherein the level of anonymity includes selectable choices of a level of remain completely anonymous, a level of remain anonymous to organization, and a level of do not care about anonymity, wherein the level of remain anonymous to organization comprises the reporting party providing personal identification information to an intermediary without providing the personal identification information to the organization,
a first plurality of graphical user interface controls configured for entering data into the first and second plurality of data fields and the anonymity data field, and
a second plurality of graphical user controls configured for navigating from the first web page to a plurality of linked web pages,
a database interface configured for receiving the confidential incident data in the first plurality of data fields, the confidential contact data in the second plurality of data fields and the level of anonymity in the anonymity data field and causing a storing operation of the confidential incident data, the confidential contact data, the level of anonymity and the report in a database;

a control interface configured for both detecting user operation of the first plurality of graphical user interface controls by the reporting party and, in response, entering data into the first and second plurality of data fields and the anonymity data field and configured for detecting user operation of the second plurality of graphical user interface controls by the reporting party and, in response, navigating the plurality of linked web pages.

10. A graphical user interface for use with a browser on a computer connected to a network, the graphical user interface configured for facilitating the exchange of confidential information between a reporting party and an organization through an intermediary, the graphical user interface comprising:

a web page capable of being displayed on the browser of the computer, the web page having embedded therein, a first plurality of data fields configured for receiving confidential incident data entered into a report, a second plurality of data fields configured for receiving confidential contact data relating to the reporting party, an anonymity data field configured for receiving a level of anonymity from the reporting party, wherein the level of anonymity includes at least selectable choices of remain completely anonymous and remain anonymous to organization, and wherein the level of remain anonymous to organization is adapted to provide personal identification information of the reporting party to the intermediary without providing said personal identification information to the organization, a first plurality of graphical user interface controls configured for entering data into the first and second plurality of data fields and the anonymity data field, and a second plurality of graphical user controls configured for navigating from the web page to a plurality of linked web pages, a database interface configured for receiving the confidential incident data in the first plurality of data fields, the confidential contact data in the second plurality of data fields and the level of anonymity in the anonymity data field and causing a storing operation of the confidential incident data, the confidential contact data, the level of anonymity and the report in a database; and a control interface configured for both detecting user operation of the first plurality of graphical user interface controls by the reporting party and, in response, entering data into the first and second plurality of data fields and the anonymity data field and configured for detecting user operation of the second plurality of graphical user interface controls by the reporting party and, in response, navigating the plurality of linked web pages.

11. The graphical user interface of claim 10, further comprising a display interface for detecting the level of anonymity from the reporting party and, in response, displaying a first portion of the confidential contact data to the organization.

12. The graphical user interface of claim 11, wherein the first portion of the confidential contact data is all of the confidential contact data for a level of do not care about anonymity.

13. The graphical user interface of claim 11, wherein the first portion of the confidential contact data is none of the confidential contact data for a level of remain completely anonymous.

14. The graphical user interface of claim 11, wherein the first portion of the confidential contact data is none of the confidential contact data for a level of remain anonymous to organization, wherein the confidential contact data is displayed to the intermediary.

15. The method of claim 1, wherein the personal identification information comprises a personal e-mail address for the reporting party.

* * * * *